United States Patent
Visser et al.

(10) Patent No.: US 8,724,829 B2
(45) Date of Patent: May 13, 2014

(54) SYSTEMS, METHODS, APPARATUS, AND COMPUTER-READABLE MEDIA FOR COHERENCE DETECTION

(75) Inventors: Erik Visser, San Diego, CA (US); Ian Ernan Liu, Baldwin Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 12/605,158

(22) Filed: Oct. 23, 2009

(65) Prior Publication Data

US 2011/0038489 A1  Feb. 17, 2011

Related U.S. Application Data

(60) Provisional application No. 61/108,447, filed on Oct. 24, 2008, provisional application No. 61/185,518, filed on Jun. 9, 2009, provisional application No. 61/240,318, filed on Sep. 8, 2009.

(51) Int. Cl.
*H03G 5/00* (2006.01)

(52) U.S. Cl.
USPC .......................................................... 381/97

(58) Field of Classification Search
CPC ........... H04S 1/002; H04R 1/403; H04R 3/12
USPC .......... 381/97–99, 102–104, 91, 92, 381/94.1–94.3, 122, 66, 17, 56; 700/94; 702/190
See application file for complete search history.

(56) References Cited

U.S. PATENT DOCUMENTS

| | | | |
|---|---|---|---|
| 6,069,961 A | 5/2000 | Nakazawa | |
| 6,272,229 B1 | 8/2001 | Baekgaard | |
| 7,006,636 B2 * | 2/2006 | Baumgarte et al. | 381/17 |
| 7,496,482 B2 | 2/2009 | Araki et al. | |
| 8,620,672 B2 | 12/2013 | Visser et al. | |
| 2003/0134607 A1 | 7/2003 | Raghavan et al. | |
| 2003/0147538 A1* | 8/2003 | Elko | 381/92 |
| 2003/0198356 A1 | 10/2003 | Thompson | |
| 2005/0276423 A1 | 12/2005 | Aubauer et al. | |
| 2006/0058983 A1 * | 3/2006 | Araki et al. | 702/190 |
| 2006/0067541 A1 | 3/2006 | Yamada et al. | |
| 2006/0106601 A1 | 5/2006 | Kong et al. | |
| 2006/0215854 A1 | 9/2006 | Suzuki et al. | |

(Continued)

FOREIGN PATENT DOCUMENTS

| | | |
|---|---|---|
| EP | 1640973 | 3/2006 |
| JP | 2002084590 A | 3/2002 |

(Continued)

OTHER PUBLICATIONS

Nagata Y et al., "Target Signal Detection System Using Two Directional Microphones," Transactions of the Institute of Electronics, Information and Communication Engineers, Dec. 2000, vol. J83-A, No. 12, pp. 1445-1454.

(Continued)

*Primary Examiner* — Lun-See Lao
(74) *Attorney, Agent, or Firm* — Espartaco Diaz Hidalgo

(57) ABSTRACT

Based on phase differences between corresponding frequency components of different channels of a multichannel signal, a measure of directional coherency is calculated. Application of such a measure to voice activity detection and noise reduction are also disclosed.

49 Claims, 60 Drawing Sheets

(56) References Cited

U.S. PATENT DOCUMENTS

| | | |
|---|---|---|
| 2007/0160230 A1 | 7/2007 | Nakagomi |
| 2008/0170728 A1 | 7/2008 | Faller |
| 2008/0232607 A1 | 9/2008 | Tashev et al. |
| 2009/0089053 A1 | 4/2009 | Wang et al. |

FOREIGN PATENT DOCUMENTS

| | | |
|---|---|---|
| JP | 2003078988 A | 3/2003 |
| JP | 2007010897 A | 1/2007 |
| JP | 2007068125 A | 3/2007 |
| JP | 2007183202 A | 7/2007 |
| JP | 2008079256 A | 4/2008 |
| KR | 19950035103 | 12/1995 |
| KR | 20080092404 A | 10/2008 |
| WO | 2005024788 A1 | 3/2005 |
| WO | WO2009042385 | 4/2009 |

OTHER PUBLICATIONS

Taiwan Search Report—TW098136230—TIPO—Jan. 24, 2013.

* cited by examiner

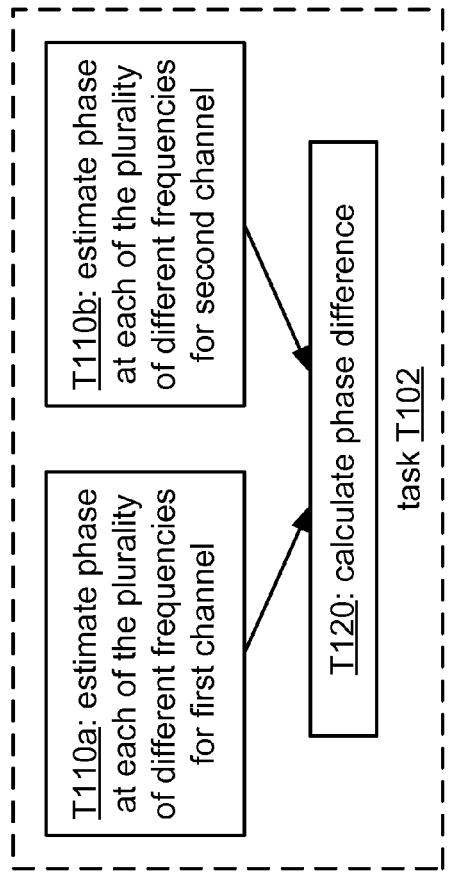
FIG. 1B
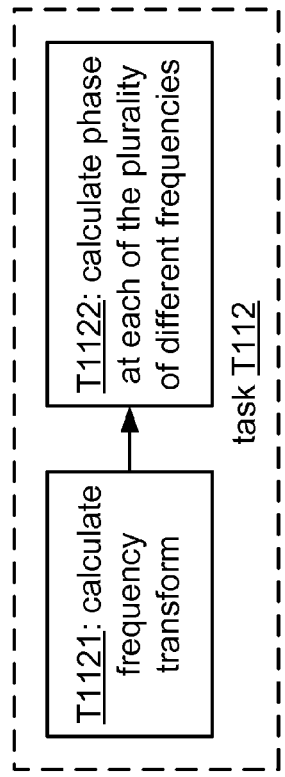
FIG. 1C
FIG. 1A

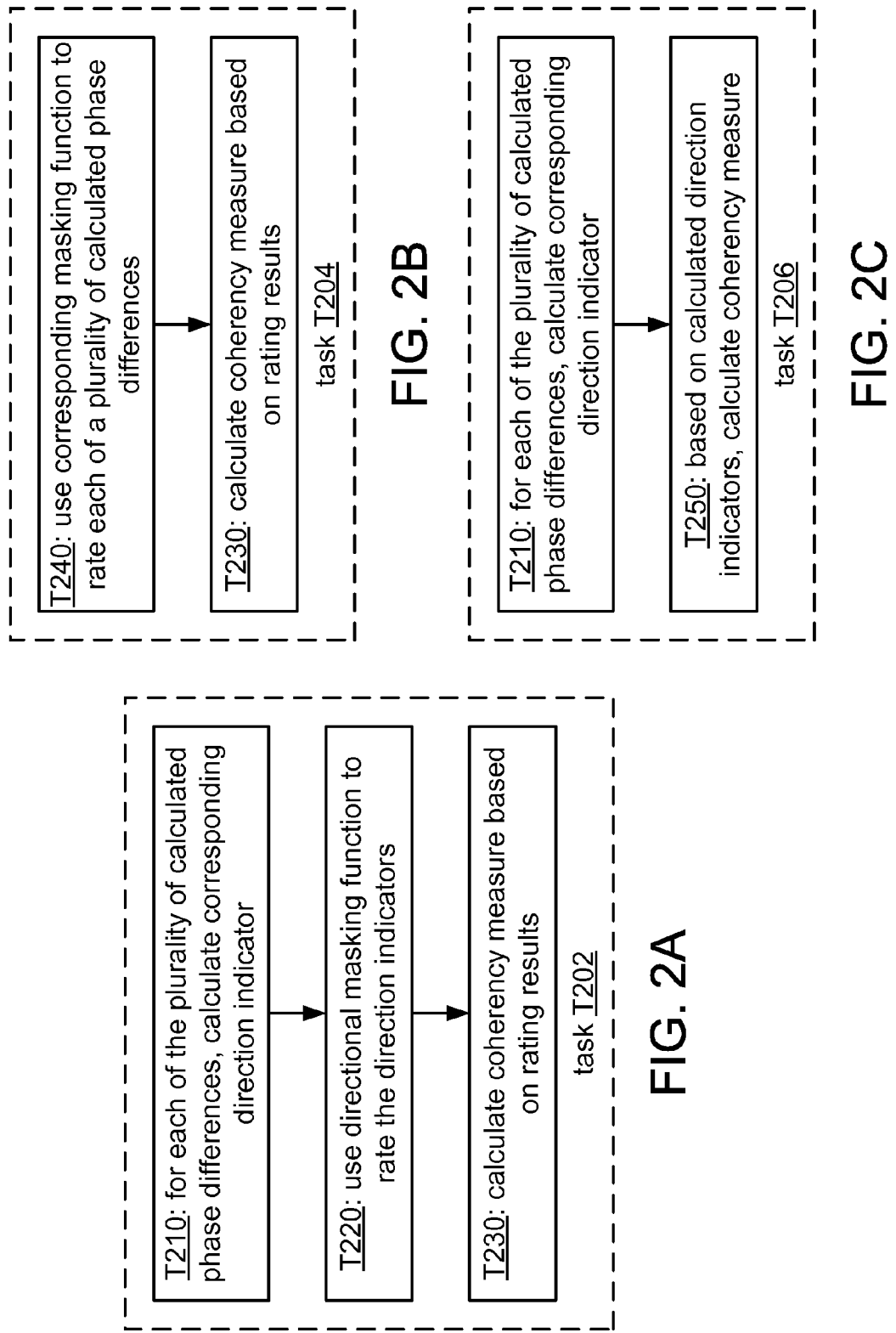

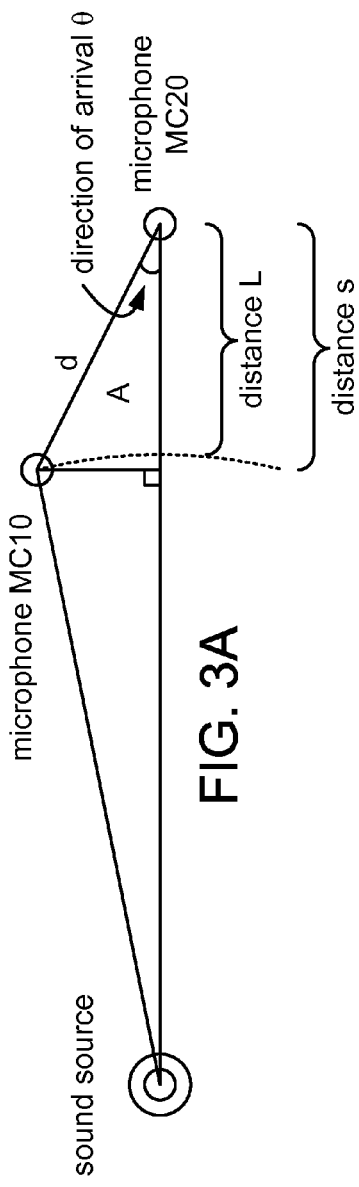
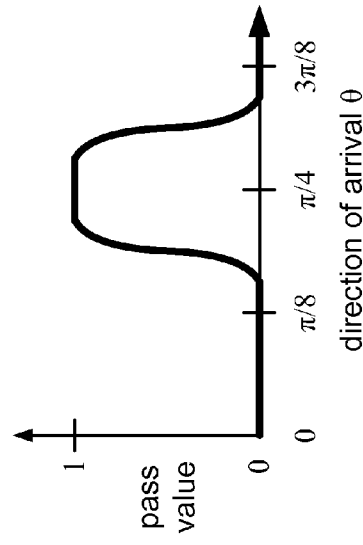
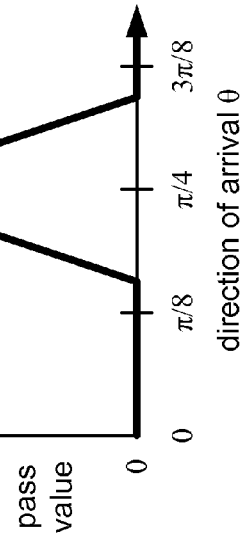
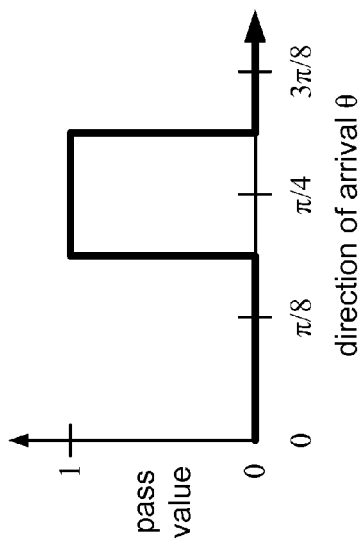
FIG. 3A
FIG. 3B
FIG. 3C
FIG. 3D

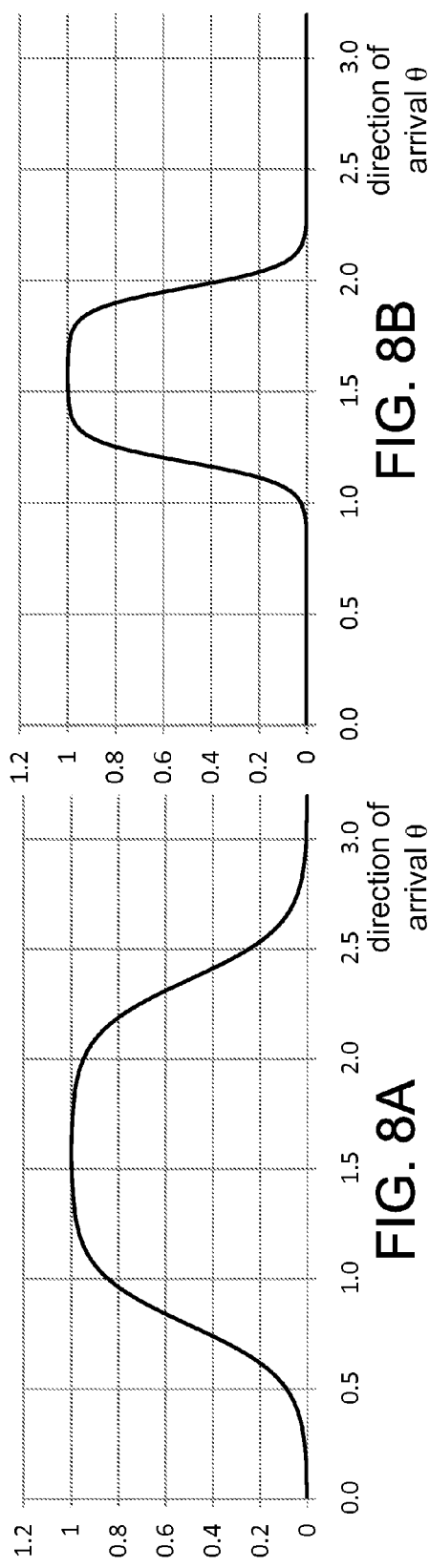
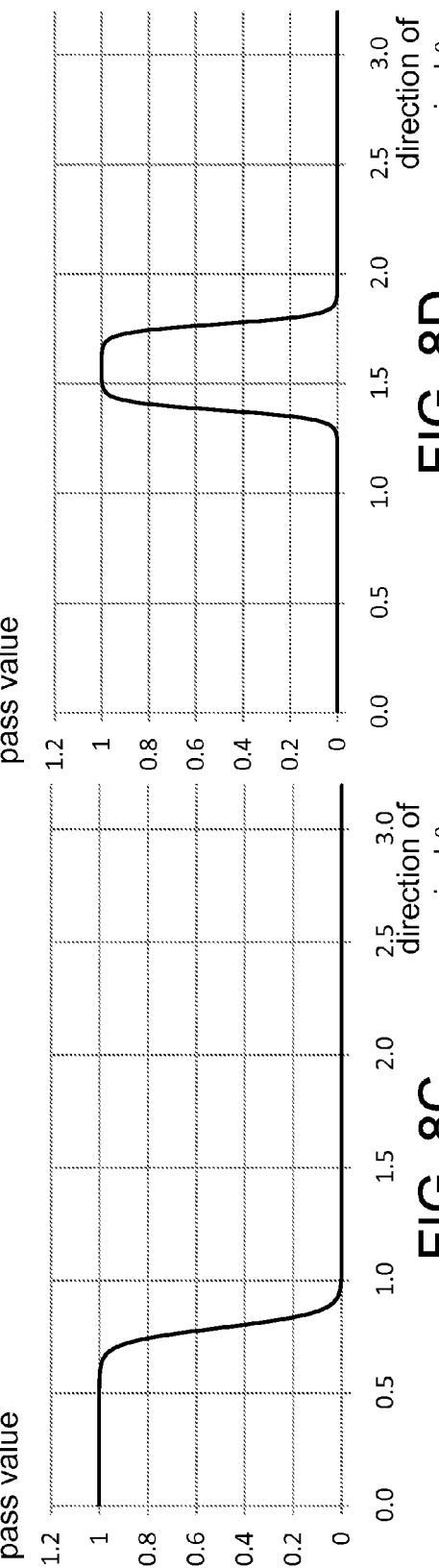

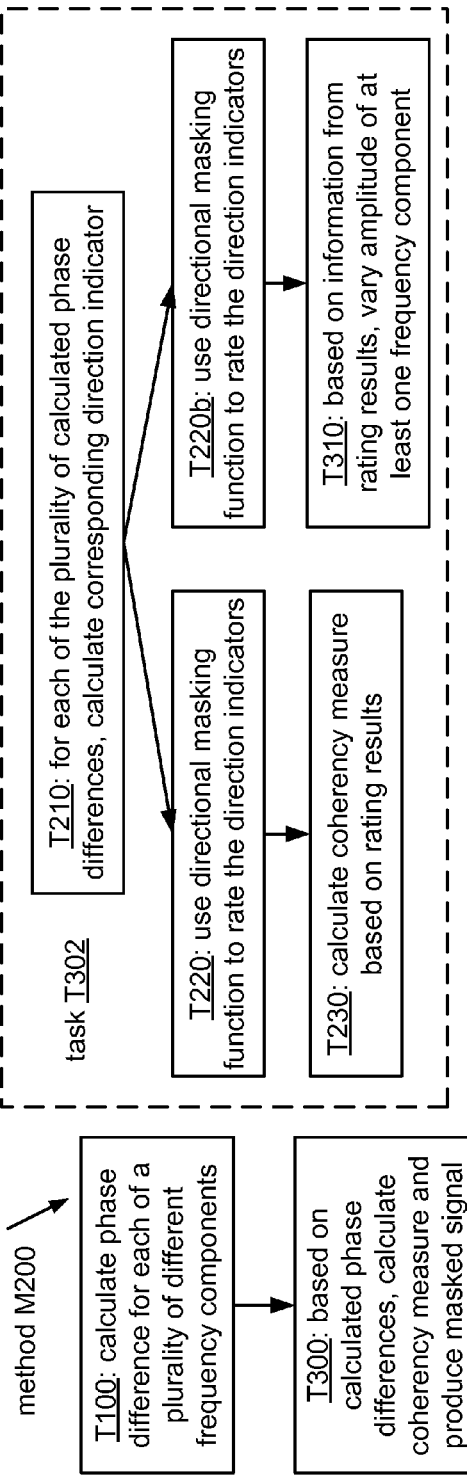
FIG. 11B
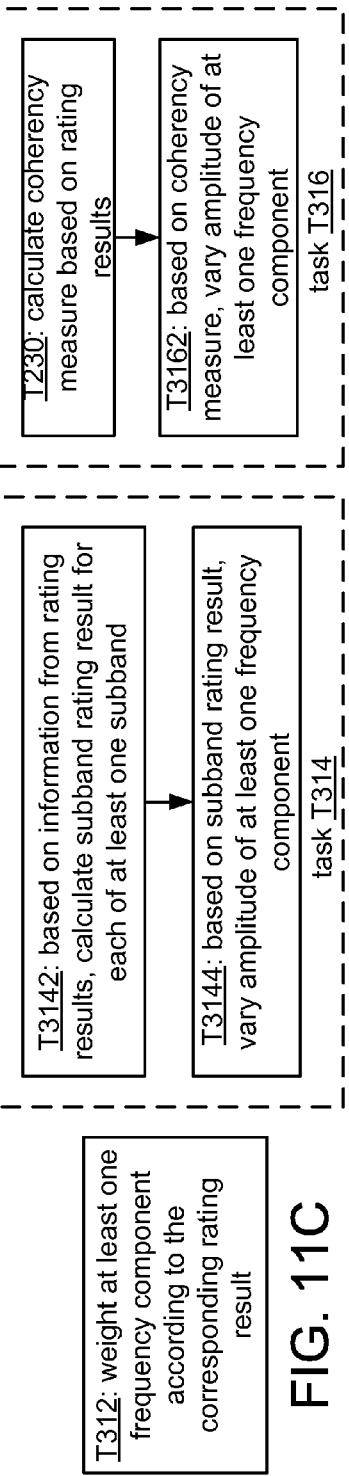
FIG. 11E
FIG. 11D
FIG. 11A
FIG. 11C

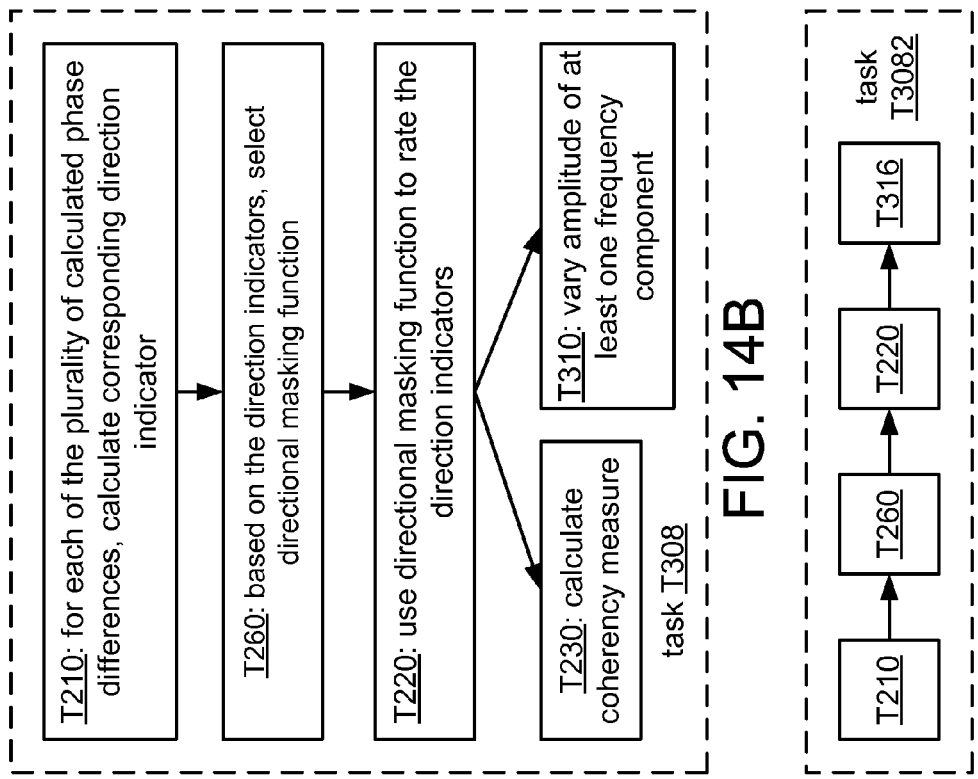
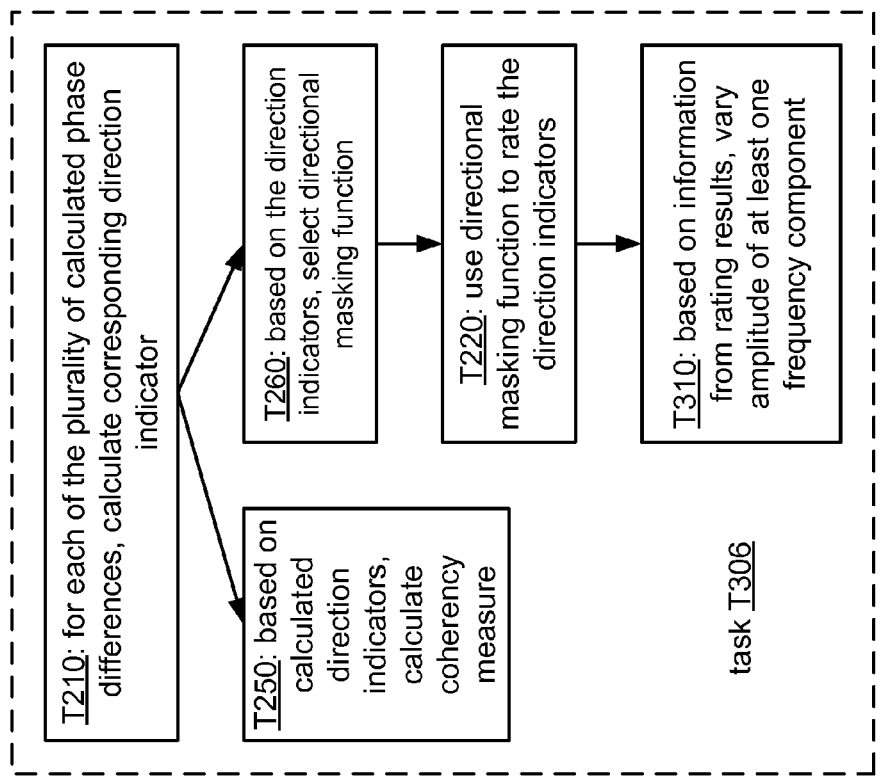

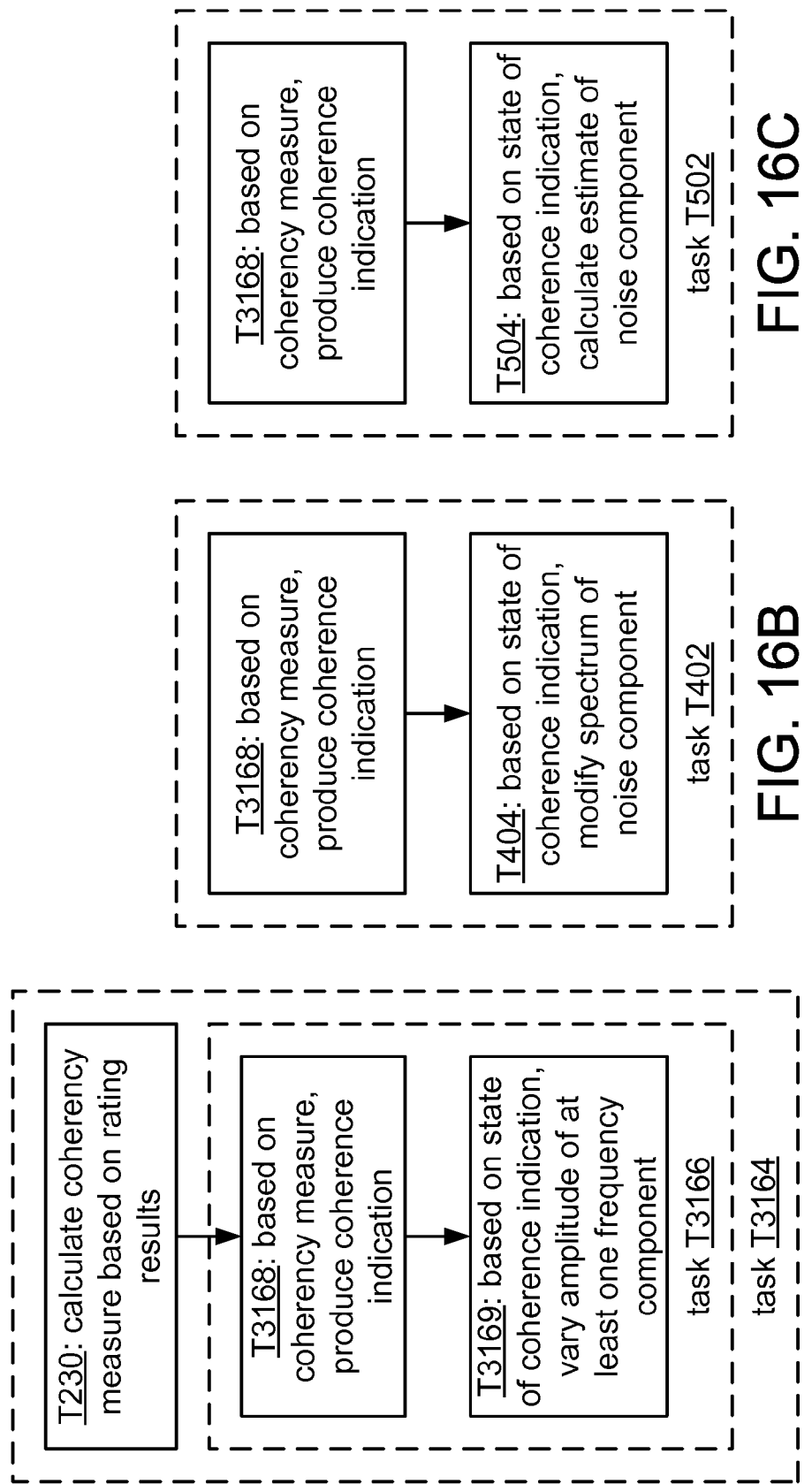

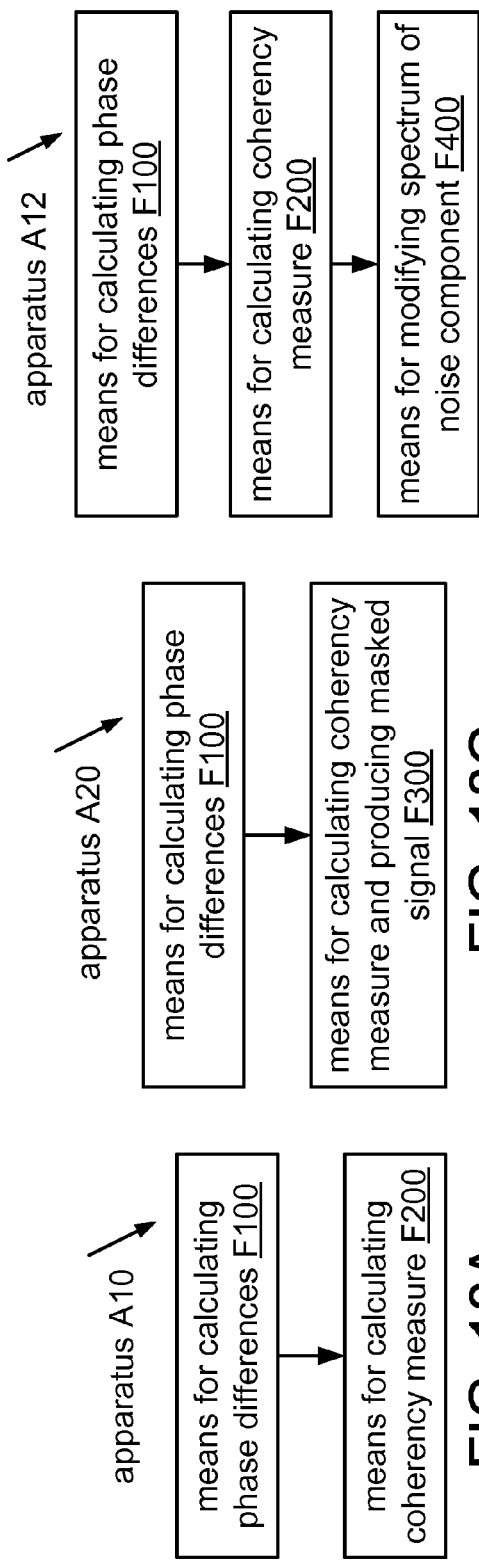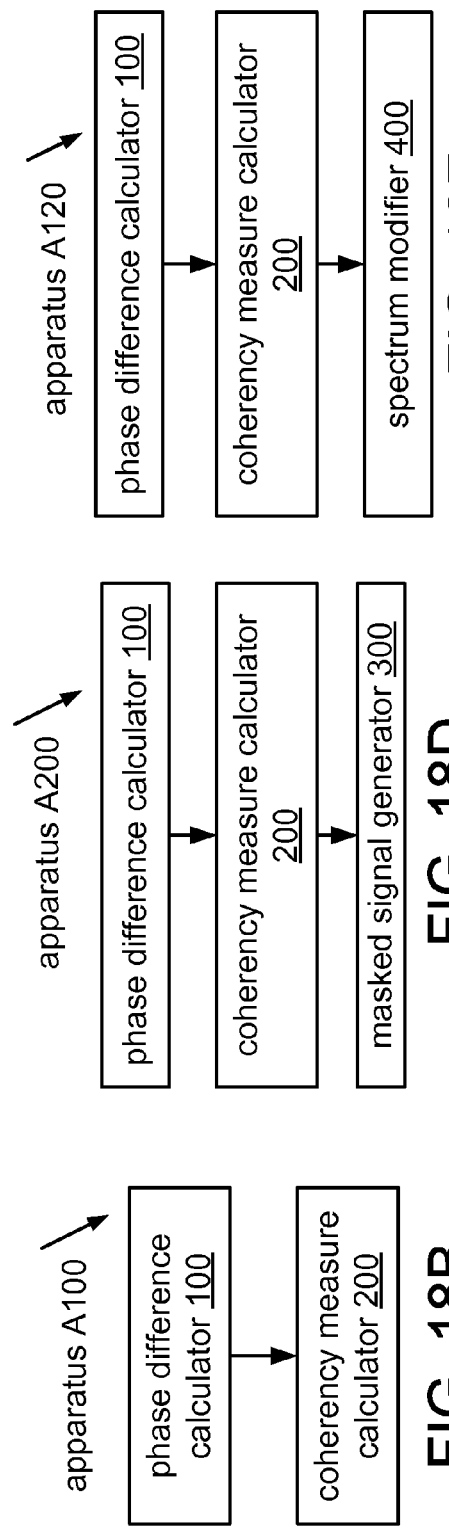

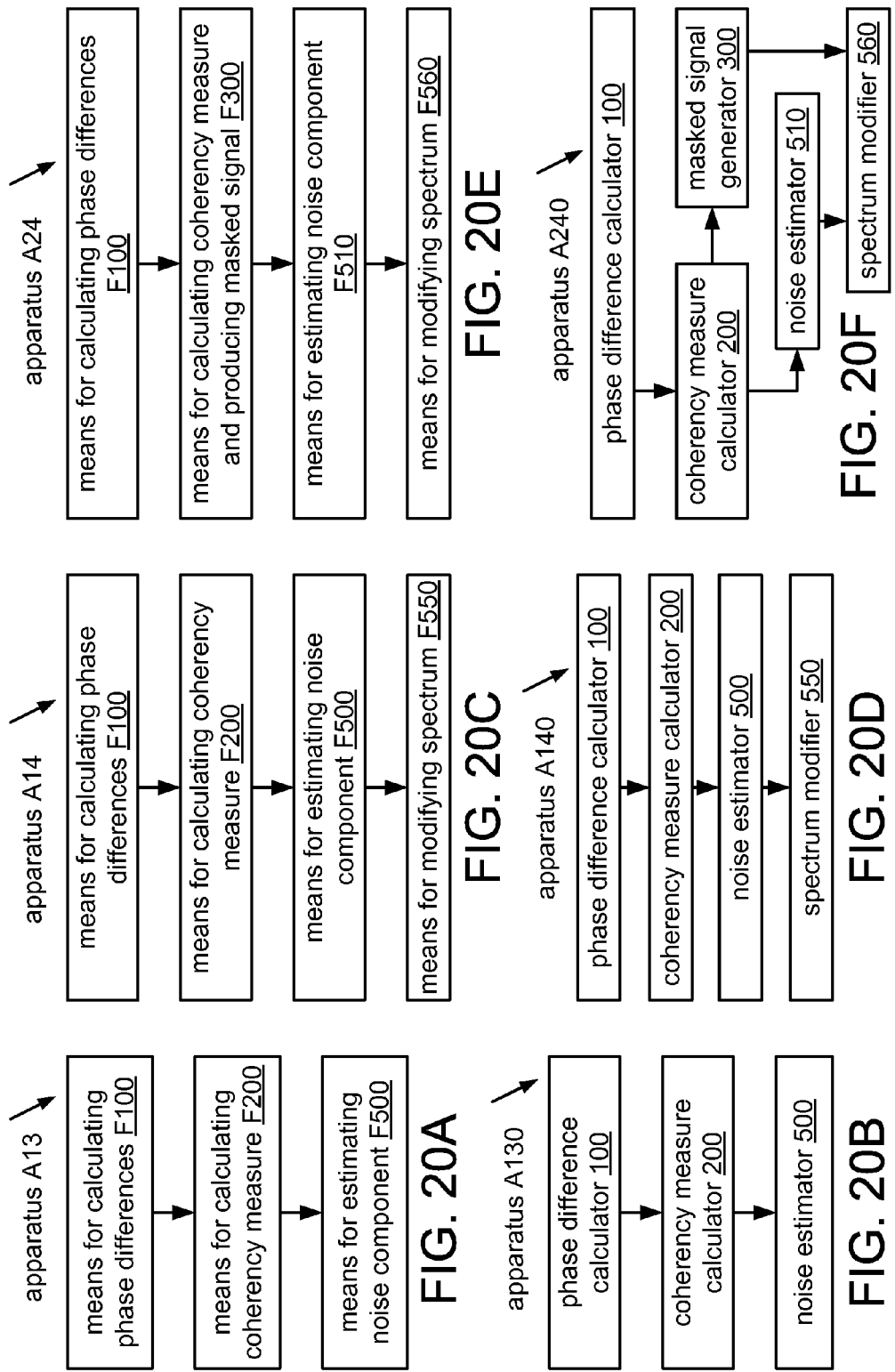

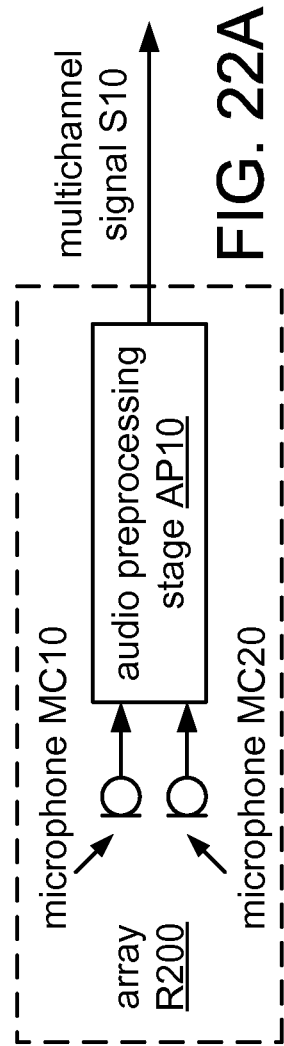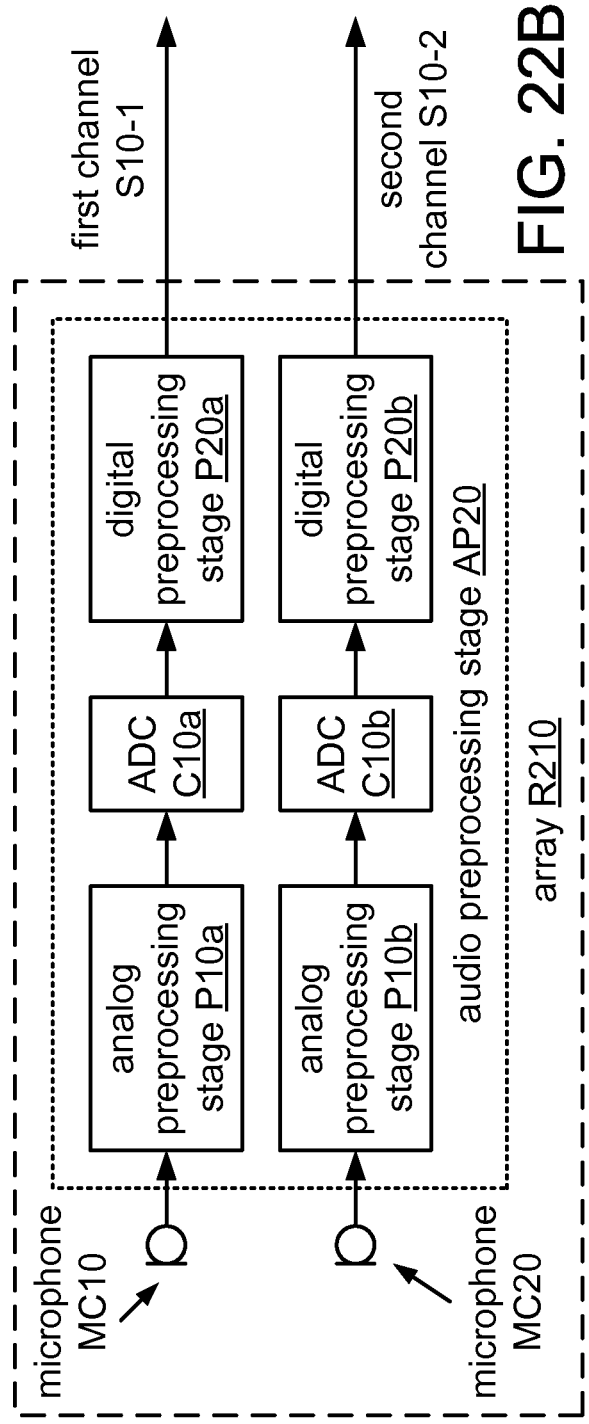

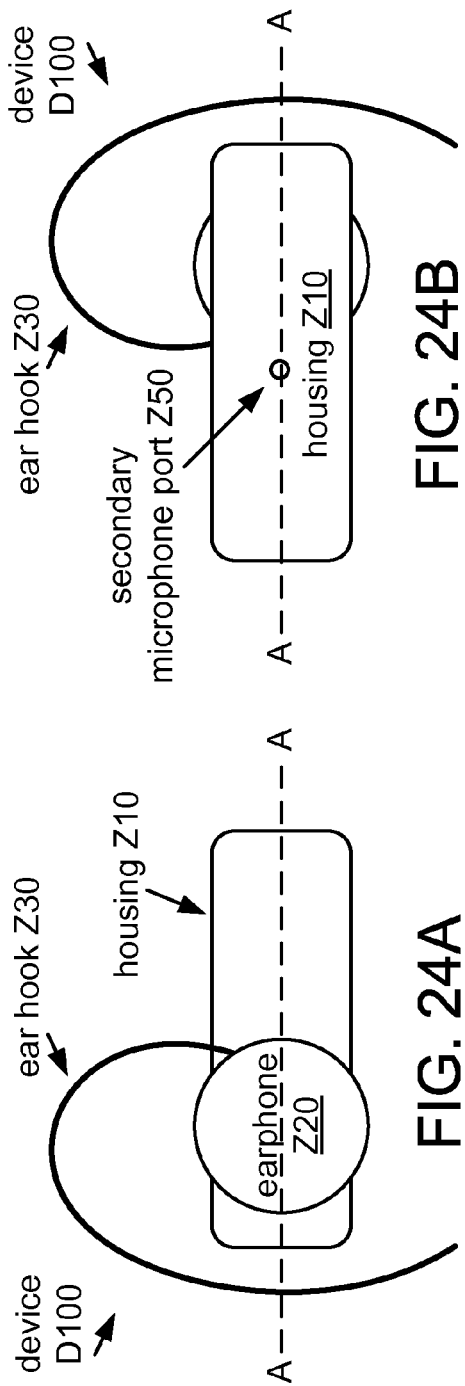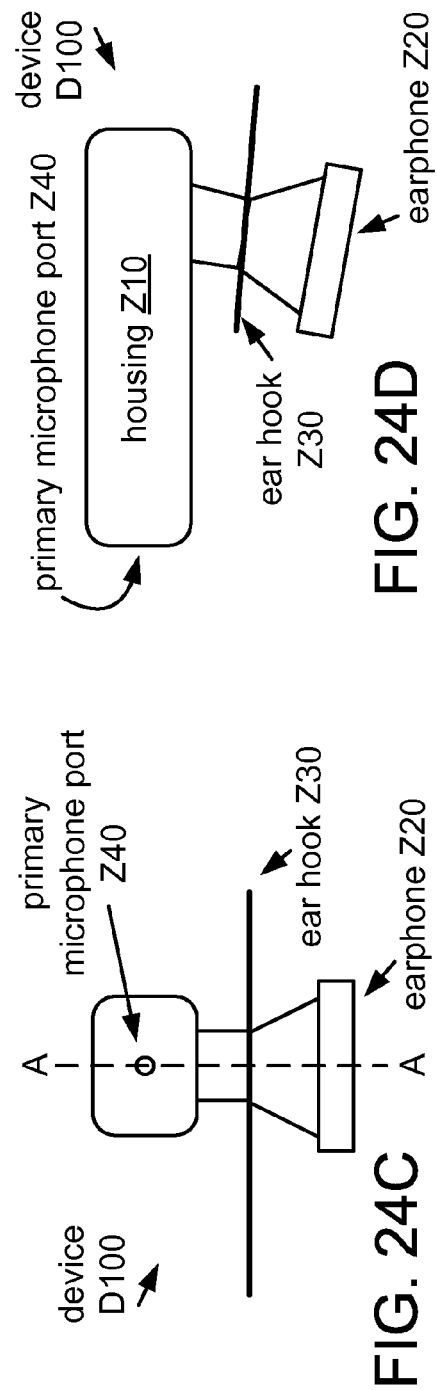

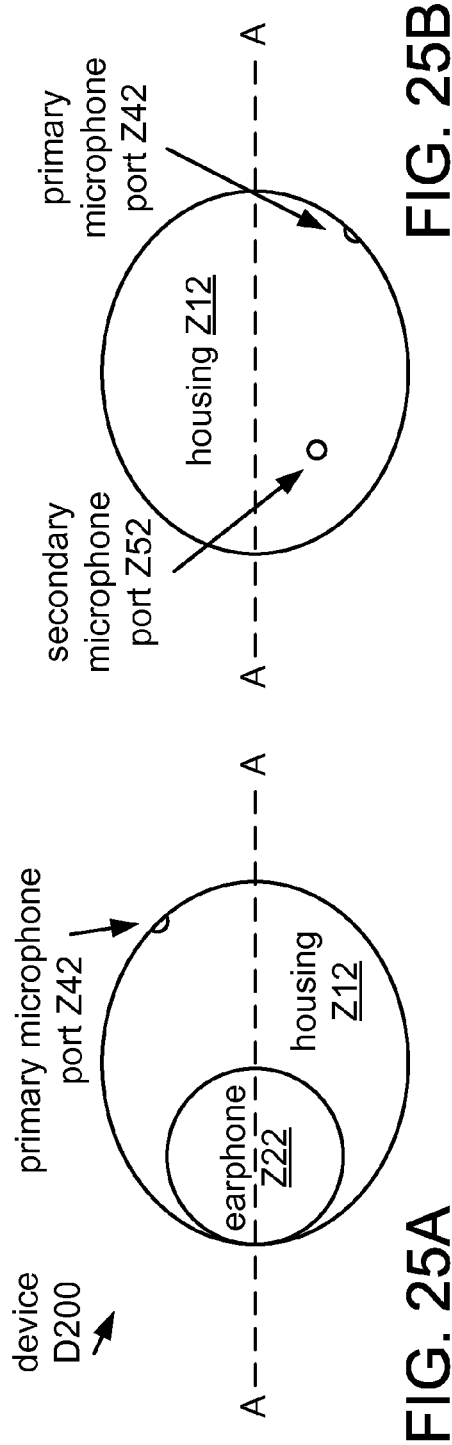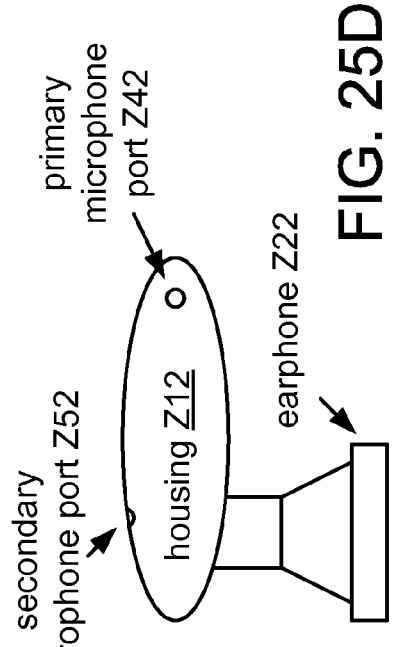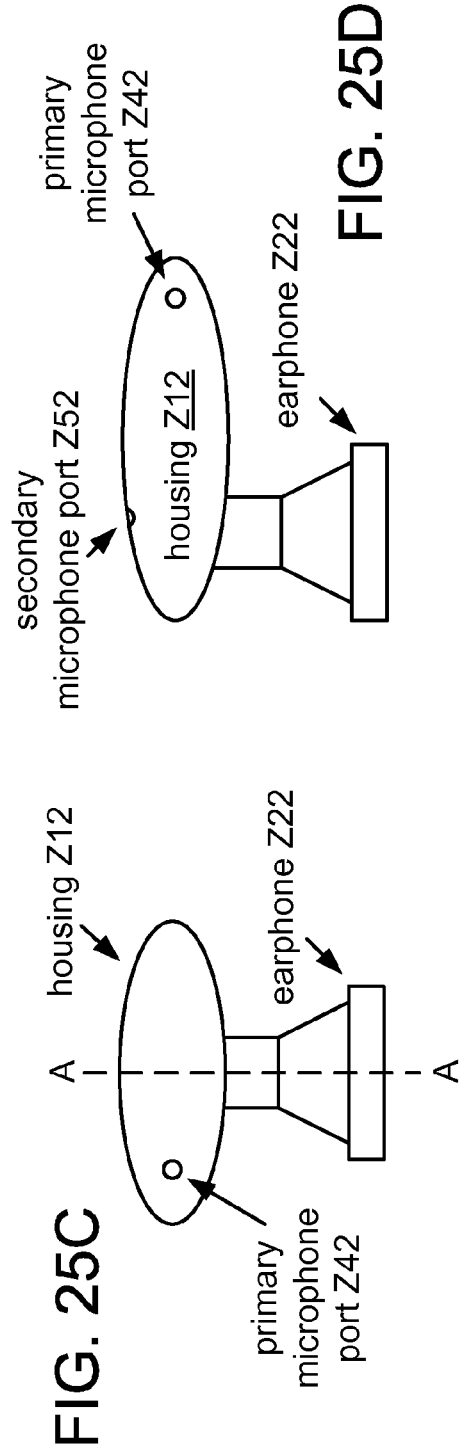
FIG. 25A  FIG. 25B  FIG. 25C  FIG. 25D

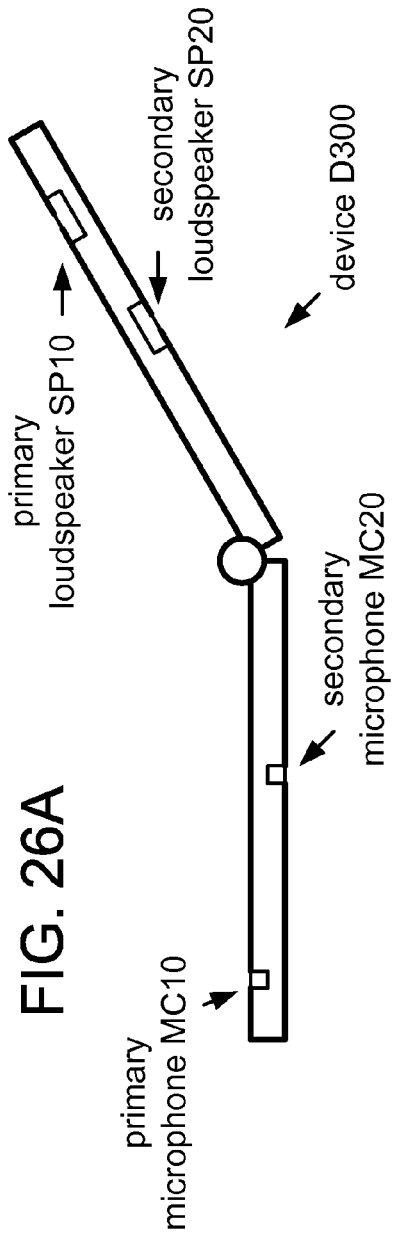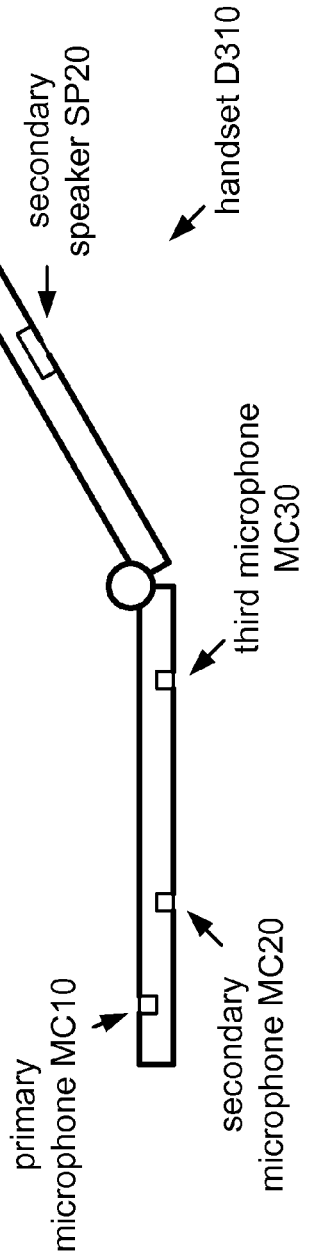
FIG. 26A
FIG. 26B

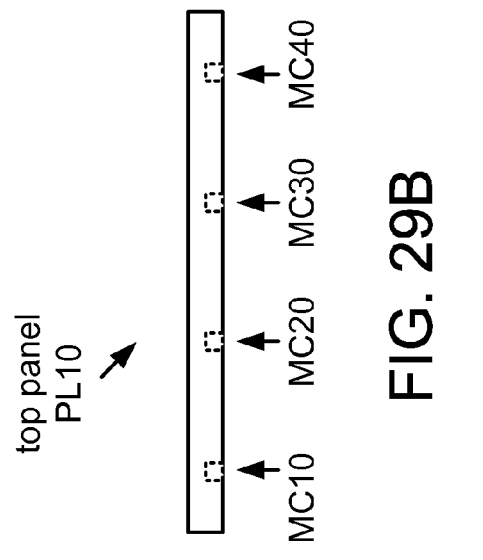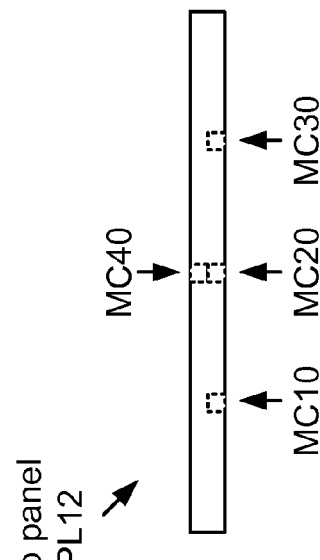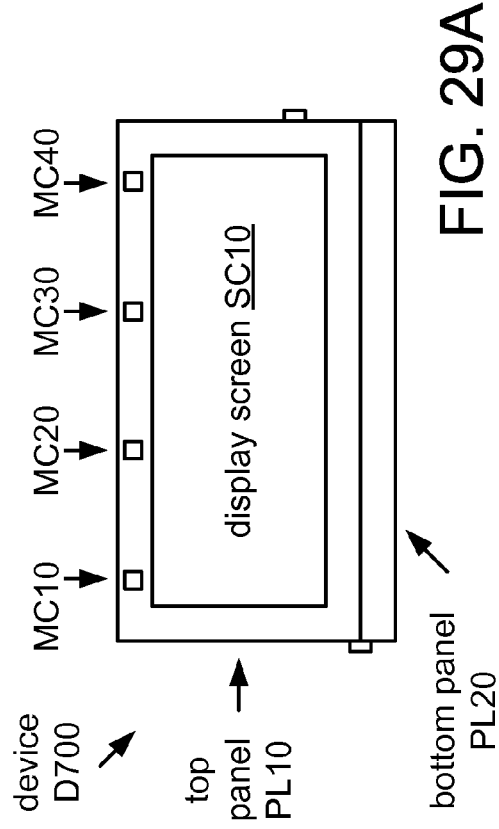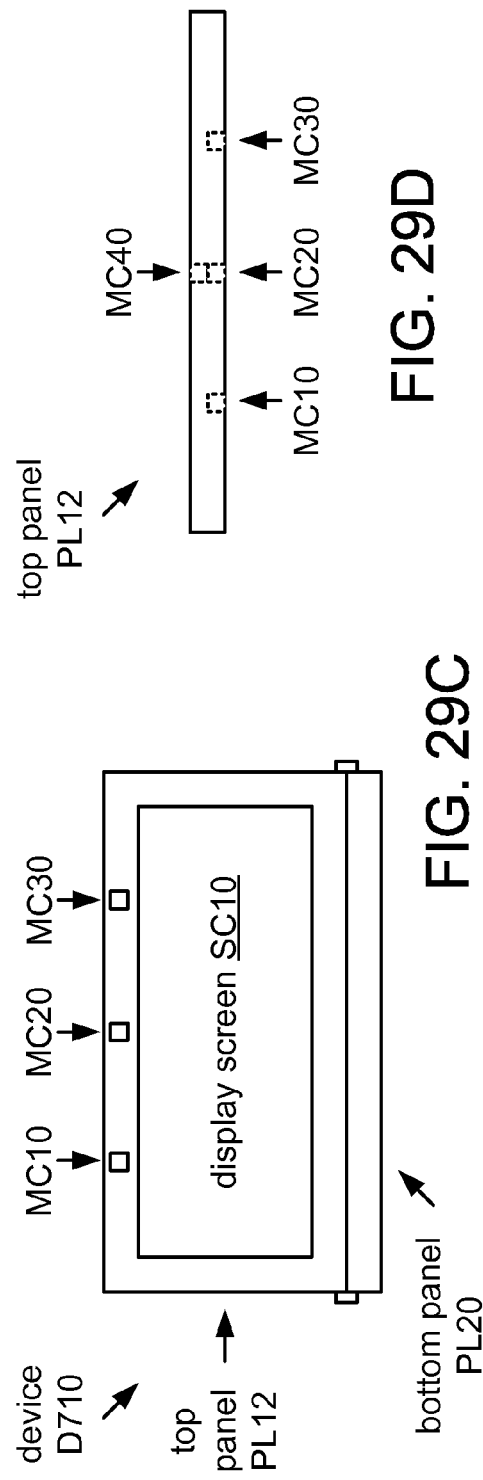
FIG. 29A
FIG. 29B
FIG. 29C
FIG. 29D

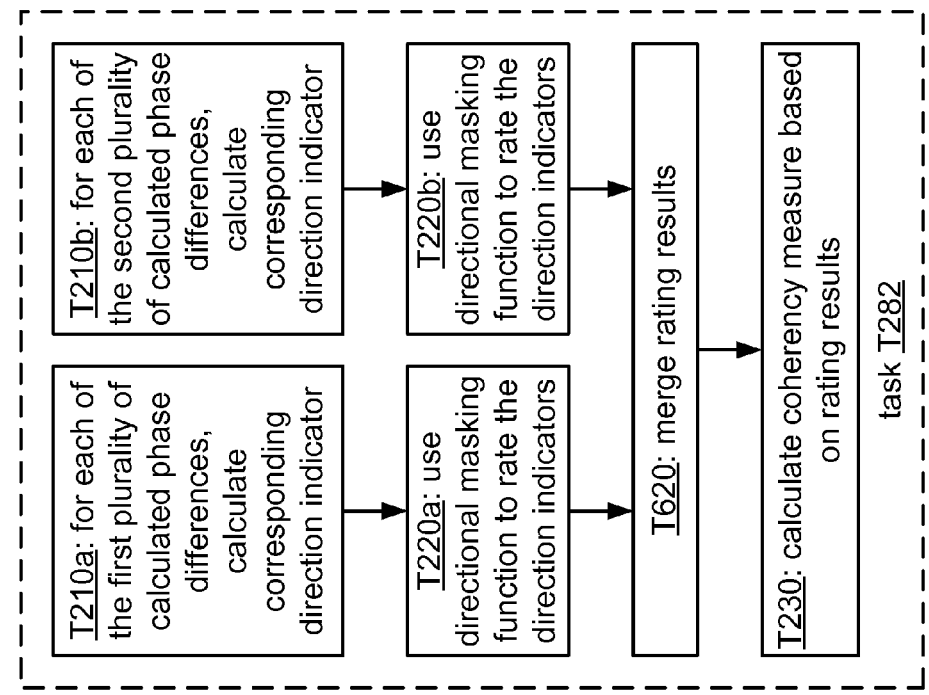
FIG. 31C
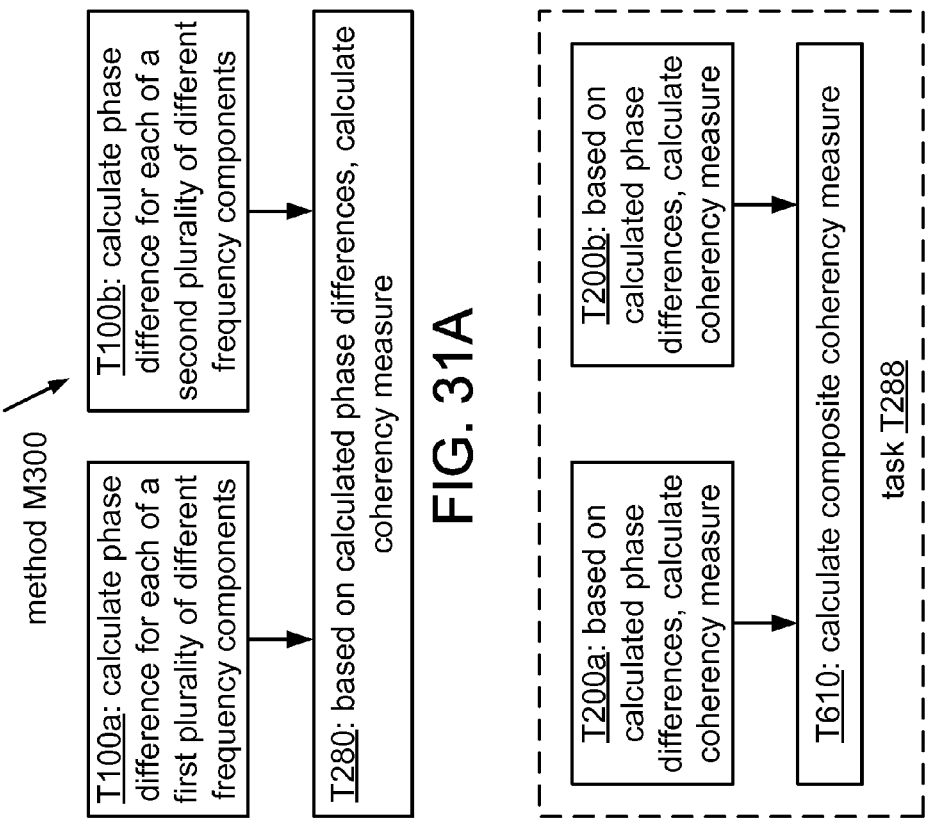
FIG. 31A
FIG. 31B

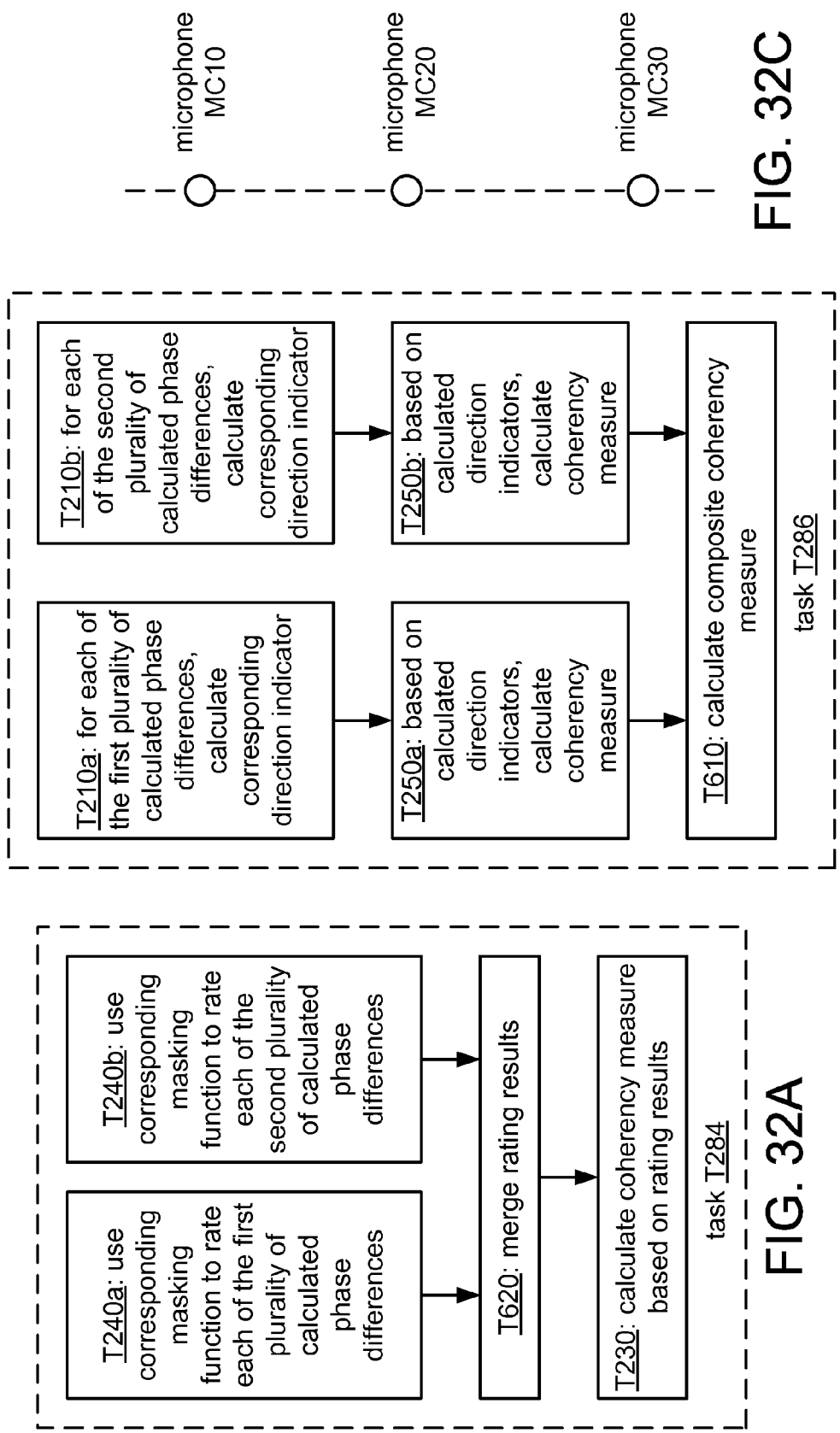

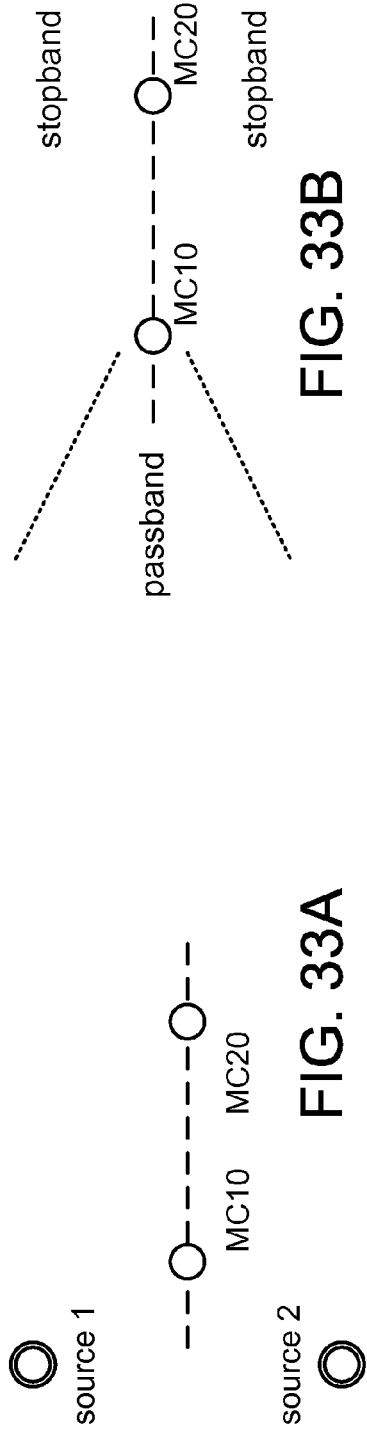
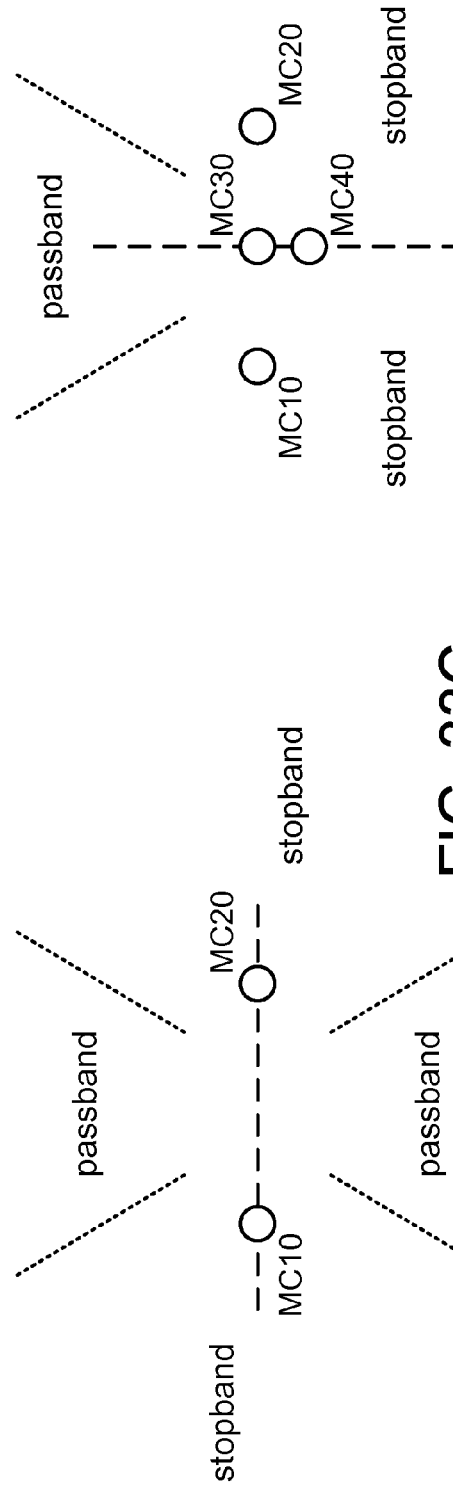
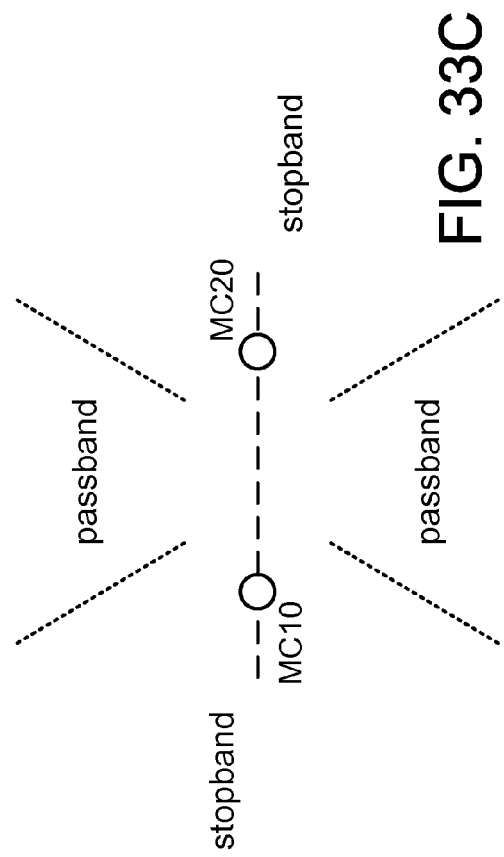
FIG. 33A
FIG. 33B
FIG. 33C
FIG. 33D

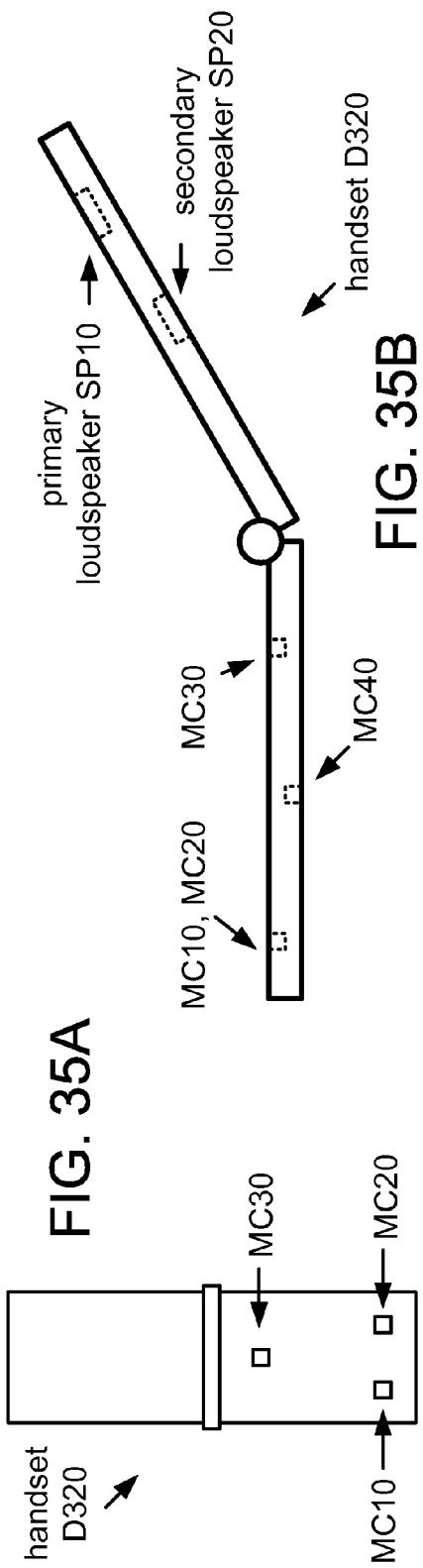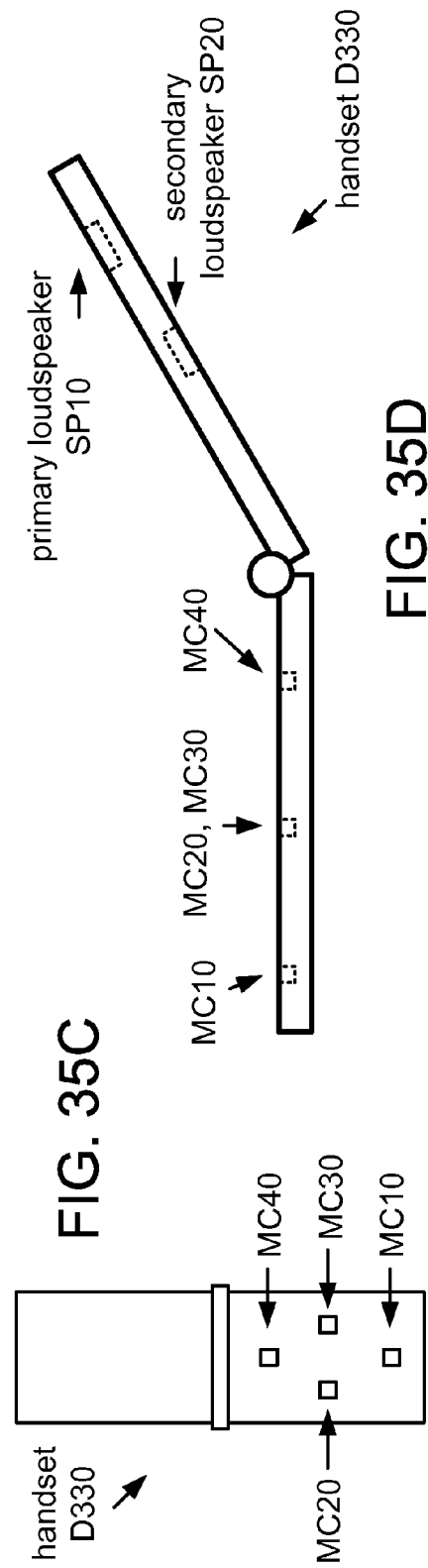

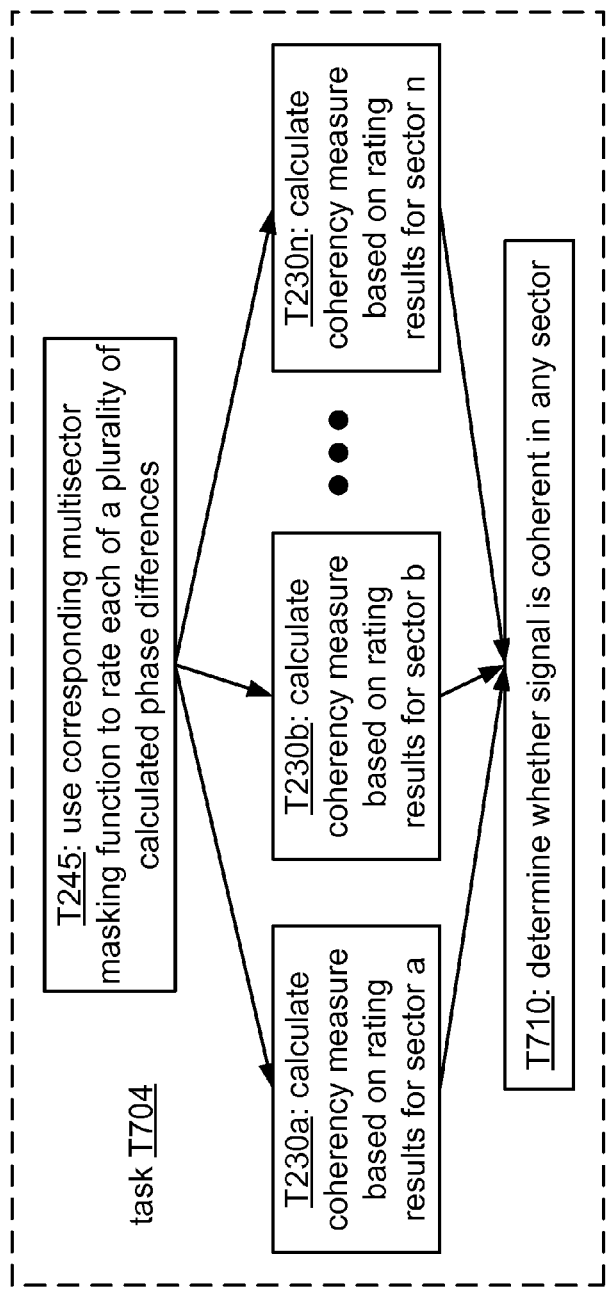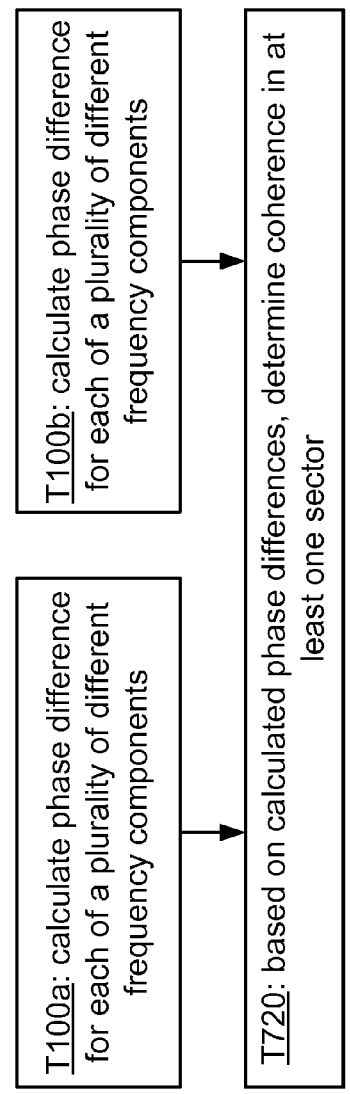

SYSTEMS, METHODS, APPARATUS, AND COMPUTER-READABLE MEDIA FOR COHERENCE DETECTION

CLAIM OF PRIORITY UNDER 35 U.S.C. §119

The present Application for Patent claims priority to U.S. Provisional Pat. Appl. No. 61/108,447, entitled "Motivation for multi mic phase correlation based masking scheme," filed Oct. 24, 2008 and assigned to the assignee hereof. The present Application for Patent also claims priority to U.S. Provisional Pat. Appl. No. 61/185,518, entitled "Systems, methods, apparatus, and computer-readable media for coherence detection," filed Jun. 9, 2009 and assigned to the assignee hereof. The present Application for Patent also claims priority to U.S. Provisional Pat. Appl. No. 61/240,318, entitled "Systems, methods, apparatus, and computer-readable media for coherence detection," filed Sep. 8, 2009 and assigned to the assignee hereof.

BACKGROUND

1. Field

This disclosure relates to signal processing.

2. Background

Many activities that were previously performed in quiet office or home environments are being performed today in acoustically variable situations like a car, a street, or a café. For example, a person may desire to communicate with another person using a voice communication channel. The channel may be provided, for example, by a mobile wireless handset or headset, a walkie-talkie, a two-way radio, a car-kit, or another communications device. Consequently, a substantial amount of voice communication is taking place using mobile devices (e.g., smartphones, handsets, and/or headsets) in environments where users are surrounded by other people, with the kind of noise content that is typically encountered where people tend to gather. Such noise tends to distract or annoy a user at the far end of a telephone conversation. Moreover, many standard automated business transactions (e.g., account balance or stock quote checks) employ voice recognition based data inquiry, and the accuracy of these systems may be significantly impeded by interfering noise.

For applications in which communication occurs in noisy environments, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from the desired signal and/or any of the other signals. Unless the desired speech signal is separated from the background noise, it may be difficult to make reliable and efficient use of it. In one particular example, a speech signal is generated in a noisy environment, and speech processing methods are used to separate the speech signal from the environmental noise.

Noise encountered in a mobile environment may include a variety of different components, such as competing talkers, music, babble, street noise, and/or airport noise. As the signature of such noise is typically nonstationary and close to the user's own frequency signature, the noise may be hard to model using traditional single microphone or fixed beamforming type methods. Single microphone noise reduction techniques typically require significant parameter tuning to achieve optimal performance. For example, a suitable noise reference may not be directly available in such cases, and it may be necessary to derive a noise reference indirectly. Therefore multiple microphone based advanced signal processing may be desirable to support the use of mobile devices for voice communications in noisy environments.

SUMMARY

A method of processing a multichannel signal according to a general configuration includes calculating, for each of a plurality of different frequency components of the multichannel signal, a difference between a phase of the frequency component in a first channel of the multichannel signal and a phase of the frequency component in a second channel of the multichannel signal. This method also includes calculating, based on information from the plurality of calculated phase differences, a value of a coherency measure that indicates a degree of coherence among the directions of arrival of at least the plurality of different frequency components. Computer-readable media storing machine-executable instructions for performing such a method, apparatus configured to perform such a method, and systems containing such apparatus are also disclosed herein.

An apparatus for processing a multichannel signal according to a general configuration includes means for calculating, for each of a plurality of different frequency components of the multichannel signal, a difference between a phase of the frequency component in a first channel of the multichannel signal and a phase of the frequency component in a second channel of the multichannel signal. Such an apparatus also includes means for calculating, based on information from the plurality of calculated phase differences, a value of a coherency measure that indicates a degree of coherence among the directions of arrival of at least the plurality of different frequency components.

An apparatus for processing a multichannel signal according to another general configuration includes a phase difference calculator configured to calculate, for each of a plurality of different frequency components of the multichannel signal, a difference between a phase of the frequency component in a first channel of the multichannel signal and a phase of the frequency component in a second channel of the multichannel signal. Such an apparatus also includes a coherency measure calculator configured to calculate, based on information from the plurality of calculated phase differences, a value of a coherency measure that indicates a degree of coherence among the directions of arrival of at least the plurality of different frequency components

BRIEF DESCRIPTION OF THE DRAWINGS

FIG. 1A shows a flowchart of a method M100 according to a general configuration.

FIG. 1B shows a flowchart of an implementation T102 of task T100.

FIG. 1C shows a flowchart of an implementation T112 of task T110.

FIG. 2A shows a flowchart of an implementation T202 of task T200.

FIG. 2B shows a flowchart of an alternate implementation T204 of task T200.

FIG. 2C shows a flowchart of an alternate implementation T206 of task T200.

FIG. 3A shows an example of a geometric approximation that illustrates an approach to estimating direction of arrival θ.

FIGS. 3B to 3D show examples of three different profiles for a masking function.

FIGS. 8A to 8D show examples of four different profiles for a nonlinear masking function.

FIG. 11A shows a flowchart of an implementation M200 of method M100.

FIG. 11B shows a flowchart of an implementation T302 of task T300.

FIGS. 11C, 11D, and 11E show flowcharts of implementations T312, T314, and T316, respectively, of task T310.

FIG. 14A shows a flowchart of an implementation T306 of task T300.

FIG. 14B shows a flowchart of an implementation T308 of task T300.

FIG. 14C shows a flowchart of an implementation T3082 of task T308.

FIG. 16A shows a flowchart of an implementation T3164 of task T316.

FIG. 16B shows a flowchart of an implementation T402 of task T400.

FIG. 16C shows a flowchart of an implementation T502 of task T500.

FIG. 18A shows a block diagram of an apparatus A10 according to a general configuration.

FIG. 18B shows a block diagram of an implementation A100 of apparatus A10.

FIG. 18C shows a block diagram of an implementation A20 of apparatus A10.

FIG. 18D shows a block diagram of an implementation A200 of apparatus A20.

FIG. 18E shows a block diagram of an implementation A12 of apparatus A10.

FIG. 18F shows a block diagram of an implementation A120 of apparatus A12.

FIG. 20A shows a block diagram of an implementation A13 of apparatus A10.

FIG. 20B shows a block diagram of an implementation A130 of apparatus A13.

FIG. 20C shows a block diagram of an implementation A14 of apparatus A10.

FIG. 20D shows a block diagram of an implementation A140 of apparatus A14.

FIG. 20E shows a block diagram of an implementation A24 of apparatus A14 and A20.

FIG. 20F shows a block diagram of an implementation A240 of apparatus A140 and A200.

FIG. 22A shows a block diagram of an implementation R200 of array R100.

FIG. 22B shows a block diagram of an implementation R210 of array 8200.

FIGS. 24A to 24D show various views of a multi-microphone wireless headset D100.

FIGS. 25A to 25D show various views of a multi-microphone wireless headset D200.

FIG. 26A shows a cross-sectional view (along a central axis) of a multi-microphone communications handset D300.

FIG. 26B shows a cross-sectional view of an implementation D310 of device D300.

FIGS. 29A and 29B show front and top views, respectively, of a device D700.

FIGS. 29C and 29D show front and top views, respectively, of a device D710.

FIG. 31A shows a flowchart of method M300.

FIG. 31B shows a flowchart of an implementation T288 of task T280.

FIG. 31C shows a flowchart of an implementation T282 of task T280.

FIG. 32A shows a flowchart of an implementation T284 of task T280.

FIG. 32B shows a flowchart of an implementation T286 of task T280.

FIG. 32C shows one example of a multi-pair implementation of array R100.

FIG. 33A shows a two-microphone array and two sources.

FIG. 33B shows a two-microphone array and an endfire-directed masking function.

FIG. 33C shows a two-microphone array and an broadside-directed masking function.

FIG. 33D shows a four-microphone array and an endfire-directed masking function.

FIG. 35A shows a front view of an implementation D320 of handset D300.

FIG. 35B shows a side view of handset D320.

FIG. 35C shows a front view of an implementation D330 of handset D300.

FIG. 35D shows a side view of handset D330.

FIG. 38A shows a flowchart of an implementation T704 of task T700.

FIG. 38B shows a flowchart of an implementation M410 of method M400.

DETAILED DESCRIPTION

Figure 4:
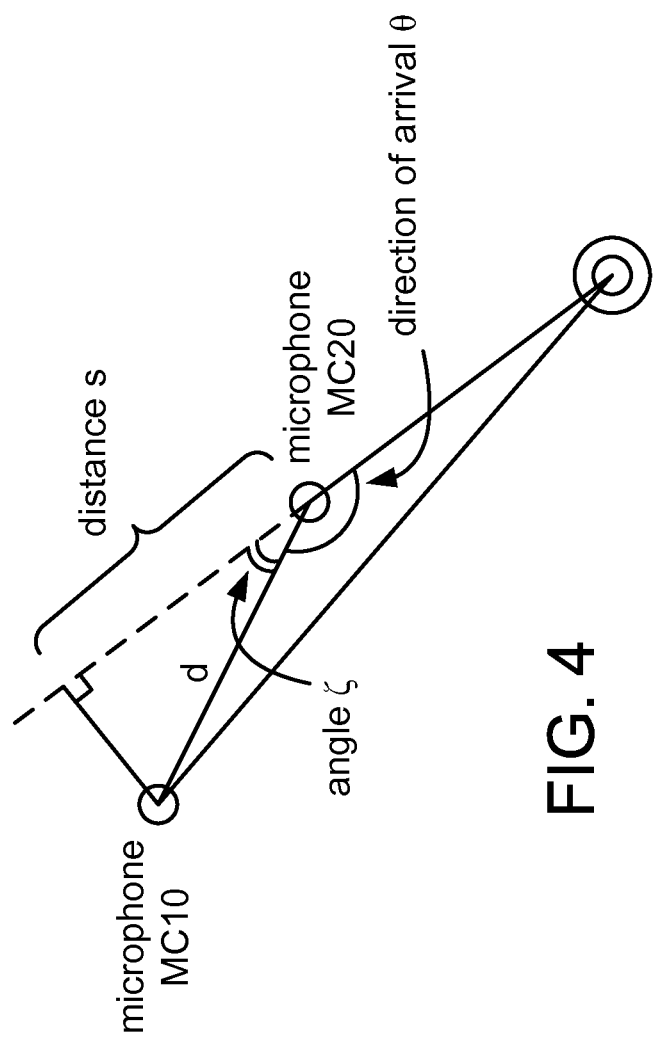
FIG. 4 shows another example of the geometric approximation illustrated in FIG. 3A.

The real world abounds from multiple noise sources, including single point noise sources, which often transgress into multiple sounds resulting in reverberation. Background acoustic noise may include numerous noise signals generated by the general environment and interfering signals generated by background conversations of other people, as well as reflections and reverberation generated from a desired sound signal and/or any of the other signals.

Environmental noise may affect the intelligibility of a sensed audio signal, such as a near-end speech signal. It may be desirable to use signal processing to distinguish a desired audio signal from background noise. For applications in which communication may occur in a noisy environment, for example, it may be desirable to use a speech processing method to distinguish a speech signal from background noise and enhance its intelligibility. Such processing may be important in many areas of everyday communication, as noise is almost always present in real-world conditions.

Multi-microphone noise reduction schemes for handsets and headsets include beamforming approaches (e.g., generalized sidelobe cancellation (GSC), minimum variance distortionless response (MVDR), and/or linearly constrained minimum variance (LCMV) beamformers) and blind source separation (BSS) approaches. Such approaches typically suffer from an inability to suppress noise that arrives from the same direction as the desired sound (e.g., the voice of a near-field speaker). Especially in headsets and mid-field or far-field handset applications (e.g., browse-talk and speakerphone modes), the multichannel signal recorded by the microphone array may include sound from interfering noise sources and/or significant reverberation of a desired near-field talker's speech. For headsets in particular, the large distance to the user's mouth may allow the microphone array to pick up a large amount of noise from frontal directions that may be difficult to suppress significantly using only directional information.

The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

It may be desirable to implement a signal processing scheme that discriminates between sounds from near-field and far-field sources (e.g., for better noise reduction). It may be desirable, for example, to differentiate between sound from a desired near-field talker and sound from a far-field source that arrives from the same direction. One amplitude- or gain-based example of such a scheme uses a pressure gradient field between two microphones to determine whether a source is near-field or far-field. While such a technique may be useful for reducing noise from a far-field source during near-field silence, however, it may not support discrimination between near-field and far-field signals when both sources are active. Such a technique is also typically highly dependent on accurate gain calibration of the microphones relative to one another, which may be difficult and/or impractical (e.g., expensive and/or time-consuming) to achieve. It may be desirable to reduce far-field signals during both near-field source silence and near-field source activity, and/or to discriminate between signals from near-field and far-field sources, with little or no dependence on microphone gain calibration.

This disclosure includes descriptions of systems, methods, and apparatus that are configured to determine directional coherence among various frequency components of a multichannel signal (e.g., as produced by a microphone array). It may be desirable to configure such a system, method, or apparatus to determine directional coherence based on a difference, at each of a plurality of different frequencies, between estimated phases of the channels of the signal. Such configurations are also referred to herein as "phase-based." A phase-based configuration may use a scheme, for example, that determines directional coherence according to a correlation (e.g., the strength of a linear relationship) between a plurality of different frequencies and the estimated phase difference at each of the plurality of different frequencies. Such schemes are also referred to herein as "phase-correlation-based."

A microphone array produces a multichannel signal in which each channel is based on the response of a corresponding one of the microphones to the acoustic environment. When the array receives a sound that originates from a far-field source, the resulting multichannel signal will typically be less directionally coherent than for a received sound that originates from a near-field source. For example, the phase differences between microphone channels at each of a plurality of different frequency components will typically be less correlated with frequency for a received sound that originates from a far-field source than for a received sound that originates from a near-field source. When the array receives sound from a desired near-field source in one direction and sound from an interfering near-field source in a different direction, the signal produced by the array in response to each sound will typically be coherent in the corresponding direction.

It may be desirable to use a phase-based or phase-correlation-based scheme to identify time-frequency points that exhibit undesired phase difference characteristics (e.g., phase differences that are uncorrelated with frequency and/or that are correlated with frequency but indicate coherence in an undesired direction). Such identification may include performing a directional masking operation on the recorded multichannel signal. A directional masking operation may include, for example, applying a directional masking function (or "mask") to results of a phase analysis of a multichannel signal in order to discard a large number of time-frequency points of the signal. A large reduction in power of a masked signal as compared to the recorded signal may be used to indicate the presence of a far-field source and/or an interfering near-field source in that particular time interval, and it may be desirable to attenuate one or more channels of the recording over that interval. Such a method may be configured, for example, to attenuate undesired time-frequency points in a primary channel of the multichannel signal (i.e., a channel that is based on the signal produced by a primary microphone, such as the microphone that is oriented to receive the user's voice most directly).

The range of applications for phase-based or phase-correlation-based directional coherence schemes (e.g., masking schemes) includes reduction of nonstationary diffuse and/or directional noise; dereverberation of sound produced by a near-field desired speaker; removal of noise that is uncorrelated between the microphone channels (e.g., wind and/or sensor noise); suppression of sound from undesired directions; suppression of far-field signals from any direction; estimation of direct-path-to-reverberation signal strength (e.g., for significant reduction of interference from far-field sources); reduction of nonstationary noise through discrimination between near- and far-field sources; and reduction of sound from a frontal interferer during near-field desired source activity as well as during pauses, which is not typically achievable with gain-based approaches.

In a communications headset having a two-microphone array, a phase-based masking scheme may be used to discriminate between near- and far-field talkers and therefore to reduce far-field interference regardless of its direction of arrival. Such discrimination between sound from near-field and far-field sources is not typically available in current noise reduction schemes and may be expected to add a significant benefit to headset performance. In a communications handset having a four-microphone array, a phase-based masking approach may be used to obtain significant dereverberation of sound from a near-field talker and/or reduction of nonstationary noise for a browse-talk mode (i.e., a device usage mode in which the user is engaged in a voice communications session, such as a telephone call, while viewing a display screen of the device).

It may be desirable to perform a phase-based scheme on a multichannel recorded input upstream of one or more other processing operations. For example, results from a phase-based or phase-correlation-based operation may be used to support various further applications, such as a gain calibration operation, a spatially selective processing operation, and/or a noise reduction operation on the recorded input.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

This description includes disclosure of systems, methods, and apparatus that apply information regarding the inter-microphone distance and a correlation between frequency and inter-microphone phase difference to determine whether a certain frequency component of a sensed multichannel signal originated from within a range of allowable inter-microphone angles or from outside it. Such a determination may be used to discriminate between signals arriving from different directions (e.g., such that sound originating from within that range is preserved and sound originating outside that range is suppressed) and/or to discriminate between near-field and far-field signals.

In a typical application, such a system, method, or apparatus is used to calculate a direction of arrival with respect to a microphone pair for each time-frequency point of the multichannel signal. A directional masking function may be applied to these results to distinguish points having directions of arrival within a desired range from points having other directions of arrival. Results from the masking operation may be used to remove signals from undesired directions by discarding or attenuating time-frequency points having directions of arrival outside the mask. For example, it may be desirable to compute a histogram of direction of arrival over all time-frequency points (e.g., by computing the number of measured time-frequency points that map to each direction of arrival) and to select a desired direction from the histogram.

FIG. 1A shows a flowchart for a method M100 of processing a multichannel signal according to a general configuration. Method M100 includes a task T100 that calculates a phase difference between channels of the multichannel signal (e.g., microphone channels) for each of a plurality of different frequency components of the signal, and a task T200 that calculates a coherency measure based on the calculated phase differences.

Method M100 may be configured to process the multichannel signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the multichannel signal is divided into a series of nonoverlapping segments or "frames", each having a length of ten milliseconds. Task T100 may be configured to calculate a set (e.g., a vector) of phase differences, and task T200 may be configured to calculate a coherency measure, for each of the segments. A segment as processed by method M100 may also be a segment (i.e., a "subframe") of a larger segment as processed by a different operation, or vice versa.

FIG. 1B shows a flowchart of an implementation T102 of task T100. For each microphone channel, task T102 includes a respective instance of a subtask T110 that estimates the phase for the channel for each of the different frequency components. FIG. 1C shows a flowchart of an implementation T112 of task T110 that includes subtasks T1121 and T1122. Task T1121 calculates a frequency transform of the channel, such as a fast Fourier transform (FFT) or discrete cosine transform (DCT). Task T1121 is typically configured to calculate the frequency transform of the channel for each segment. It may be desirable to configure task T1121 to perform a 128-point or 256-point FFT of each segment, for example. An alternate implementation of task T1121 is configured to separate the various frequency components of the channel using a bank of subband filters.

Task T1122 calculates (e.g., estimates) the phase of the microphone channel for each of the different frequency components (also called "bins"). For each frequency component to be examined, for example, task T1122 may be configured to estimate the phase as the inverse tangent (also called the arctangent) of the ratio of the imaginary term of the corresponding FFT coefficient to the real term of the FFT coefficient.

Task T102 also includes a subtask T120 that calculates a phase difference $\Delta\phi$ for each of the different frequency components, based on the estimated phases for each channel. Task T120 may be configured to calculate the phase difference by subtracting the estimated phase for that frequency component in one channel from the estimated phase for that frequency component in another channel. For example, task T120 may be configured to calculate the phase difference by subtracting the estimated phase for that frequency component in a primary channel from the estimated phase for that frequency component in another (e.g., secondary) channel. In such case, the primary channel may be the channel expected to have the highest signal-to-noise ratio, such as the channel corresponding to a microphone that is expected to receive the user's voice most directly during a typical use of the device.

It may be desirable to configure method M100 (or a system or apparatus configured to perform such a method) to determine directional coherence between channels of the multichannel signal over a wideband range of frequencies. Such a wideband range may extend, for example, from a low frequency bound of zero, fifty, one hundred, or two hundred Hz to a high frequency bound of three, 3.5, or four kHz (or even higher, such as up to seven or eight kHz or more). However, it may be unnecessary for task T100 to calculate phase differences across the entire bandwidth of the signal. For many bands in such a wideband range, for example, phase estimation may be impractical or unnecessary. The practical valuation of phase relationships of a received waveform at very low frequencies typically requires correspondingly large spacings between the transducers. Consequently, the maximum available spacing between microphones may establish a low frequency bound. On the other end, the distance between microphones should not exceed half of the minimum wavelength in order to avoid spatial aliasing. An eight-kilohertz sampling rate, for example, gives a bandwidth from zero to four kilohertz. The wavelength of a four-kHz signal is about 8.5 centimeters, so in this case, the spacing between adjacent microphones should not exceed about four centimeters. The microphone channels may be lowpass filtered in order to remove frequencies that might give rise to spatial aliasing.

It may be desirable to target specific frequency components, or a specific frequency range, across which a speech signal (or other desired signal) may be expected to be directionally coherent. It may be expected that background noise, such as directional noise (e.g., from sources such as automobiles) and/or diffuse noise, will not be directionally coherent over the same range. Speech tends to have low power in the range from four to eight kilohertz, so it may be desirable to forego phase estimation over at least this range. For example, it may be desirable to perform phase estimation and determine directional coherency over a range of from about seven hundred hertz to about two kilohertz.

Accordingly, it may be desirable to configure task T1122 to calculate phase estimates for fewer than all of the frequency components produced by task T1121 (e.g., for fewer than all of the frequency samples of an FFT performed by task T1121). In one example, task T1122 calculates phase estimates for the frequency range of 700 Hz to 2000 Hz. For a 128-point FFT of a four-kilohertz-bandwidth signal, the range of 700 to 2000 Hz corresponds roughly to the twenty-three frequency samples from the tenth sample through the thirty-second sample.

Based on information from the phase differences calculated by task T100, task T200 calculates a coherency measure for the multichannel signal. FIG. 2A shows a flowchart of an implementation T202 of task T200 that includes a subtask T210. For each of a plurality of the calculated phase differences from task T100, task T210 calculates a corresponding direction indicator.

Task T210 may be configured to calculate each of the direction indicators as a direction of arrival $\theta_i$ of the corresponding frequency component $f_i$ of the multichannel signal. For example, task T210 may be configured to estimate the direction of arrival $\theta_i$ as the inverse cosine (also called the arccosine) of the quantity $$\frac{c\Delta\varphi_i}{d2\pi f_i},$$

where c denotes the speed of sound (approximately 340 m/sec), d denotes the distance between the microphones, $\Delta\varphi_i$ denotes the difference in radians between the corresponding phase estimates for the two microphones, and $f_i$ is the frequency component to which the phase estimates correspond (e.g., the frequency of the corresponding FFT samples, or a center or edge frequency of the corresponding subbands). Alternatively, task T210 may be configured to estimate the direction of arrival $\theta_i$ as the inverse cosine of the quantity $$\frac{\lambda_i \Delta\varphi_i}{d2\pi},$$

where $\lambda_i$ denotes the wavelength of frequency component $f_i$.

FIG. 3A shows an example of a geometric approximation that illustrates this approach to estimating direction of arrival $\theta$ with respect to microphone MC20 of a two-microphone array MC10, MC20. In this example, a value of $\theta_i=0$ indicates a signal arriving at microphone MC20 from a reference endfire direction (i.e., the direction of microphone MC10), a value of $\theta_i=\pi$ indicates a signal arriving from the other endfire direction, and a value of $\theta_i=\pi/2$ indicates a signal arriving from a broadside direction. In another example, task T210 may be configured to evaluate $\theta_i$ with respect to a different reference position (e.g., microphone MC10 or some other point, such as a point midway between the microphones) and/or a different reference direction (e.g., the other endfire direction, a broadside direction, etc.).

The scheme illustrated in FIG. 3A may be used for positive values of $\Delta\varphi_i$ (e.g., from zero to $\pi/2$). FIG. 4 shows an example of using the same approximation for negative values of $\Delta\varphi_i$ (e.g., from zero to $-\pi/2$). In this case, an inverse cosine may be calculated as described above to evaluate the angle $\xi$, which is then subtracted from $\pi$ radians to yield direction of arrival $\theta_i$. For cases in which only positive values of $\Delta\varphi_i$ (e.g., the forward endfire lobe) are of interest, calculation of direction of arrival $\theta_i$ may be unnecessary when $\Delta\varphi_i$ is negative. For example, it may be desired to reject, or otherwise classify as noise, any component for which $\Delta\varphi_i$ is negative. The practicing engineer will also understand that direction of arrival $\theta_i$ may be expressed in degrees or any other units appropriate for the particular application instead of radians.

As noted above, calculation of direction of arrival $\theta_i$ may be performed according to a geometric approximation as illustrated in FIGS. 3A and 4. This approximation assumes that the distance s is equal to the distance L, where s is the distance between the position of microphone MC20 and the orthogonal projection of the position of microphone MC10 onto the line between the sound source and microphone MC20, and L is the actual difference between the distances of each microphone to the sound source. The error (s−L) becomes smaller as the direction of arrival $\theta$ with respect to microphone MC20 approaches zero. This error also becomes smaller as the relative distance between the sound source and the microphone array increases.

In an alternative implementation, task T210 is configured to calculate each of the direction indicators as a time delay of arrival $\tau_i$ (e.g., in seconds) of the corresponding frequency component $f_i$ of the multichannel signal. Task T210 may be configured to estimate the time delay of arrival $\tau_i$ at microphone MC20 with reference to microphone MC10, using an expression such as $$\tau_i = \frac{\lambda_i \Delta\varphi_i}{c2\pi} \text{ or } \tau_i = \frac{\Delta\varphi_i}{2\pi f_i}.$$

In these examples, a value of $\tau_i=0$ indicates a signal arriving from a broadside direction, a large positive value of $\tau_i$ indicates a signal arriving from the reference endfire direction, and a large negative value of $\tau_i$ indicates a signal arriving from the other endfire direction. For cases in which only positive values of $\Delta\varphi_i$ (e.g., the forward endfire lobe) are of interest, calculation of time delay of arrival $\tau_i$ may be unnecessary when $\Delta\varphi_i$ is negative. In calculating the values $\tau_i$, it may be desirable to use a unit of time that is deemed appropriate for the particular application, such as sampling periods (e.g., units of 125 microseconds for a sampling rate of 8 kHz) or fractions of a second (e.g., $10^{-3}$, $10^{-4}$, $10^{-5}$, or $10^{-6}$ sec). It is noted that task T210 may also be configured to calculate time delay of arrival $\tau_i$ by cross-correlating the frequency components $f_i$ of each channel in the time domain.

For an ideally directionally coherent signal, the value of $$\frac{\Delta\varphi}{f}$$

is equal to a constant k for all frequencies, where the value of k is related to the direction of arrival $\theta$ and the time delay of arrival $\tau$. In another alternative implementation, task T210 is configured to calculate each of the direction indicators as a ratio $r_i$ between estimated phase difference $\Delta\varphi_i$ and frequency $f_i$ $$\left(\text{e.g., } r_i = \frac{\Delta \varphi_i}{f_i}\right).$$

For cases in which only positive values of $\Delta\varphi_i$ (e.g., the forward endfire lobe) are of interest, calculation of ratio $r_i$ may be unnecessary when $\Delta\varphi_i$ is negative.

It is noted that while the expression $$\theta_i = \cos^{-1}\left(\frac{c\Delta\varphi_i}{d2\pi f_i}\right) \text{ or } \theta_i = \cos^{-1}\left(\frac{\lambda_i \Delta\varphi_i}{d2\pi}\right)$$

calculates the direction indicator $\theta_i$ according to a far-field model (i.e., a model that assumes a planar wavefront), the expressions $$\tau_i = \frac{\lambda_i \Delta\varphi_i}{c2\pi}, \tau_i = \frac{\Delta\varphi_i}{2\pi f_i}, r_i = \frac{\Delta\varphi_i}{f_i}, \text{ and } r_i = \frac{f_i}{\Delta\varphi_i}$$

calculate the direction indicators $\tau_i$ and $r_i$ according to a near-field model (i.e., a model that assumes a spherical wavefront). While a direction indicator that is based on a near-field model may provide a result that is more accurate and/or easier to compute, a direction indicator $\theta_i$ as described above provides a nonlinear mapping of the phase difference that may be useful for applications such as amplitude control (e.g., gain control).

Task T202 also includes a subtask T220 that rates the direction indicators produced by task T210. Task T220 may be configured to rate the direction indicators by converting or mapping the value of the direction indicator, for each frequency component to be examined, to a corresponding value on an amplitude, magnitude, or pass/fail scale. For example, task T220 may be configured to use a directional masking function to map the value of each direction indicator to a mask score that indicates whether (and/or how well) the indicated direction falls within the masking function's passband. (In this context, the term "passband" refers to the range of directions of arrival that are passed by the masking function.) The set of mask scores for the various frequency components may be considered as a vector.

The passband of the masking function may be selected to include a desired signal direction. The spatial selectivity of the masking function may be controlled by varying the width of the passband, which may be selected according to a desired tradeoff between admittance range (i.e., the range of directions of arrival or time delays that are passed by the function) and noise rejection. While a wide passband may allow for greater user mobility and flexibility of use, it would also be expected to allow more of the environmental noise in the multichannel signal to pass through to the output.

Figure 5:
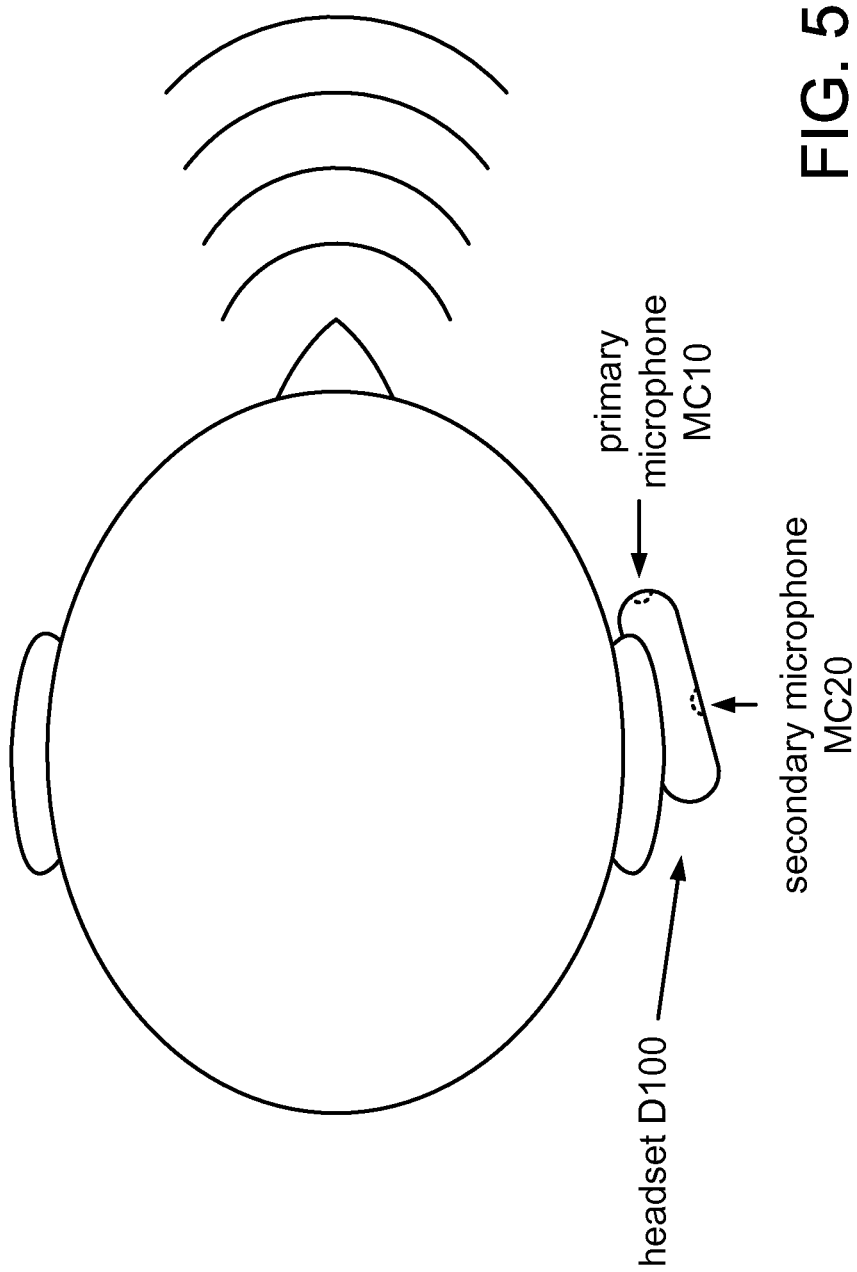
FIG. 5 shows a diagram of headset D100 mounted at a user's ear in a standard orientation relative to the user's mouth.
Figure 6:
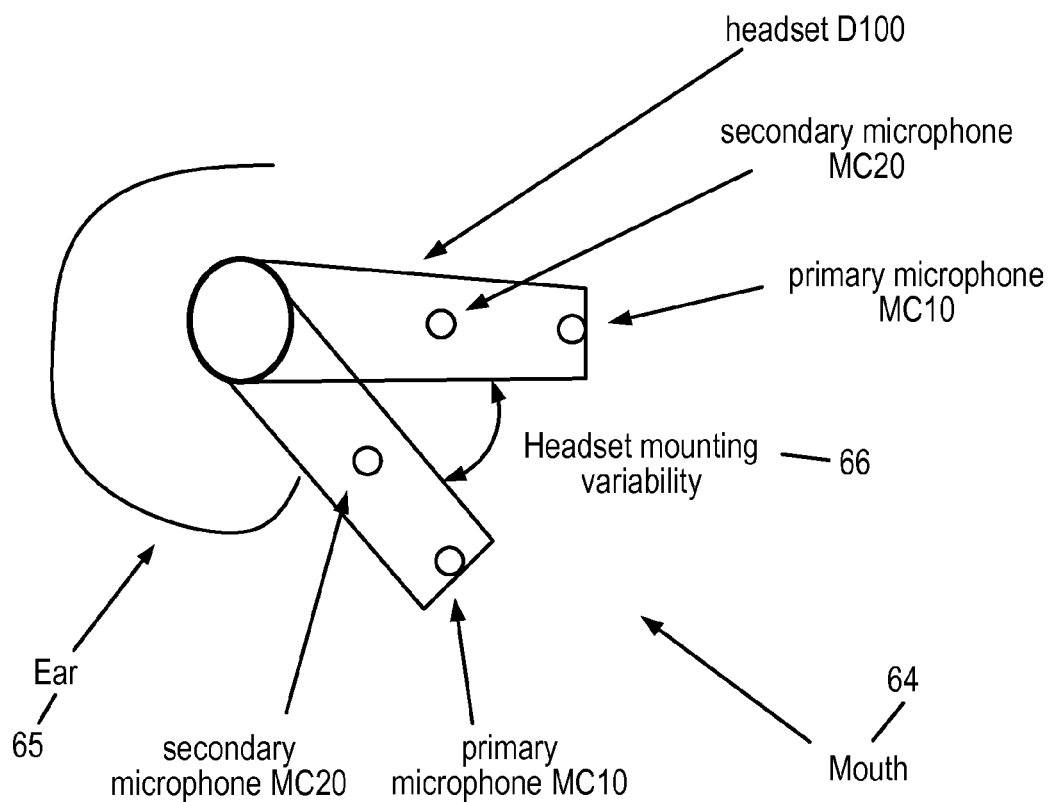
FIG. 6 shows two examples of standard orientations relative to the user's mouth for headset D100.

An audio sensing device is typically held in a certain geometry (i.e., in a standard orientation) with respect to the user's mouth. During normal use, a portable audio sensing device may operate in any among a range of standard orientations relative to a desired sound source. For example, different users may wear or hold a device differently, and the same user may wear or hold a device differently at different times, even within the same period of use (e.g., during a single telephone call). FIG. 5 shows a top view of a headset mounted on a user's ear in a standard orientation relative to the user's mouth, and FIG. 6 shows a side view of two examples in a range of standard orientations of the headset relative to the user's mouth. It may be desirable to select the passband of the masking function according to a desired allowable range of standard orientations. With zero degrees indicating the standard orientation in which the array is pointed most directly at the user's mouth, for example, it may be desirable in a headset application to provide for a passband of from plus forty-five to minus forty-five degrees (over the range of direction of arrival from plus forty-five to minus forty-five degrees).

Figure 7:
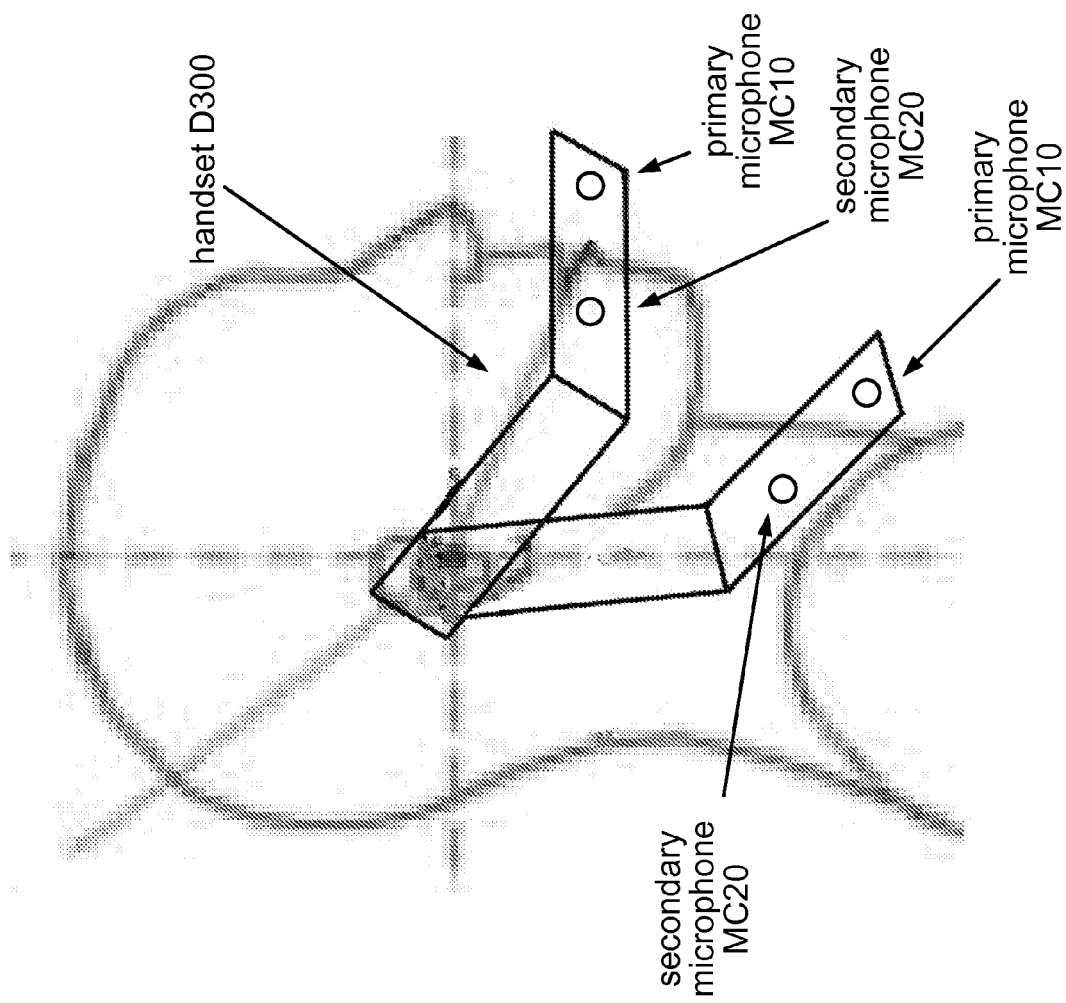
FIG. 7 shows two examples of standard orientations relative to the user's mouth for handset D300.

For a handset, it may be desirable to allow for a greater range of standard orientations than for a headset. For example, with zero degrees indicating the standard orientation in which the array is pointed most directly at the user's mouth, it may be desirable to configure a masking function for a handset application to have a passband of from plus ninety to minus ninety degrees. FIG. 7 shows two examples in a range of standard orientations relative to the user's mouth for a handset.

The directional masking function may be implemented such that the location and/or sharpness of the transition or transitions between stopband and passband are selectable and/or variable during operation according to the values of one or more factors such as signal-to-noise ratio (SNR), noise floor, etc. For example, it may be desirable to use a more narrow passband when the SNR is low.

It may be desirable to select a transfer function of the directional masking function according to a desired application. To obtain a binary-valued output (e.g., for a voice activity detection application), it may be desirable to configure task T220 to use a masking function having relatively sudden transitions between passband and stopband (e.g., a brickwall profile, as shown in FIG. 3B for a masking function having a passband centered at direction of arrival $\theta=\pi/4$). In one such case, task T220 is configured to return a mask score having a first value (e.g., one) when the direction indicator indicates a direction within the function's passband, and a mask score having a second value (e.g., zero) when the direction indicator indicates a direction outside the function's passband.

On the other hand, to obtain a multi-valued output (e.g., for a gain control or other amplitude control application), it may be desirable to configure task T220 to use a masking function having less abrupt transitions between passband and stopband (e.g., a more gradual rolloff). FIG. 3C shows an example of a masking function having a linear rolloff and a passband centered at direction of arrival $\theta=\pi/4$, and FIG. 3D shows an example of a masking function having a nonlinear rolloff and a passband centered at direction of arrival $\theta=\pi/4$.

One example of a nonlinear directional masking function may be expressed as $$m = \frac{1}{1+\exp\left(\gamma\left[|\theta-\theta_T|-\left(\frac{w}{2}\right)\right]\right)},$$

where $\theta_T$ denotes a target direction of arrival, w denotes a desired width of the mask in radians, and $\gamma$ denotes a sharpness parameter. FIGS. 8A-D show examples of such a function for $(\gamma, w, \theta_T)$ equal to $$\left(8, \frac{\pi}{2}, \frac{\pi}{2}\right), \left(20, \frac{\pi}{4}, \frac{\pi}{2}\right), \left(30, \frac{\pi}{2}, 0\right), \text{ and } \left(50, \frac{\pi}{8}, \frac{\pi}{2}\right),$$

respectively. Such a function may also be expressed in terms of time delay $\tau$ or ratio r rather than direction $\theta$.

It is noted that for small intermicrophone distances (e.g., 10 cm or less) and low frequencies (e.g., less than 1 kHz), the observable value of $\Delta\phi$ may be limited. For a frequency component of 200 Hz, for example, the corresponding wavelength is about 170 cm. An array having an intermicrophone distance of one centimeter can observe a maximum phase difference (e.g., at endfire) of only about two degrees for this component. In such case, an observed phase difference greater than two degrees indicates signals from more than one source (e.g., a signal and its reverberation). Consequently, it may be desirable to configure method M100 to detect when a reported phase difference exceeds a maximum value (e.g., the maximum observable phase difference, given the particular intermicrophone distance and frequency). Such a condition may be interpreted as inconsistent with a single source. In one such example, the mask score for the corresponding frequency component is set to the lowest mask score (e.g., zero) when such a condition is detected.

For an application in which it is desired to detect the presence of a directionally coherent signal from a particular type of source, it may be desirable to modify method M100 according to information about other characteristics of the target signal. Potential advantages of such a modification include reducing the search space and excluding noisy data. For a voice activity detection application, for example, it may be desirable to configure method M100 according to information pertaining to one or more characteristics of a speech signal.

Figure 9:
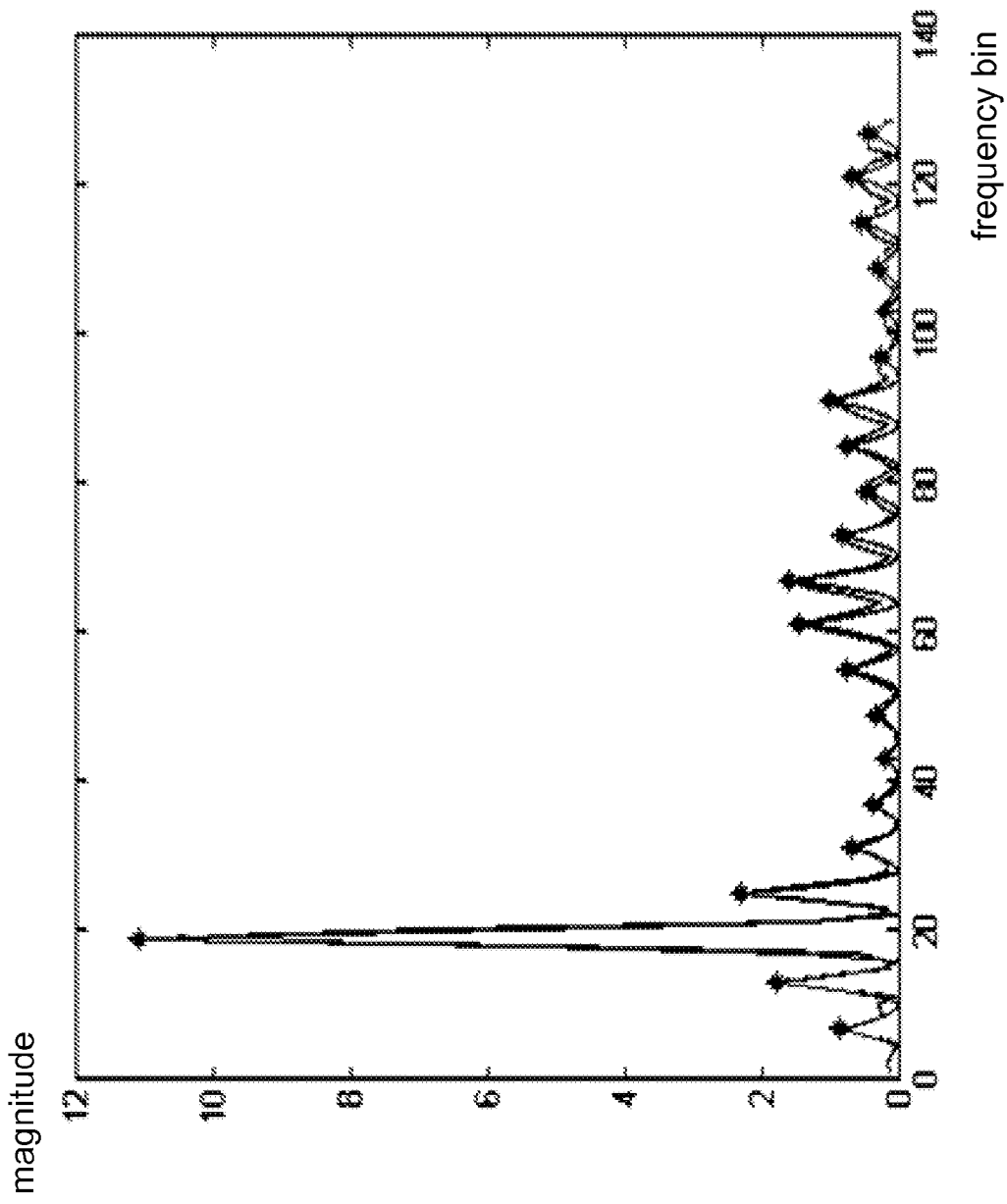
FIG. 9 shows an example of the amplitudes of the first 128 bins of a 256-point FFT of a voiced speech signal.

The energy spectrum of voiced speech (e.g., vowel sounds) tends to have local peaks at harmonics of the pitch frequency. FIG. 9 shows the amplitudes of the first 128 bins of a 256-point FFT of such a signal, with asterisks indicating the peaks. The energy spectrum of background noise, on the other hand, tends to be relatively unstructured. Consequently, components of the input channels at harmonics of the pitch frequency may be expected to have a higher signal-to-noise ratio (SNR) than other components. For a speech processing application of method M100 (e.g., a voice activity detection application), it may be desirable to configure task T100 (for example, to configure task T1122) to consider only phase differences which correspond to multiples of an estimated pitch frequency.

Typical pitch frequencies range from about 70 to 100 Hz for a male speaker to about 150 to 200 Hz for a female speaker. The current pitch frequency may be estimated by calculating the pitch period as the distance between adjacent pitch peaks (e.g., in a primary microphone channel). A sample of an input channel may be identified as a pitch peak based on a measure of its energy (e.g., based on a ratio between sample energy and frame average energy) and/or a measure of how well a neighborhood of the sample is correlated with a similar neighborhood of a known pitch peak. A pitch estimation procedure is described, for example, in section 4.6.3 (pp. 4-44 to 4-49) of EVRC (Enhanced Variable Rate Codec) document C.S0014-C, available online at www-dot-3gpp-dot-org. A current estimate of the pitch frequency (e.g., in the form of an estimate of the pitch period or "pitch lag") will typically already be available in applications that include speech encoding and/or decoding (e.g., voice communications using codecs that include pitch estimation, such as code-excited linear prediction (CELP) and prototype waveform interpolation (PWI)).

Figure 10:
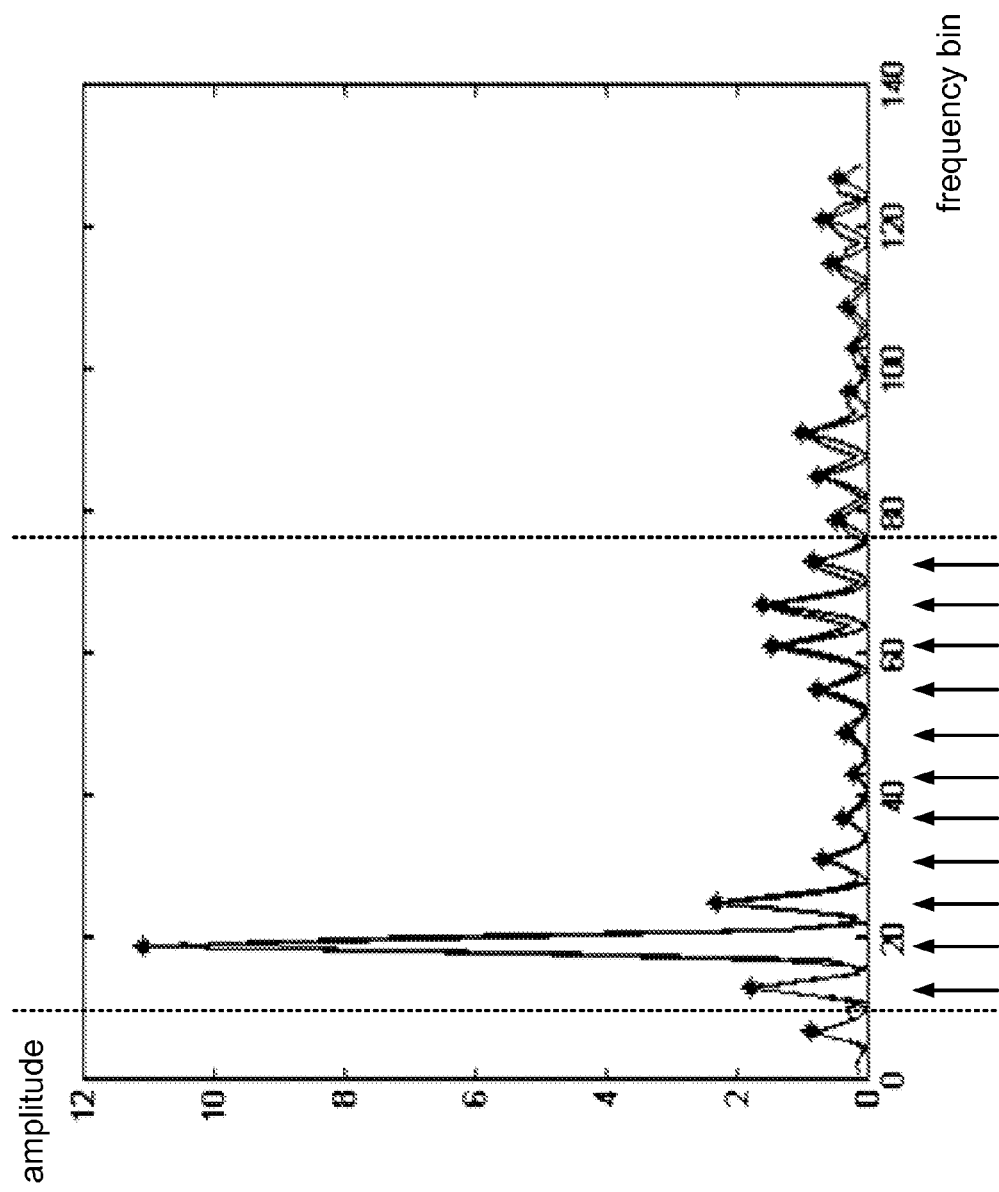
FIG. 10 shows an example of applying an implementation of task T100 (e.g., of task T1122) to the signal whose spectrum is shown in FIG. 9.

FIG. 10 shows an example of applying such an implementation of task T100 (e.g., of task T1122) to the signal whose spectrum is shown in FIG. 9. The dotted lines indicate the frequency range to be considered. In this example, the range extends from the tenth frequency bin to the seventy-sixth frequency bin (approximately 300 to 2500 Hz). By considering only those phase differences that correspond to multiples of the pitch frequency (approximately 190 Hz in this example), the number of phase differences to be considered is reduced from sixty-seven to only eleven. Moreover, it may be expected that the frequency coefficients from which these eleven phase differences are calculated will have high SNRs relative to other frequency coefficients within the frequency range being considered. In a more general case, other signal characteristics may also be considered. For example, it may be desirable to configure task T1122 such that at least twenty-five, fifty, or seventy-five percent of the calculated phase differences correspond to multiples of an estimated pitch frequency. The same principle may be applied to other desired harmonic signals as well. In a related implementation of method M100, task T100 is configured to calculate phase differences for each of the frequency components of at least a subband of the multichannel signal, and task T200 is configured to calculate the value of the coherency measure based on only those phase differences which correspond to multiples of an estimated pitch frequency.

Formant tracking is another speech-characteristic-related procedure that may be included in an implementation of method M100 for a speech processing application (e.g., a voice activity detection application). Formant tracking may be performed using linear predictive coding, hidden Markov models (HMMs), Kalman filters, and/or mel-frequency cepstral coefficients (MFCCs). Formant information is typically already available in applications that include speech encoding and/or decoding (e.g., voice communications using linear predictive coding, speech recognition applications using MFCCs and/or HMMs).

Task T202 also includes a subtask T230 that calculates a coherency measure for the signal based on the rating results. For example, task T230 may be configured to combine the various mask scores that correspond to the frequencies of interest (e.g., components in the range of from 700 to 2000 Hz, and/or components at multiples of the pitch frequency) to obtain a coherency measure. For example, task T230 may be configured to calculate the coherency measure by averaging the mask scores (e.g., by summing the mask scores, or by normalizing the sum to obtain a mean of the mask scores). In such case, task T230 may be configured to weight each of the mask scores equally (e.g., to weight each mask score by one) or to weight one or more mask scores differently from one another (e.g., to weight a mask score that corresponds to a low- or high-frequency component less heavily than a mask score that corresponds to a mid-range frequency component). Alternatively, task T230 may be configured to calculate the coherency measure by calculating a sum of weighted values (e.g., magnitudes) of the frequency components of interest (e.g., components in the range of from 700 to 2000 Hz, and/or components at multiples of the pitch frequency), where each value is weighted by the corresponding mask score. In such case, the value of each frequency component may be taken from one channel of the multichannel signal (e.g., a primary channel) or from both channels (e.g., as an average of the corresponding value from each channel).

FIG. 2B shows a flowchart of an alternate implementation T204 of task T200. Instead of rating each of a plurality of direction indicators, task T204 includes a subtask T240 that rates each phase difference $\Delta\phi_i$ using a corresponding directional masking function $m_i$. For a case in which it is desired to select coherent signals arriving from directions in the range of from $\theta_L$ to $\theta_H$, for example, each masking function $m_i$ may be configured to have a passband that ranges from $\Delta\phi_{Li}$ to $\Delta\phi_{Hi}$, where $$\Delta\varphi_{Li} = \frac{d2\pi f_i}{c}\cos\theta_H$$

(equivalently, $$\Delta\varphi_{Li} = \frac{d2\pi}{\lambda_i}\cos\theta_H) \text{ and } \Delta\varphi_{Hi} = \frac{d2\pi f_i}{c}\cos\theta_L$$

(equivalently, $$\Delta\varphi_{Hi} = \frac{d2\pi}{\lambda_i}\cos\theta_L).$$

For or a case in which it is desired to select coherent signals arriving from directions corresponding to the range of time delay of arrival from $\tau_L$ to $\tau_H$, each masking function $m_i$ may be configured to have a passband that ranges from $\Delta\phi_{Li}$ to $\Delta\phi_{Hi}$, where $\Delta\phi_{Li}=2\pi f_i\tau_L$ (equivalently, $$\Delta\varphi_{Li} = \frac{c2\pi\tau_L}{\lambda_i})$$

and $\Delta\phi_{Hi}=2\pi f_i\tau_H$ (equivalently, $$\Delta\varphi_{Hi} = \frac{c2\pi\tau_H}{\lambda_i}).$$

For a case in which it is desired to select coherent signals arriving from directions corresponding to the range of the ratio of phase difference to frequency from $r_L$ to $r_H$, each masking function $m_i$ may be configured to have a passband that ranges from $\Delta\phi_{Li}$ to $\Delta\phi_{Hi}$, where $\Delta\phi_{Li}=f_ir_L$ and $\Delta\phi_{Hi}=f_ir_H$. As discussed above with reference to task T220, the profile of each masking function may be selected according to a desired application (e.g., voice activity detection, gain control, etc.).

In some cases, it may be desirable to calculate a coherency measure without reference to a predetermined direction of arrival or time delay of arrival. FIG. 2C shows a flowchart of an alternate implementation T206 of task T200 that includes a subtask T250. Based on the direction indicators calculated by task T210, task T250 calculates a coherency measure for the multichannel signal. Task T250 may be configured to calculate the coherency measure based on a distribution of the current values of the direction indicators for the various frequency components. In one particular example, task T250 is configured to calculate the coherency measure based on a variance of the direction indicators. For example, such an implementation of task T250 may be configured to calculate the coherency measure based on the sum of the squared differences of each direction indicator with the mean of the direction indicators. In calculating such a distribution, it may be desirable to weight one or more direction indicators differently from one another. For example, it may be desirable to weight a direction indicator that corresponds to a low- or high-frequency band less heavily than a direction indicator that corresponds to a mid-range frequency band.

It may be desirable to configure task T230 or task T250 to produce the coherency measure as a temporally smoothed value. For example, such a task may be configured to calculate the coherency measure using a temporal smoothing function, such as a finite- or infinite-impulse-response filter. In one such example, the task is configured to produce the coherency measure as a mean value over the most recent m frames, where possible values of m include four, five, eight, ten, sixteen, and twenty. In another such example, the task is configured to calculate a smoothed coherency measure $z(n)$ for frame n according to an expression such as $z(n)=\alpha z(n-1)+(1-\alpha)c(n)$ (also known as a first-order IIR or recursive filter), where $z(n-1)$ denotes the smoothed coherency measure for the previous frame, $c(n)$ denotes the current unsmoothed value of the coherency measure, and $\alpha$ is a smoothing factor whose value may be selected from the range of from zero (no smoothing) to one (no updating). Typical values for smoothing factor $\alpha$ include 0.1, 0.2, 0.25, 0.3, 0.4, and 0.5. During an initial convergence period (e.g., immediately following a power-on or other activation of the audio sensing circuitry), it may be desirable for the task to smooth the coherency measure over a shorter interval, or to use a smaller value of smoothing factor $\alpha$, than during subsequent steady-state operation.

In addition to evaluating a coherency measure, it may be desirable to control the gain of (or otherwise to vary the amplitude of) one or more frequency components of one or more channels of the multichannel signal, based on information from the calculated phase differences. For example, it may be desirable to apply a higher gain to the at least one channel when the value of the coherency measure is high than when the value of the coherency measure is low. FIG. 11A shows a flowchart of an implementation M200 of method M100 that includes an implementation T300 of task T200. In addition to calculating a value of the coherency measure as described above, task T300 produces a masked signal which is based on the calculated phase differences and at least one channel of the multichannel signal. Task T300 may be configured to produce the masked signal based on a result of weighting or gating frequency components of the at least one channel according to the values of corresponding rating results. For example, task T300 may be configured to produce the masked signal by varying the amplitudes of one or more frequency components of one or more channels of the multichannel signal based on rating results (e.g., mask scores) for the calculated phase differences.

The masked signal may be a single-channel signal or may have more than one channel. For a complex-valued frequency component, varying the amplitude of the component may be performed by varying the component's real and imaginary values by the same factor, or by varying the magnitude of the component, or by applying a gain factor to the component. Varying the amplitude of at least one frequency component of a signal may also be performed by applying a gain factor to the signal in the time domain. Such amplitude variation operations may be performed linearly or logarithmically (e.g., by applying a gain factor that has a value in decibels).

Figures 12A, 12B:
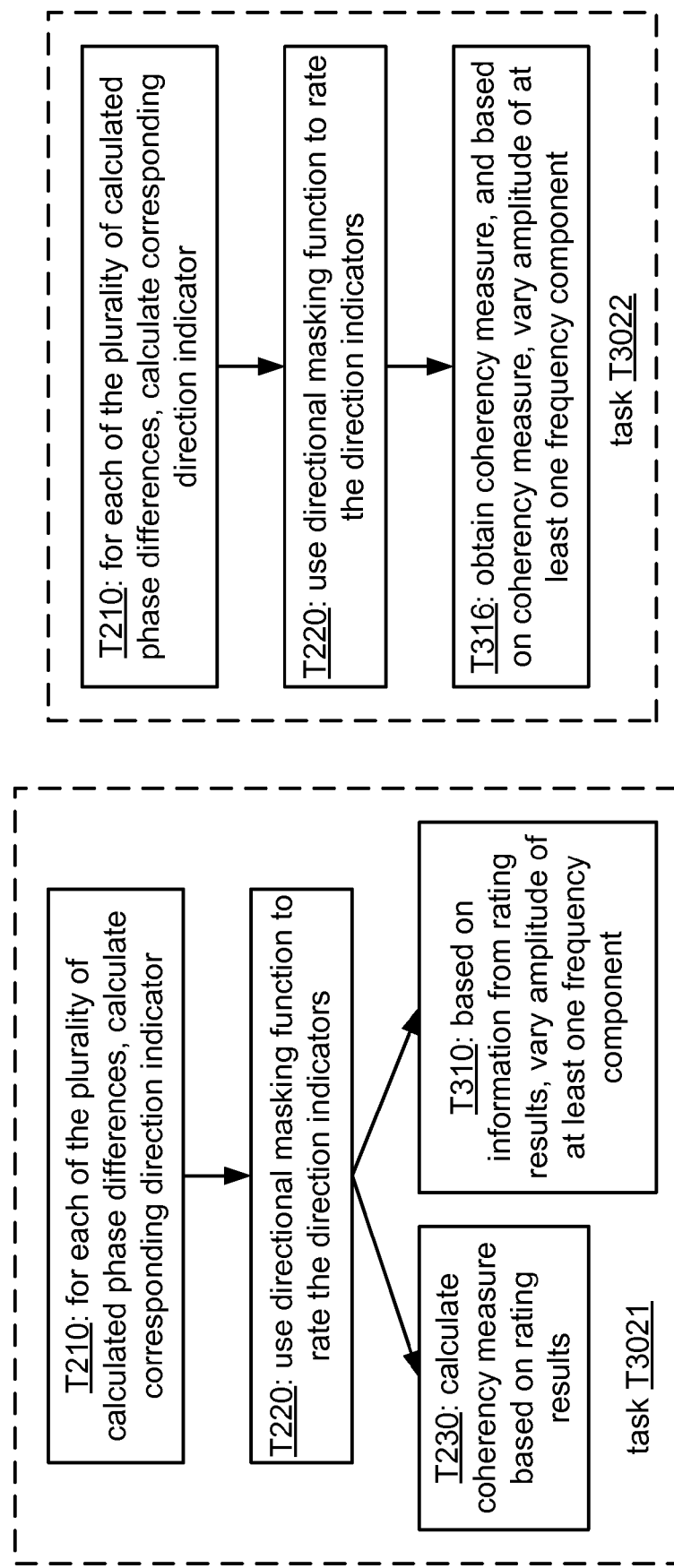
FIGS. 12A and 12B show flowcharts of implementations T3021 and T3022, respectively, of task T302.

FIG. 11B shows a flowchart of an implementation T302 of task T300. Task T302, which is also an implementation of task T202 discussed above, includes a second instance T220b of rating task T220. Task T220b, which may be configured according to any of the implementations described herein, may be configured to use a different directional masking function than the other instance of task T220. Task T302 also includes a task T310 that is configured to produce a masked signal by varying the amplitude of at least one frequency component of at least one channel of the multichannel signal (e.g., a primary channel), based on information from the rating results produced by task T220b. FIG. 12A shows a flowchart of an implementation T3021 of task T302 in which tasks T220 and T220b are implemented using a single instance of task T220.

Signal masking task T310 may be configured to apply the rating results to corresponding frequency components of the at least one channel, to subbands of the at least one channel, or to the entire channel or channels. FIG. 11C shows a flowchart of an implementation T312 of signal masking task T310 that applies the rating results to the at least one channel by weighting each of at least one of the frequency components by the rating result corresponding to that frequency component. For example, task T312 may be configured to produce a masked signal by applying mask scores as weighting factors to some or all of the frequency components of a channel of the multichannel signal according to an expression such as $s_{mi}=c_i \times f_i$, where $f_i$ denotes the i-th frequency component, $c_i$ denotes the corresponding mask score, and $s_{mi}$ denotes the corresponding frequency component of the masked signal. It may be desirable to configure task T310 to impose a lower limit on the value of the mask score and/or the magnitude of the masked frequency component (e.g., to avoid excessive attenuation of inactive frames).

Alternatively or additionally, task T312 may be configured to produce a masked signal by gating some or all of the frequency components of a channel of the multichannel signal. For example, task T312 may be configured to produce a masked signal according to an expression such as $$s_{mi} = \begin{cases} f_i, & c_i > T_i \\ \varepsilon_i, & \text{otherwise} \end{cases} \text{ or} \quad (1a)$$

$$s_{mi} = \begin{cases} f_i, & c_i \geq T_i \\ \varepsilon_i, & \text{otherwise} \end{cases}. \quad (1b)$$

In these examples, $T_i$ denotes a threshold which may have the same value for all frequency components $f_i$. Alternatively, threshold $T_i$ may have a different value for each of two or more, and possibly all, of the frequency components (e.g., according to a specified spectral profile, such as an expected spectral profile of a desired signal). Minimum amplitude or magnitude $\varepsilon_i$ may have the same value (e.g., zero or some small positive value) for all frequency components $f_i$ or, alternatively, may have a different value for each of two or more (possibly all) of the frequency components.

For a case in which fewer than all of the frequency components (e.g., only multiples of the pitch frequency) have corresponding mask scores, task T312 may be configured to calculate values of $c_i$ for other frequency components $f_i$ by copying or interpolating (e.g., linearly interpolating) from mask scores of nearby components.

It may be desirable to configure task T310 to perform subband masking. For example, such an approach may help to decorrelate the signal and noise and/or reduce noise modulation. FIG. 11D shows a flowchart of an implementation T314 of task T310 that applies the rating results to one or more subbands of the at least one channel to produce a masked signal. Task T314 includes a task T3142 that calculates a subband rating result, based on information from the corresponding rating results, for each of one or more subbands (e.g., each of one or more of a set of Bark scale or mel scale subbands). It may be desirable to configure the corresponding instance of rating task T220 to use a directional masking function having a different passband width and/or rolloff profile for each of two or more (possibly all) of the subbands. For example, it may be desirable to use a more narrow passband for a low-frequency subband than for a high-frequency subband.

Task T3142 may be configured to calculate a subband rating result for subband j by combining the rating results for the frequency components of the subband. For example, task T3142 may be configured to calculate the subband rating result for a subband by averaging the rating results (e.g., by summing the mask scores, or by normalizing the sum to obtain a mean of the mask scores) for the calculated phase differences that correspond to frequency components of that subband. In such case, task T3142 may be configured to weight each of the rating results equally (e.g., to weight each mask score by one) or to weight one or more (e.g., two, three, or possibly all) of the rating results in a subband differently from one another. A subband rating result calculated by task T3142 may also be considered to be a coherency measure for the corresponding subband.

Task T314 also includes a task T3144 that produces a masked signal by varying the amplitude of at least one frequency component of the at least one channel, based on a subband rating result calculated in task T3142. For example, for each of one or more (e.g., two, or three, or possibly all) of the subbands of the at least one channel, task T3144 may be configured to weight each of at least one (possibly all) of the frequency components of the subband by the corresponding subband rating result and/or to gate each of at least one (possibly all) of the frequency components of the subband according to the state of a relation between the corresponding subband rating result and a threshold value (e.g., according to an expression analogous to expression (1a) or (1b) above).

Additionally or in the alternative, task T3144 may be configured to weight each of at least one of the frequency components of a subband by a subband rating result that is calculated by task T3142 over a different subband and/or to gate each of at least one of the frequency components of a subband according to the state of a relation between a threshold value and a subband rating result that is calculated by task T3142 over a different subband (e.g., according to an expression analogous to expression (1a) or (1b) above). For example, task T3144 may be configured to weight the frequency components of the at least one channel, including the components of a low-frequency subband, by a subband rating result that is calculated by task T3142 over a subband that does not include low-frequency components (e.g., a middle-frequency subband, a high-frequency subband, or a subband that includes only middle- and high-frequency components). As phase information for low-frequency components of a sensed multichannel signal may be corrupted by noise, such an approach may help to decorrelate noise and near-field desired speech. Task T3144 may be configured to vary the amplitude of a subband by applying a gain factor based on the subband rating result in the time domain (e.g., to a gain control input of an amplifier arranged to vary the amplitude of the subband).

FIG. 11E shows a flowchart of an implementation T316 of task T310 that applies the rating results to the at least one channel by varying the amplitude of at least one frequency component based on the coherency measure. Task T316 includes an instance of coherency measure calculation task T230 (e.g., according to any of the implementations described herein). Task T316 also includes a task T3162 that produces a masked signal by varying the amplitude of at least one frequency component of the at least one channel, based on the coherency measure. For example, task T3162 may be configured to produce the masked signal by weighting one or more (possibly all) of the frequency components of the at least one channel by the coherency measure and/or by gating one or more (possibly all) of the frequency components of the at least one channel according to the state of a relation between the coherency measure and a threshold value (e.g., according to an expression analogous to expression (1a) or (1b) above). Task T3162 may be configured to vary the amplitude of the at least one channel by applying a gain factor based on the coherency measure in the time domain (e.g., to a gain control input of an amplifier arranged to vary the amplitude of the at least one channel). FIG. 12B shows a flowchart of an implementation T3022 of task T3021 in which tasks T230 and T310 are implemented by an instance of task T316.

Figure 13B:
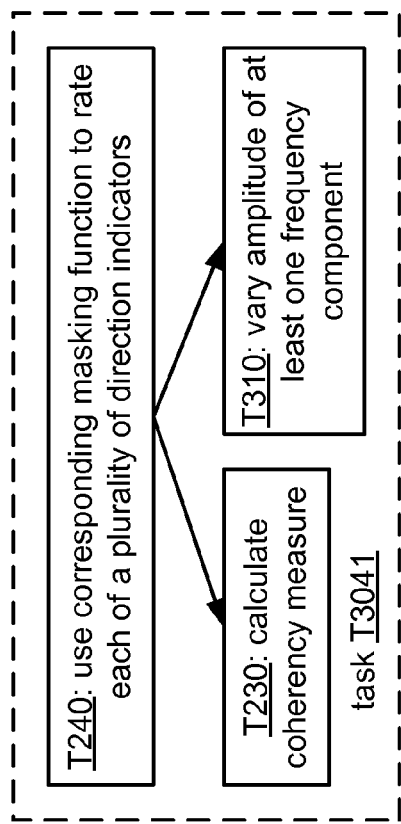
FIGS. 13B and 13C show flowcharts of implementations T3041 and T3042, respectively, of task T304.
Figure 13C:
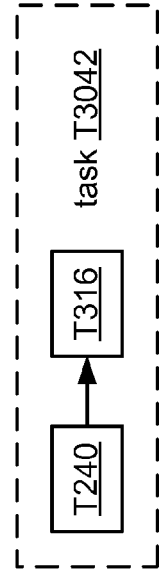
Figure 13A:
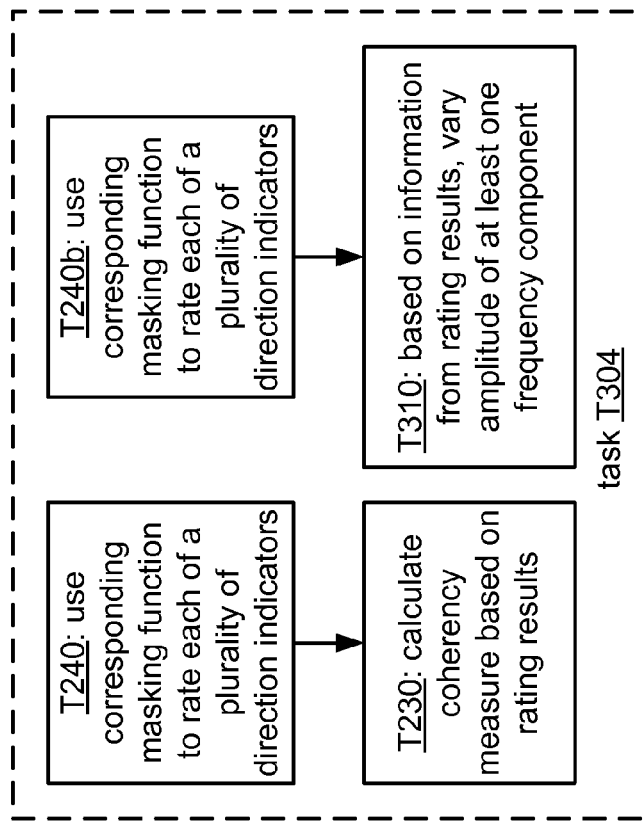
FIG. 13A shows a flowchart of an implementation T304 of task T300.

FIG. 13A shows a flowchart of another implementation T304 of task T300. Task T304, which is also an implementation of task T204 discussed above, includes a second instance of rating task T240. Task T240b, which may be configured according to any of the implementations described herein, may be configured to use a different directional masking function than the other instance of task T240. Task T304 also includes an instance of signal masking task T310 that is configured to produce a masked signal by varying the amplitude of at least one frequency component of at least one channel of the multichannel signal (e.g., a primary channel), based on information from the rating results produced by task T240b. FIG. 13B shows a flowchart of an implementation T3041 of task T304 in which tasks T240 and T240b are implemented using a single instance of task T240, and FIG. 13C shows a flowchart of an implementation T3042 of task T3041 in which tasks T230 and T310 are implemented by an instance of task T316.

FIG. 14A shows a flowchart of an implementation T306 of task T300. Task T306, which is also an implementation of task T206, includes a task T260 that is configured to select a directional masking function, based on the direction indicators produced by task T210. Task T260 may be configured to select the directional masking function based on an average and/or distribution of the direction indicators. For example, task T260 may be configured to select a passband direction of the directional masking function as an average of two or more (possibly all) of the direction indicators and/or to select a passband width and/or a profile of the directional masking function according to a variance of the direction indicators.

Task T306 also includes an instance of rating task T220, which may be configured according to any of the implementations described herein, that is arranged to use the selected masking function to rate the direction indicators. Task T306 also includes an instance of signal masking task T310, which may be configured according to any of the implementations described herein, which is arranged to produce a masked signal based on information from the rating results produced by task T220.

FIG. 14B shows a flowchart of a related implementation T308 of task T3021 that includes task T260, and FIG. 14C shows a flowchart of a related implementation T3082 of task T3022. In these cases, task T260 is arranged to select a directional masking function based on the direction indicators produced by task T210, and task T220 is arranged to use the directional masking function selected by task T260 to rate the direction indicators.

Figure 15D:
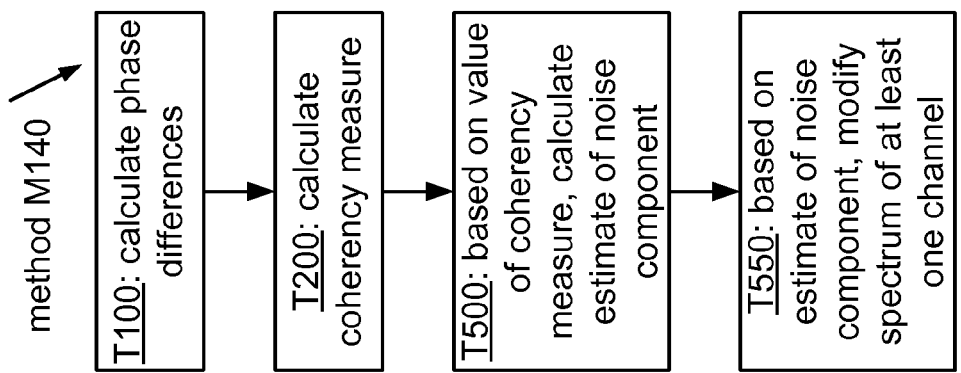
FIG. 15D shows a flowchart of an implementation M140 of method M130.
Figure 15C:
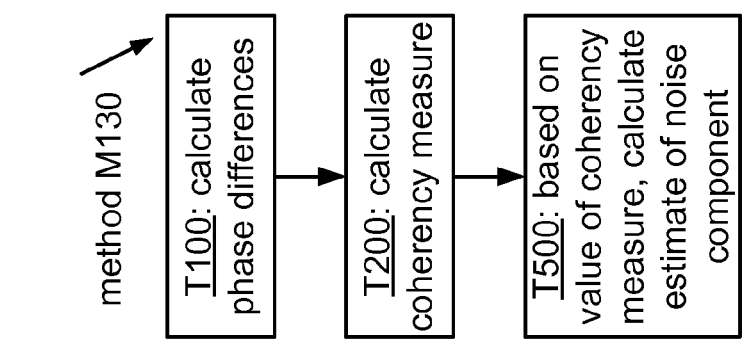
FIG. 15C shows a flowchart of such an implementation M130 of method M100.
Figure 15B:
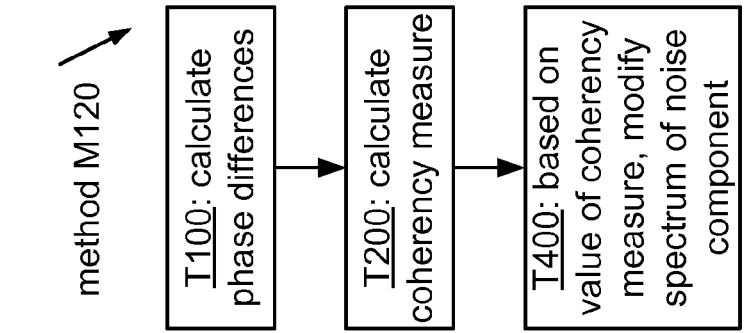
FIG. 15B shows a flowchart of such an implementation M120 of method M100.
Figure 15A:
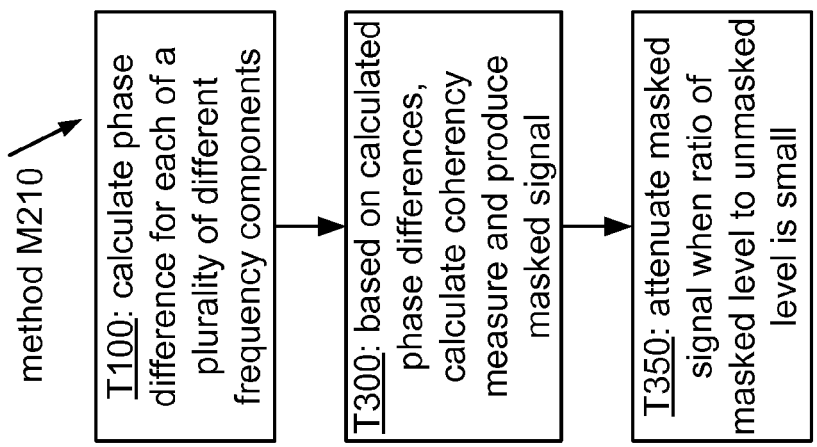
FIG. 15A shows a flowchart of an implementation M210 of method M200.

It may be desirable to configure method M200 to perform one or more additional operations on the masked signal produced by task T300. It may be desirable to attenuate the masked signal when there is a large difference between the levels of the signal before and after masking, for example, as such a difference may indicate that much of the energy of the unmasked signal is due to reverberation and/or interference. FIG. 15A shows a flowchart of an implementation M210 of method M200. Method M210 includes a task T350 that is configured to attenuate the masked signal when the ratio of a level of the signal after masking to a level of the signal before masking is small.

Task T350 may be configured to calculate the ratio R of the masked level to the unmasked level according to an expression such as $\Sigma_i|s_{mi}|/\Sigma_i|f_i|$ (i.e., a ratio between the sums of the magnitudes of the frequency components of the masked signal that task T300 produces and the unmasked signal on which task T300 operates). Alternatively, task T350 may be configured to calculate R according to an expression such as (i.e., a ratio between the sums of the energies of the frequency $\Sigma_i|s_{mi}|^2/\Sigma_i|f_i|^2$ (i.e., a ratio between the sums of the energies of the frequency components of the two signals).

Task T350 may be configured to attenuate the masked signal when the ratio R is less than (alternatively, not greater than) a minimum ratio threshold $\eta$ and to pass the masked signal without further attenuation otherwise. Such a relation may be expressed equivalently as $R<\eta$, $1/R>1/\eta$, $M<\eta*U$, or $U>M/\eta$ (alternatively, $R\leq\eta$, $1/R\geq1/\eta$, $M\leq\eta*U$, or $U\geq M/\eta$), where U and M denote the unmasked and masked levels, respectively, and task T350 may be implemented to evaluate the relation according to any one or more such expressions. Examples of values for threshold $\eta$ include 0.2, 0.25, 0.3, 0.4, 0.5, 0.6, and 0.7.

Task T350 may be configured to attenuate the masked signal by weighting the masked signal by an attenuation factor $\epsilon(\eta)$, where $\epsilon(\eta)$ has a value between zero and one (e.g., 0.25, 0.3, 0.4, 0.5, 0.6, or 0.7), or by subtracting a corresponding value in decibels from the signal. For example, task T350 may be configured to attenuate the masked signal by weighting each frequency component $s_{mi}$ of the masked signal by $\epsilon(\eta)$, by weighting the masked signal in the time domain by $\epsilon(\eta)$, or by applying a corresponding gain factor in decibels to the signal in the time or frequency domain.

It may be desirable to configure task T350 to use more than one value for minimum ratio threshold $\eta$, with corresponding values for attenuation factor $\epsilon(\eta)$. For example, such an implementation of task T350 may be configured to use successively greater values for minimum ratio threshold $\eta$ until the current value of $\eta$ is greater than (alternatively, not less than) the ratio R, and to attenuate the masked signal using a corresponding value of attenuation factor $\epsilon(\eta)$, or to pass the masked signal without further attenuation if the ratio R is not less than (alternatively, is greater than) the greatest of the values of $\eta$. It may be desirable in such case to configure task T350 to temporally smooth the value of attenuation factor $\epsilon(\eta)$ from one segment to another (e.g., to avoid abrupt and perhaps perceptually objectionable changes in the level of the masked signal). Task T350 may be configured to perform such smoothing by delaying a change in the value of attenuation factor $\epsilon(\eta)$ until the new value has been indicated for a specified number of consecutive frames (e.g., two, three, four, five, or ten frames). Such an approach may help to avoid transients in the value of attenuation factor $\epsilon(\eta)$. Alternatively, task T350 may be configured to perform such smoothing according to a temporal smoothing algorithm (e.g., an FIR or IIR filter, such as a first-order IIR filter) as described in a related context herein.

It may be desirable to modify the residual background noise spectrum of at least one channel of the multichannel signal, based on the value of the coherency measure. FIG. 15B shows a flowchart of an implementation M120 of method M100 that includes a task T400. Task T400 is configured to modify the spectrum of a noise component of one or more channels of the multichannel signal based on the value of the coherency measure. In this context, the term "noise component" indicates the content of the multichannel signal that is not the desired information signal or signals. The noise component may include reverberation of a desired information signal.

Task T400 may be configured to modify the spectrum of one or more channels of the multichannel signal, such as a primary channel, during intervals when the value of the coherency measure is less than (alternatively, not greater than) a specified threshold value. Such spectrum modification may include attenuating one or more frequency components at each of one or more spectral peaks and/or boosting one or more frequency components at each of one or more spectral valleys. For example, task T400 may be configured to compand or reduce the signal spectrum during such intervals according to a desired noise spectral profile (e.g., a quasi-white or pink spectral profile).

Such noise whitening may create a sensation of a residual stationary noise floor and/or may lead to the perception of the noise being put into, or receding into, the background. It may be desirable for task T400 to include a smoothing scheme, such as a temporal smoothing scheme as described herein, to smooth transitions in the amplitudes of the affected frequency components between intervals during which no such modification is performed on the signal (e.g., speech intervals) and intervals during which the spectral modification is performed (e.g., noise intervals). Such smoothing, which may include using an FIR or IIR filter as described herein, may help to support perceptually smooth transitions between speech and noise intervals.

It may be desirable to calculate an estimate (also called a "noise reference" or "noise power reference") of a noise component of the multichannel signal. A noise power reference signal may be calculated, for example, as an average over time of frames of an input channel that are classified by a voice activity detection (VAD) operation as inactive. The acoustic noise in a typical environment may include babble noise, airport noise, street noise, voices of competing talkers, and/or sounds from interfering sources (e.g., a TV set or radio). Such noise is typically nonstationary and may have an average spectrum that is close to that of the user's own voice. When the VAD operation is only based on a single channel, however, the resulting noise reference is usually only an approximate estimate of stationary noise. Moreover, calculation of such a reference generally entails a noise power estimation delay, such that a response to changes in the spectral signature of the noise component can only be performed after a significant delay.

The coherency measure produced by task T200 may be used to support calculation of a noise reference that is more reliable and contemporaneous than a noise estimate based on a single-channel VAD signal. FIG. 15C shows a flowchart of such an implementation M130 of method M100 that includes a task T500. Based on the value of the coherency measure, task T500 calculates a noise reference (e.g., an estimate of the noise component of a primary channel). For example, task T500 may be configured to calculate the noise estimate by updating the noise estimate, based on information from a frame of the primary channel, when the value of the coherency measure is less than (alternatively, not greater than) a specified threshold value.

Task T500 may be configured to calculate the noise reference using a temporal smoothing function, such as a finite- or infinite-impulse-response filter. In one such example, task T500 is configured to calculate the noise reference such that each frequency component of the noise reference is a mean value of the corresponding frequency component of the primary channel over the most recent m inactive frames, where possible values of m include two, three, four, five, eight, ten, and sixteen. In another such example, task T500 is configured to update each frequency component $r_i$ of noise reference r according to an expression such as $r_i = \beta r_{iO} + (1-\beta) q_i$, where $r_{iO}$ denotes the previous value of $r_i$, $q_i$ denotes the corresponding frequency component of the current inactive frame, and $\beta$ is a smoothing factor whose value may be selected from the range of from zero (no smoothing) to one (no updating). Typical values for smoothing factor $\beta$ include 0.1, 0.2, 0.25, 0.3, 0.4, and 0.5. During an initial convergence period (e.g., immediately following a power-on or other activation of the audio sensing circuitry), it may be desirable for task T500 to calculate the noise reference over a shorter interval, or to use a smaller value of smoothing factor $\beta$, than during subsequent steady-state operation.

It is noted that the number of frequency components in the noise reference may be different from the number of frequency components in the multichannel signal. For example, task T500 may be implemented to calculate the noise reference on a subband basis. Such an implementation of task T500 may be configured to compute an average of the frequency components for each of a set of subbands (e.g., Bark scale or mel scale subbands) of a noise frame and to use the average to update the corresponding subband of the noise reference.

Method M130 may be implemented to use the noise reference produced by task T500 to perform a frequency-dependent amplitude control operation on one or more channels of the multichannel signal. Such an implementation of method M130 may be configured to modify the spectrum of the at least one channel by, for example, attenuating components or subbands that correspond to peaks in the noise reference. FIG. 15D shows a flowchart of an implementation M140 of method M130 that includes a task T550. Task T550 is configured to use the noise reference to perform a noise reduction operation on at least one channel of the multichannel signal. One example of such a noise reduction operation uses the noise reference to perform a Wiener filtering operation on a primary channel. Another example of such a noise reduction operation uses the noise reference to perform a spectral subtraction operation on the primary channel (e.g., by subtracting the noise spectrum from the primary channel). A further example of such a noise reduction operation attenuates the gains of one or more frequency components of the primary channel based on the energies of corresponding frequency components of the noise reference (e.g., by applying to each frequency component a gain attenuation that increases with the energy of the corresponding frequency component of the noise reference).

Task T550 may be configured to perform the noise reduction operation (e.g., a spectral subtraction or gain attenuation operation) on a subband basis. For example, such an implementation of task T550 may be configured to apply a set of subband gain attenuations, each based on the energy of a corresponding subband of the noise reference, to corresponding subbands of a primary channel. When task T550 performs the noise reduction operation on only one channel of the multichannel signal (e.g., the primary channel), the resulting operation may be considered to be a quasi-single-channel noise reduction algorithm that makes use of a dual-channel VAD operation. Alternatively, task T550 may be configured to perform such a noise reduction operation on the multichannel signal (using a single-channel or multichannel noise reference) to produce a multichannel output.

Method M100 may be implemented to produce a coherence indication, based on the value of the coherency measure, that has a first state (e.g., high or "1") when the input channels are directionally coherent and a second state (e.g., low or "0")

otherwise. Such a coherence indication may be used as a voice activity detection (VAD) signal or flag, such that a frame is classified as active (i.e., voice) if the corresponding state of the coherence indication is the first state and as inactive (i.e., noise) otherwise. As discussed above (e.g., with reference to tasks T316, T400, and T500), for example, it may be desirable to configure method M100 to execute one or more tasks according to the state of a relation between the value of a coherency measure and a threshold value. It may be desirable in such case to configure method M100 to produce a coherence indication that indicates the state of this relation between the coherency measure and the threshold value.

For an application in which a higher value of the coherency measure indicates a higher degree of directional coherence, the coherence indication may be configured to indicate signal coherence when the coherency measure is above (alternatively, is not less than) the threshold value. For an application in which a lower value of the coherency measure indicates a higher degree of directional coherence, the coherence indication may be configured to indicate signal coherence when the coherency measure is below (alternatively, is not greater than) the threshold value. The threshold value, which may be fixed or variable over time, may be selected according to factors such as the width and direction of the masking function's passband and the desired sensitivity of the detection operation.

FIG. 16A shows a flowchart of an implementation T3164 of task T316 that includes a task T3166. Task T3166 includes a subtask T3168 that produces a coherence indication based on the coherency measure. For example, task T3168 may be configured such that the coherence indication has a first state when the coherency measure is above (alternatively, is not less than) the threshold value, and a second state otherwise. Task T3166 also includes a subtask T3169 that varies the amplitude of at least one frequency component of at least one channel of the multichannel signal based on the state of the coherence indication.

An implementation of method M100 that includes task T3164 may be configured, for example, to use the coherence indication as a gating signal, such that the signal being gated (e.g., one or more channels of the multichannel signal or of a masked signal) is passed when the input channels are directionally coherent and is blocked otherwise. Such an implementation of task T3164 may be configured to pass all of the subbands of the signal being gated (alternatively, all subbands of the signal in a selected frequency range) when the coherence indication has the first state. For example, task T3164 may be configured to pass all subbands of the primary channel during an active frame (e.g., by calculating the logical AND of the coherence indication and each bit of the signal being gated). Alternatively, it may be desirable to configure task T3164 to pass a subband of the signal being gated only if one or more additional constraints are also satisfied.

For example, task T3164 may be configured, when the coherence indication has the first state, to pass only those subbands having sufficiently high mask scores. Alternatively or additionally, task T3164 may be configured to pass, when the coherence indication has the first state, only those subbands having an energy that is at least equal to (alternatively, not less than) a minimum energy threshold value. This threshold value may be the same for each subband or may be a different value for each of two or more (possibly all) of the subbands. Such frequency-dependent constraints may help to reduce distortion.

FIG. 16B shows a flowchart of a related implementation T402 of task T400 that includes an instance of task T3168 and a subtask T404. Task T404 is configured to modify the spectrum of a noise component of one or more channels of the multichannel signal based on the state of the coherence indication. FIG. 16C shows a flowchart of a related implementation T502 of task T500 that includes an instance of task T3168 and a subtask T504. Task T504 is configured to calculate an estimate of a noise component of one or more channels of the multichannel signal based on the state of the coherence indication.

Time-dependent gain control (e.g., signal masking as described herein with reference to task T300) may cause the magnitude of the noise component in the output to vary over time. For example, time-dependent gain control may lead to the passage of a disproportionately higher amount of noise during intervals when a desired speaker is active than during intervals when the desired speaker is inactive. Such an effect is known as "noise gating," "noise ride-in," or "noise modulation."

It may be desirable to configure signal masking task T316 to disproportionately attenuate the one or more channels during intervals of the multichannel signal when the value of the coherency measure indicates a lack of directional coherence. Similarly, it may be desirable to configure signal masking task T314 to disproportionately attenuate one or more frequency components and/or subbands during intervals of the multichannel signal when the value of the corresponding rating result indicates a lack of directional coherence. Similarly, it may be desirable to configure signal masking task T312 to disproportionately attenuate one or more frequency components during such intervals. Such approaches may reduce noise gating by, for example, decorrelating noise and near-field desired speech.

Noise ride-in is not typically observed with noise reduction operations that are based on a noise reference (e.g., a Wiener filtering, spectral subtraction, or other frequency-dependent gain control operation as described, for example, with reference to task T330 above). Consequently, it may be desirable to combine (e.g., to mix) a masked signal as produced by task T300 with a spectrally modified signal as produced by performing an instance of task T400 or T550 on at least one channel of the multichannel signal. For example, it may be desirable to implement method M200 to include such an instance of task T400, or of T500 and T550, and to produce an output signal that is an average of the masked signal produced by task T300 and the output signal of task T400 or T550. Such an implementation of method M200 may be configured to perform each of tasks T300 and T400 (or T500 and T550) on a primary channel and to mix the results. For an application in which each of tasks T300 and T400 or T550 produces a multichannel output (e.g., for stereo transmission), it may be desirable to mix these outputs such that each channel of the result is an average of the corresponding channel of the masked signal and the corresponding channel of the output signal of task T400 or T550.

Figure 17C:
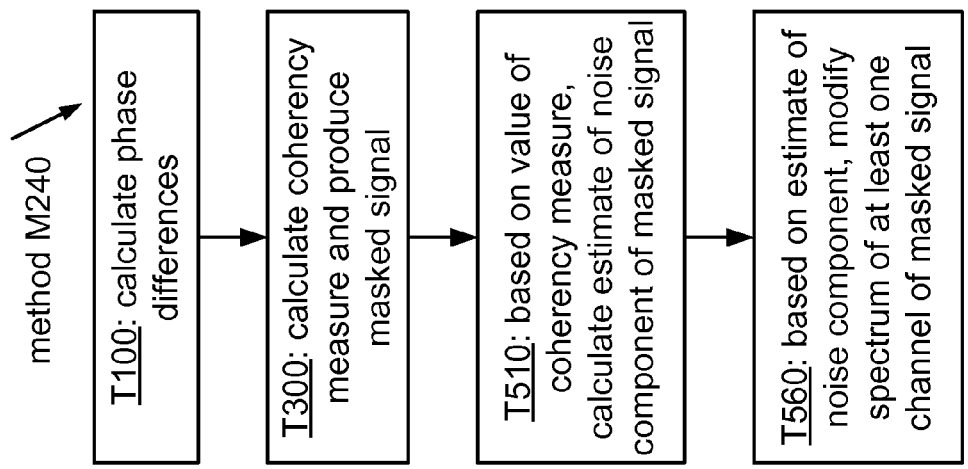
FIG. 17C shows a flowchart of an implementation M240 of method M230.
Figure 17B:
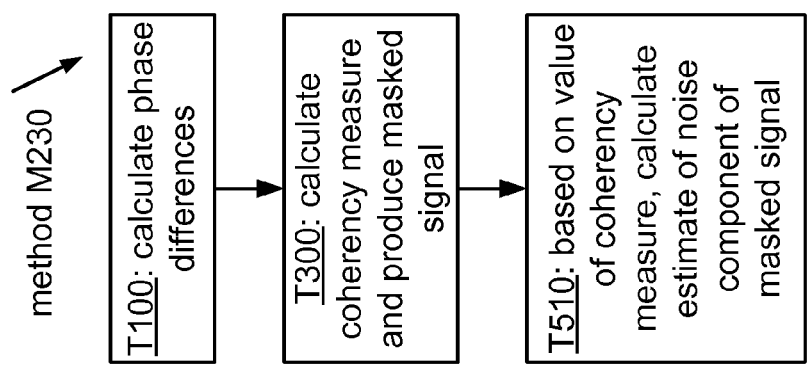
FIG. 17B shows a flowchart of an implementation M230 of method M200.
Figure 17A:
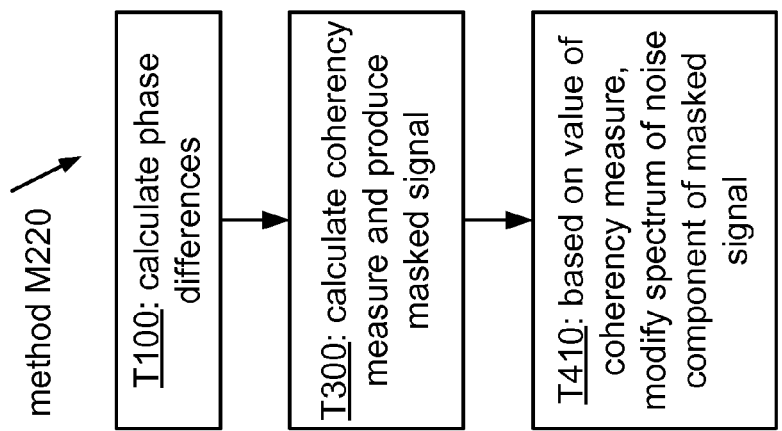
FIG. 17A shows a flowchart of an implementation M220 of method M200.

As an alternative to mixing an output of task T400 or T550 with a masked signal produced by task T300, it may be desirable to apply task T400 or T500 to one or more channels of the masked signal. FIG. 17A shows a flowchart of such an implementation M220 of method M200 that includes an implementation T410 of task T400 that is configured to modify the spectrum of a noise component of one or more channels of the masked signal based on the value of the coherency measure. FIG. 17B shows a flowchart of a related implementation M230 of method M200 that includes an implementation T510 of task T500, which is configured to calculate an estimate of a noise component of the masked signal based on the value of the coherency measure. FIG. 17C shows a flowchart of a related implementation M240 of method M230 that includes an implementation T560 of task T550 which is configured to perform a noise reduction operation on one or more channels of the masked signal, based on the noise estimate produced by task T510.

Some multichannel signal processing operations that use information from more than one channel of a multichannel signal to produce each channel of a multichannel output. Examples of such operations may include beamforming and blind-source-separation (BSS) operations. It may be difficult to integrate echo cancellation with such a technique, as the operation tends to change the residual echo in each output channel. As described herein, method M100 may be implemented to use information from the calculate phase differences to perform single-channel time- and/or frequency-dependent amplitude control (e.g., a noise reduction operation) on each of one or more channels of the multichannel signal (e.g., on a primary channel). Such a single-channel operation may be implemented such that the residual echo remains substantially unchanged. Consequently, integration of an echo cancellation operation with an implementation of method M100 that includes such a noise reduction operation may be easier than integration of the echo cancellation operation with a noise reduction operation that operates on two or more microphone channels.

As the relative distance between a sound source and a microphone pair increases, coherence among the directions of arrival of different frequency components may be expected to decrease (e.g., due to an increase in reverberation). Therefore the coherency measure calculated in task T200 may also serve to some extent as a proximity measure. Unlike processing operations that are based only on direction of arrival, for example, time- and/or frequency-dependent amplitude control that is based on the value of a coherency measure as described herein may be effective for distinguishing speech of a user or other desired near-field source from interference, such as speech of a competing speaker, from a far-field source in the same direction. The rate at which directional coherency diminishes with distance may vary from one environment to another. The interior of an automobile is typically very reverberant, for example, such that directional coherency over a wide range of frequencies may be maintained at a reliably stable level over time within a range of only about fifty centimeters from the source. In such case, sound from a back-seat passenger may be rejected as incoherent, even if that speaker is positioned within the passband of the directional masking function. The range of detectable coherence may also be reduced in such circumstances for a tall speaker (e.g., due to reflections from the nearby ceiling).

Variations may arise during manufacture of the microphones of array R100, such that even among a batch of mass-produced and apparently identical microphones, sensitivity may vary significantly from one microphone to another. Microphones for use in portable mass-market devices may be manufactured at a sensitivity tolerance of plus or minus three decibels, for example, such that the gain responses of two such microphones in the microphone array of a device may differ by as much as six decibels.

Many multi-microphone spatial processing operations are inherently dependent upon the relative gain responses of the microphone channels. Calibration of microphone gain response during manufacture, which may be necessary to enable such spatial processing operations, is typically time-consuming and/or otherwise expensive. It is noted, however, that method M100 may be implemented to be immune from differences between the gains of the input channels, such that the degree to which the gain responses of the corresponding microphones are calibrated to one another is not a limiting factor to the performance of the spatial processing method (e.g., the accuracy of the calculated phase differences and subsequent operations based on them).

Implementations of method M100 may also be configured to support various further operations, such as a gain calibration operation or a spatially selective processing operation. For example, it may be desirable to implement method M100 to include an automatic gain matching (AGM) operation. It may be assumed that if the microphone channels are properly calibrated, then the levels of their responses to far-field noise will be equal. An AGM operation adjusts the gain response of at least one channel in response to an offset between the responses of the channels to far-field noise.

In order to distinguish far-field intervals from near-field intervals, which may not be suitable for gain matching, current AGM techniques typically rely on a comparison of the relative levels of the channels. A phase-based VAD operation (e.g., an implementation of method M100 that is configured to produce a coherence indication as described herein) may be used to identify far-field noise intervals, typically more quickly and more reliably than current techniques. Accurate detection of far-field noise intervals allows the AGM operation to match the gains of the microphone channels more accurately. Such improved gain matching may also be used for more aggressive tuning of proximity-effect-based attenuation schemes. Descriptions of examples of such operations are disclosed in U.S. Provisional Pat. Appl. No. 61/240,320 (filed Sep. 8, 2009).

FIG. 18A shows a block diagram of an apparatus A10 according to a general configuration. Apparatus A10 includes means F100 for calculating a phase difference between channels of a multichannel signal for each of a plurality of different frequency components of the signal (e.g., as described herein with reference to task T100). Apparatus A10 also includes means F200 for calculating a value of a coherency measure, based on information from the calculated phase differences that indicates a degree of coherence among the directions of arrival of at least the plurality of different frequency components (e.g., as described herein with reference to task T200).

FIG. 18B shows a block diagram of an implementation A100 of apparatus A10. Apparatus A100 includes a phase difference calculator 100 that is configured to calculate a phase difference between channels of a multichannel signal for each of a plurality of different frequency components of the signal (e.g., as described herein with reference to task T100) and is an implementation of means F100. Apparatus A100 also includes a coherency measure calculator 200 that is configured to calculate a value of a coherency measure based on information from the calculated phase differences (e.g., as described herein with reference to task T200) and is an implementation of means F200.

FIG. 18C shows a block diagram of an implementation A20 of apparatus A10. Apparatus A20 includes means F300 for calculating a value of a coherency measure and producing a masked signal (e.g., as described herein with reference to task T300). FIG. 18D shows a block diagram of an implementation A200 of apparatus A20 and A100. Apparatus A200 includes a masked signal generator 300 that is configured to produce a masked signal, based on at least one channel of the multichannel signal, according to information from coherency measure calculator 200 (e.g., direction indicators, rating results, or a coherency measure, as described herein with reference to task T300).

FIG. 18E shows a block diagram of an implementation A12 of apparatus A10. Apparatus A12 includes means F400 for modifying a spectrum of a noise component of at least one channel of the multichannel signal (e.g., as described herein with reference to task T400). FIG. 18F shows a block diagram of an implementation A120 of apparatus A12 and A100. Apparatus A120 includes a spectrum modifier 400 that is configured to vary the amplitude of at least one frequency component of at least one channel of the multichannel signal according to a specified noise spectral profile (e.g., as described herein with reference to task T400).

Figure 19A:
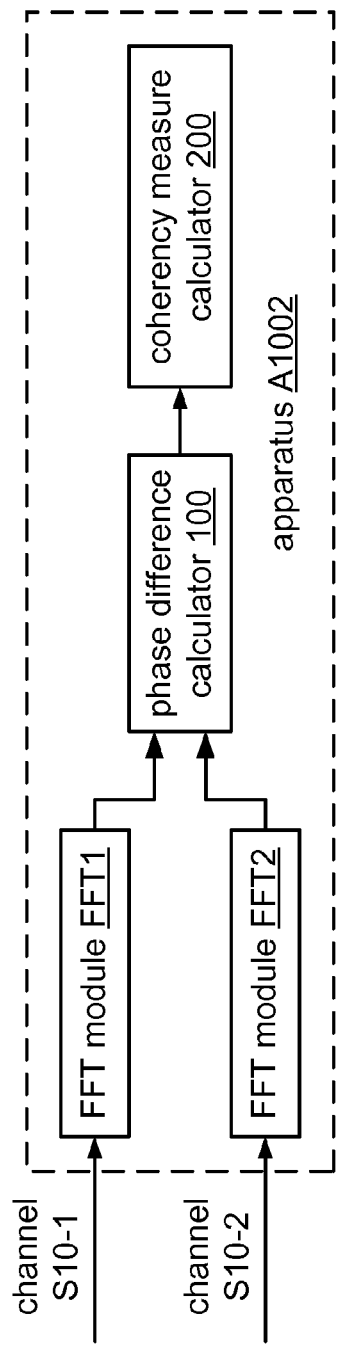
FIG. 19A shows a block diagram of an implementation A1002 of apparatus A100.
Figure 19B:
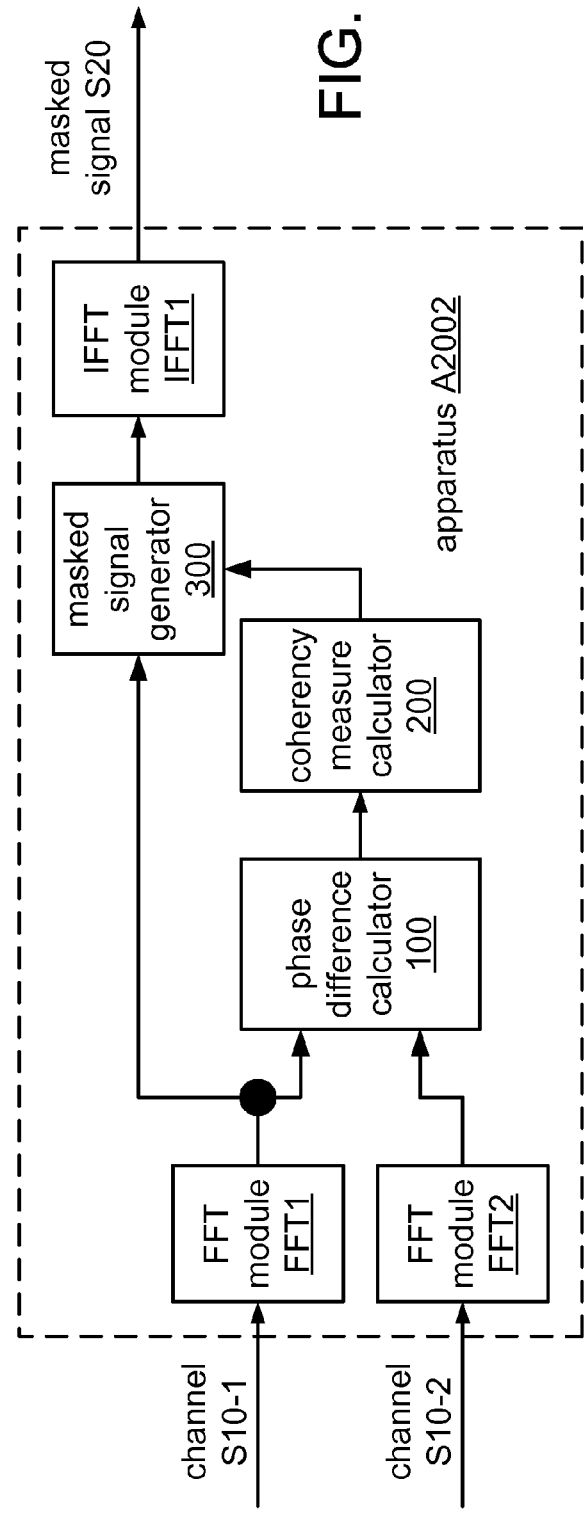
FIG. 19B shows a block diagram of an implementation A2002 of apparatus A1002.

FIG. 19A shows a block diagram of an implementation A1002 of apparatus A100. Apparatus A1002 includes FFT modules FFT1 and FFT2 that receive channels S10-1 and S10-2, respectively, of the multichannel signal and perform FFT operations to output corresponding frequency components to phase difference calculator 100. FIG. 19B shows a block diagram of an implementation A2002 of apparatus A1002 and A200. Apparatus A2002 also includes masked signal generator 300, which is arranged to produce a masked signal based on a primary channel S10-1 of the multichannel signal. Apparatus A2002 also includes an inverse FFT module IFFT1 that is configured to perform an inverse FFT operation to convert the masked signal from the frequency domain to produce a time-domain signal S20.

FIG. 20A shows a block diagram of an implementation A13 of apparatus A10. Apparatus A13 includes means F500 for estimating a noise component of at least one channel of the multichannel signal (e.g., as described herein with reference to task T500). FIG. 20B shows a block diagram of an implementation A130 of apparatus A13 and A100. Apparatus A130 includes a noise estimator 500 that is configured to estimate a noise component of at least one channel of the multichannel signal (e.g., as described herein with reference to task T500).

FIG. 20C shows a block diagram of an implementation A14 of apparatus A10. Apparatus A14 includes means F550 for modifying the spectrum of at least one channel of the multichannel signal, based on the noise estimate produced by means F500 (e.g., as described herein with reference to task T550). FIG. 20D shows a block diagram of an implementation A140 of apparatus A14 and A130. Apparatus A140 includes a spectrum estimator 550 that is configured to modify the spectrum of at least one channel of the multichannel signal (e.g., as described herein with reference to task T550).

FIG. 20E shows a block diagram of an implementation A24 of apparatus A14 and A20. Apparatus A24 includes an implementation F510 of means F500 for estimating a noise component of at least one channel of the masked signal produced by means F300 (e.g., as described herein with reference to task T510). Apparatus A24 also includes an implementation F560 of means F550 for modifying the spectrum of at least one channel of the masked signal, based on the noise estimate produced by means F510 (e.g., as described herein with reference to task T560).

FIG. 20F shows a block diagram of an implementation A240 of apparatus A140 and A200. Apparatus A240 includes an implementation 510 of noise estimator 500 that is arranged to estimate a noise component of at least one channel of the masked signal produced by masked signal generator 300 (e.g., as described herein with reference to task T510). Apparatus A240 also includes an implementation 560 of spectrum estimator 550 that is configured to modify the spectrum of at least one channel of the masked signal, based on the noise estimate produced by noise estimator 510 (e.g., as described herein with reference to task T560).

Figure 21:
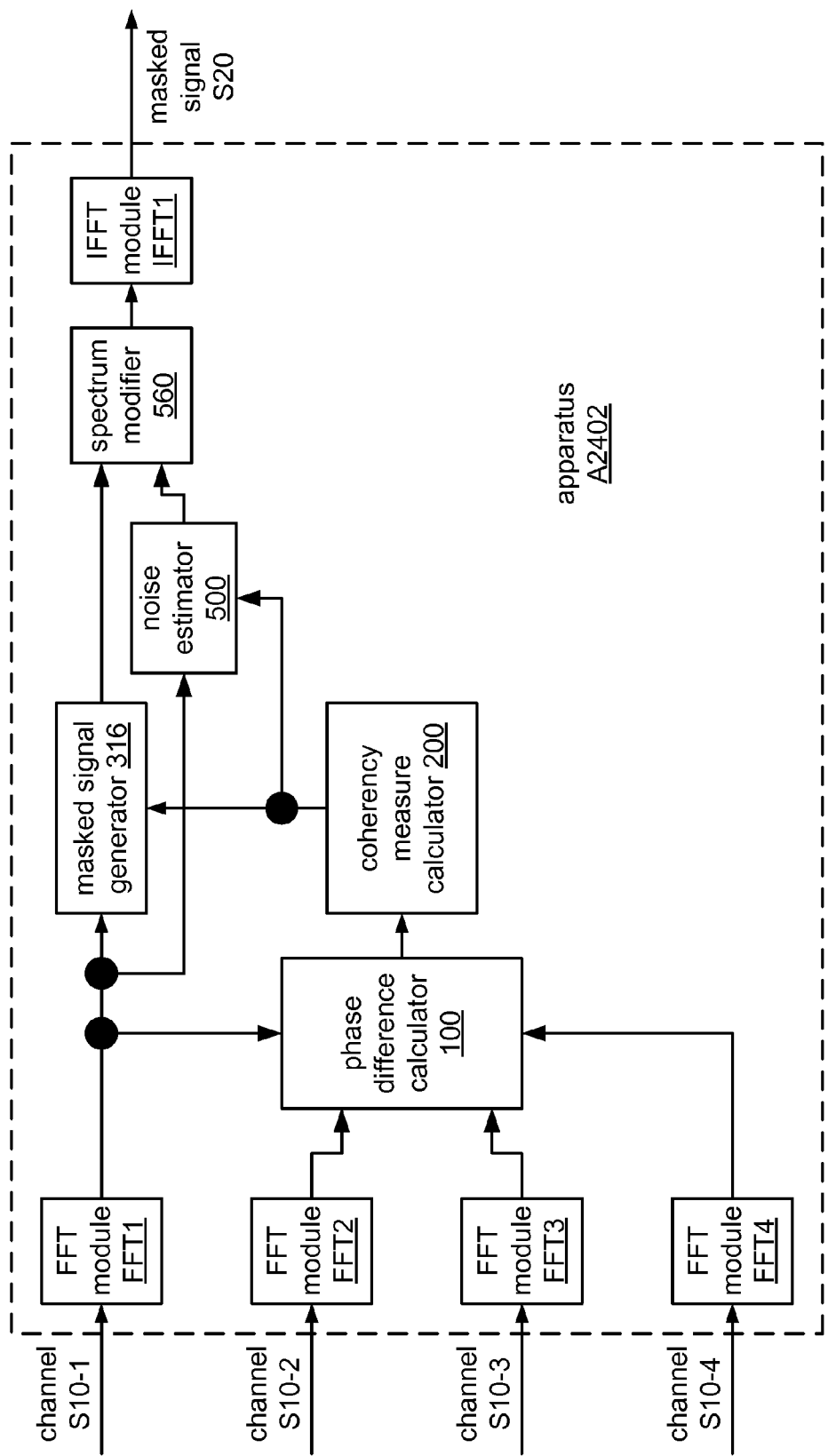
FIG. 21 shows a block diagram of an implementation A2402 of apparatus A240.

FIG. 21 shows a block diagram of an implementation A2402 of apparatus A240. Apparatus A2402 includes four FFT modules FFT1 to FFT4 that are configured to perform FFT operations on respective channels S10-1 to S10-4 of the multichannel signal. Apparatus A2402 also includes an implementation 316 of masked signal generator 300 that is configured to produce a masked signal based on the primary channel S10-1 and a coherency measure produced by coherency measure calculator 200. For example, masked signal generator 316 may be implemented as a gain control element (e.g., a multiplier or amplifier) configured to weight or gate at least one frequency component or subband of primary channel S10-1. It may be desirable to configure masked signal generator 316 to vary the amplitude of only a portion of the frequency range of primary channel S10-1 (e.g., of only a low-frequency subband, such as the 0-4 kHz band).

Apparatus A2402 also includes an instance of noise estimator 500 that is arranged to calculate an estimate of a noise component of channel S10-1 and an instance of spectrum modifier 560 that is arranged to modify the spectrum of the masked signal based on the noise estimate. It may be desirable to configure spectrum modifier 560 to perform the noise reduction operation over a wider frequency range of primary channel S10-1 than the range operated on by masked signal generator 316 (e.g., over the entire frequency band, such as the 0-8 kHz band). Apparatus A2402 also includes an inverse FFT module IFFT1 that is configured to perform an inverse FFT operation to convert the spectrally modified masked signal from the frequency domain to produce a time-domain signal S20.

It may be desirable to produce a portable audio sensing device that has an array R100 of two or more microphones configured to receive acoustic signals. Examples of a portable audio sensing device that may be implemented to include such an array and may be used for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, or other portable computing device.

Each microphone of array R100 may have a response that is omnidirectional, bidirectional, or unidirectional (e.g., cardioid). The various types of microphones that may be used in array R100 include (without limitation) piezoelectric microphones, dynamic microphones, and electret microphones. In a device for portable voice communications, such as a handset or headset, the center-to-center spacing between adjacent microphones of array R100 is typically in the range of from about 1.5 cm to about 4.5 cm, although a larger spacing (e.g., up to 10 or 15 cm) is also possible in a device such as a handset. In a hearing aid, the center-to-center spacing between adjacent microphones of array R100 may be as little as about 4 or 5 mm. The microphones of array R100 may be arranged along a line or, alternatively, such that their centers lie at the vertices of a two-dimensional (e.g., triangular) or three-dimensional shape.

During the operation of a multi-microphone audio sensing device (e.g., device D100, D200, D300, D400, D500, D600, D700, or D800 as described herein), array R100 produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

It may be desirable for array R100 to perform one or more processing operations on the signals produced by the microphones to produce multichannel signal S10. FIG. 22A shows a block diagram of an implementation 8200 of array R100 that includes an audio preprocessing stage AP10 configured to perform one or more such operations, which may include (without limitation) impedance matching, analog-to-digital conversion, gain control, and/or filtering in the analog and/or digital domains.

FIG. 22B shows a block diagram of an implementation R210 of array R200. Array R210 includes an implementation AP20 of audio preprocessing stage AP10 that includes analog preprocessing stages P10a and P10b. In one example, stages P10a and P10b are each configured to perform a highpass filtering operation (e.g., with a cutoff frequency of 50, 100, or 200 Hz) on the corresponding microphone signal.

It may be desirable for array R100 to produce the multichannel signal as a digital signal, that is to say, as a sequence of samples. Array R210, for example, includes analog-to-digital converters (ADCs) C10a and C10b that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44 kHz may also be used. In this particular example, array 8210 also includes digital preprocessing stages P20a and P20b that are each configured to perform one or more preprocessing operations (e.g., echo cancellation, noise reduction, and/or spectral shaping) on the corresponding digitized channel.

It is expressly noted that the microphones of array R100 may be implemented more generally as transducers sensitive to radiations or emissions other than sound. In one such example, the microphones of array R100 are implemented as ultrasonic transducers (e.g., transducers sensitive to acoustic frequencies greater than fifteen, twenty, twenty-five, thirty, forty, or fifty kilohertz or more).

Figure 23A:
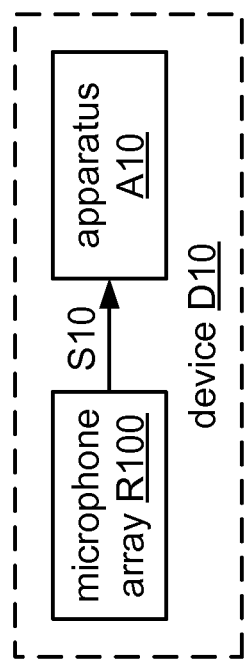
FIG. 23A shows a block diagram of a device D10 according to a general configuration.

FIG. 23A shows a block diagram of a device D10 according to a general configuration. Device D10 includes an instance of any of the implementations of microphone array R100 disclosed herein, and any of the audio sensing devices disclosed herein may be implemented as an instance of device D10. Device D10 also includes an instance of an implementation of apparatus A10 that is configured to process a multichannel signal, as produced by array R100, to calculate a value of a coherency measure. For example, apparatus A10 may be configured to process a multichannel audio signal according to an instance of any of the implementations of method M100 disclosed herein. Apparatus A10 may be implemented in hardware and/or in software (e.g., firmware). For example, apparatus A10 may be implemented on a processor of device D10 that is also configured to perform a spatial processing operation as described above on the processed multichannel signal (e.g., one or more operations that determine the distance between the audio sensing device and a particular sound source, reduce noise, enhance signal components that arrive from a particular direction, and/or separate one or more sound components from other environmental sounds).

Figure 23B:
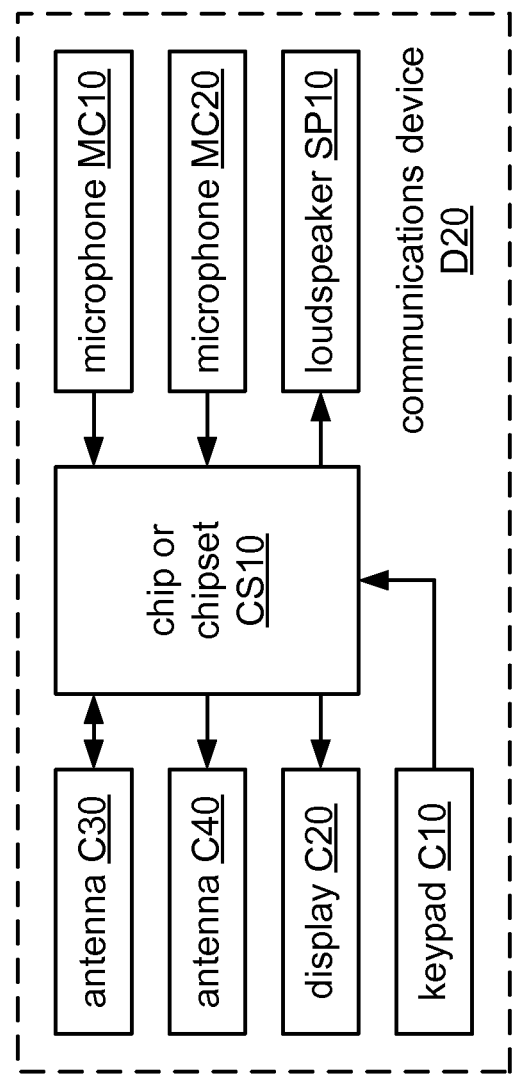
FIG. 23B shows a block diagram of an implementation D20 of device D10.

FIG. 23B shows a block diagram of a communications device D20 that is an implementation of device D10. Device D20 includes a chip or chipset CS10 (e.g., a mobile station modem (MSM) chipset) that includes apparatus A10. Chip/chipset CS10 may include one or more processors, which may be configured to execute all or part of apparatus A10 (e.g., as instructions). Chip/chipset CS10 may also include processing elements of array R100 (e.g., elements of audio preprocessing stage AP10). Chip/chipset CS10 includes a receiver, which is configured to receive a radio-frequency (RF) communications signal and to decode and reproduce an audio signal encoded within the RF signal, and a transmitter, which is configured to encode an audio signal that is based on a processed signal produced by apparatus A10 and to transmit an RF communications signal that describes the encoded audio signal. For example, one or more processors of chip/chipset CS10 may be configured to perform a noise reduction operation as described above on one or more channels of the multichannel signal such that the encoded audio signal is based on the noise-reduced signal.

Device D20 is configured to receive and transmit the RF communications signals via an antenna C30. Device D20 may also include a diplexer and one or more power amplifiers in the path to antenna C30. Chip/chipset CS10 is also configured to receive user input via keypad C10 and to display information via display C20. In this example, device D20 also includes one or more antennas C40 to support Global Positioning System (GPS) location services and/or short-range communications with an external device such as a wireless (e.g., Bluetooth™) headset. In another example, such a communications device is itself a Bluetooth headset and lacks keypad C10, display C20, and antenna C30.

Implementations of apparatus A10 as described herein may be embodied in a variety of audio sensing devices, including headsets and handsets. One example of a handset implementation includes a front-facing dual-microphone implementation of array R100 having a 6.5-centimeter spacing between the microphones. Implementation of a dual-microphone masking approach may include directly analyzing phase relationships of microphone pairs in spectrograms and masking time-frequency points from undesired directions.

FIGS. 24A to 24D show various views of a multi-microphone portable audio sensing implementation D100 of device D10. Device D100 is a wireless headset that includes a housing Z10 which carries a two-microphone implementation of array R100 and an earphone Z20 that extends from the housing. Such a device may be configured to support half- or full-duplex telephony via communication with a telephone device such as a cellular telephone handset (e.g., using a version of the Bluetooth™ protocol as promulgated by the Bluetooth Special Interest Group, Inc., Bellevue, Wash.). In general, the housing of a headset may be rectangular or otherwise elongated as shown in FIGS. 24A, 24B, and 24D (e.g., shaped like a miniboom) or may be more rounded or even circular. The housing may also enclose a battery and a processor and/or other processing circuitry (e.g., a printed circuit board and components mounted thereon) and may include an electrical port (e.g., a mini-Universal Serial Bus (USB) or other port for battery charging) and user interface features such as one or more button switches and/or LEDs. Typically the length of the housing along its major axis is in the range of from one to three inches.

Typically each microphone of array R100 is mounted within the device behind one or more small holes in the housing that serve as an acoustic port. FIGS. 24B to 24D show the locations of the acoustic port Z40 for the primary microphone of the array of device D100 and the acoustic port Z50 for the secondary microphone of the array of device D100.

A headset may also include a securing device, such as ear hook Z30, which is typically detachable from the headset. An external ear hook may be reversible, for example, to allow the user to configure the headset for use on either ear. Alternatively, the earphone of a headset may be designed as an internal securing device (e.g., an earplug) which may include a removable earpiece to allow different users to use an earpiece of different size (e.g., diameter) for better fit to the outer portion of the particular user's ear canal.

FIGS. 25A to 25D show various views of a multi-microphone portable audio sensing implementation D200 of device D10 that is another example of a wireless headset. Device D200 includes a rounded, elliptical housing Z12 and an earphone Z22 that may be configured as an earplug. FIGS. 25A to 25D also show the locations of the acoustic port Z42 for the primary microphone and the acoustic port Z52 for the secondary microphone of the array of device D200. It is possible that secondary microphone port Z52 may be at least partially occluded (e.g., by a user interface button).

FIG. 26A shows a cross-sectional view (along a central axis) of a multi-microphone portable audio sensing implementation D300 of device D10 that is a communications handset. Device D300 includes an implementation of array R100 having a primary microphone MC10 and a secondary microphone MC20. In this example, device D300 also includes a primary loudspeaker SP10 and a secondary loudspeaker SP20. Such a device may be configured to transmit and receive voice communications data wirelessly via one or more encoding and decoding schemes (also called "codecs"). Examples of such codecs include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). In the example of FIG. 3A, handset D300 is a clamshell-type cellular telephone handset (also called a "flip" handset). Other configurations of such a multi-microphone communications handset include bar-type and slider-type telephone handsets. FIG. 26B shows a cross-sectional view of an implementation D310 of device D300 that includes a three-microphone implementation of array R100 that includes a third microphone MC30.

Figure 27C:
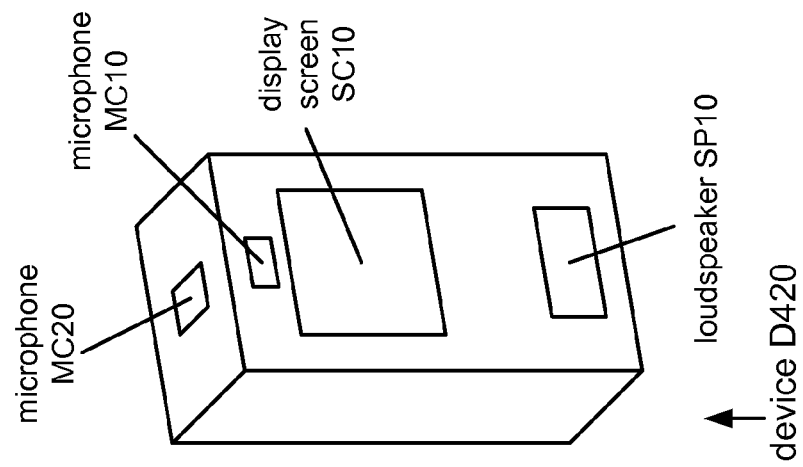
FIGS. 27B and 27C show diagrams of implementations D410 and D420, respectively, of device D400.
Figure 27B:
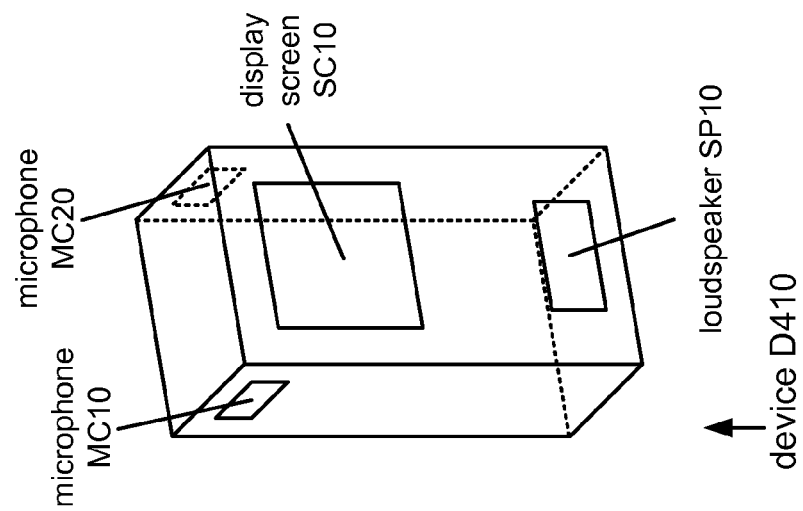
Figure 27A:
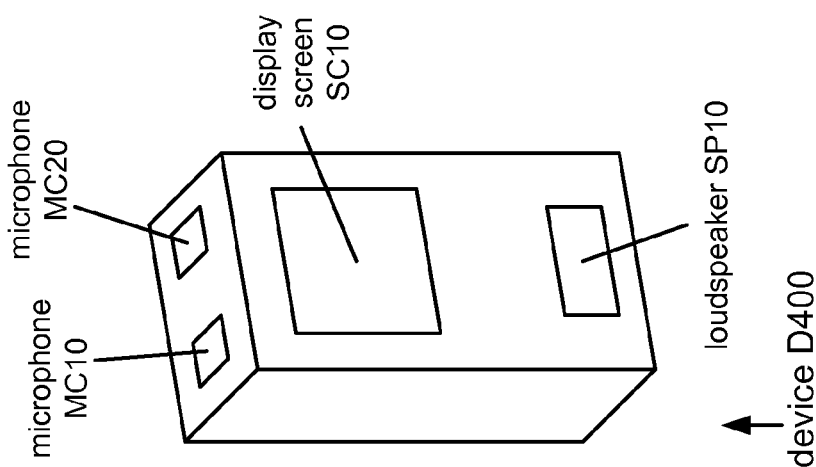
FIG. 27A shows a diagram of a multi-microphone media player D400.

FIG. 27A shows a diagram of a multi-microphone portable audio sensing implementation D400 of device D10 that is a media player. Such a device may be configured for playback of compressed audio or audiovisual information, such as a file or stream encoded according to a standard compression format (e.g., Moving Pictures Experts Group (MPEG)-1 Audio Layer 3 (MP3), MPEG-4 Part 14 (MP4), a version of Windows Media Audio/Video (WMA/WMV) (Microsoft Corp., Redmond, Wash.), Advanced Audio Coding (AAC), International Telecommunication Union (ITU)-T H.264, or the like). Device D400 includes a display screen SC10 and a loudspeaker SP10 disposed at the front face of the device, and microphones MC10 and MC20 of array R100 are disposed at the same face of the device (e.g., on opposite sides of the top face as in this example, or on opposite sides of the front face). FIG. 27B shows another implementation D410 of device D400 in which microphones MC10 and MC20 are disposed at opposite faces of the device, and FIG. 27C shows a further implementation D420 of device D400 in which microphones MC10 and MC20 are disposed at adjacent faces of the device. A media player may also be designed such that the longer axis is horizontal during an intended use.

Figure 28B:
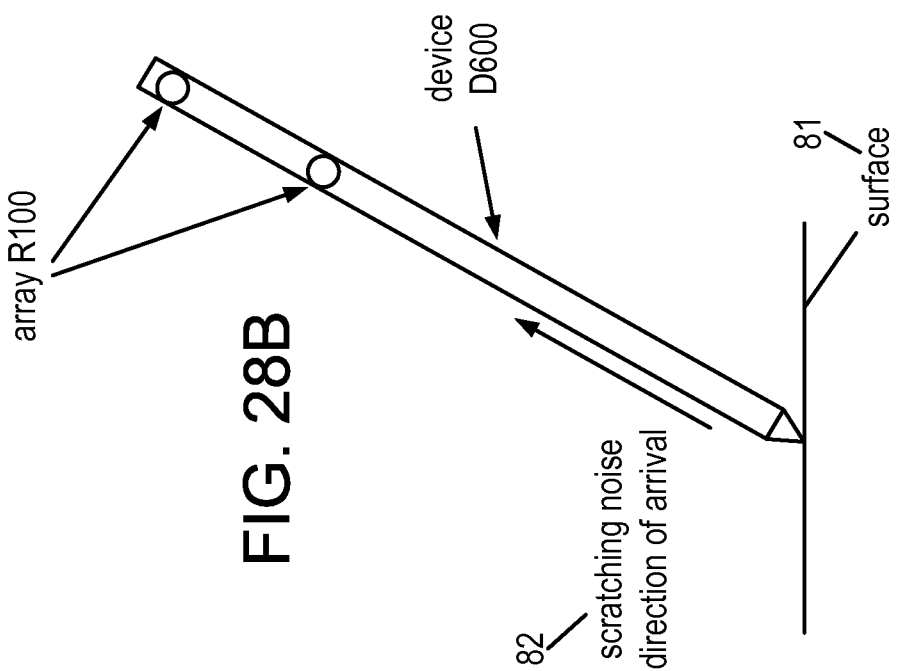
FIG. 28B shows a diagram of a multi-microphone writing device D600.
Figure 28A:
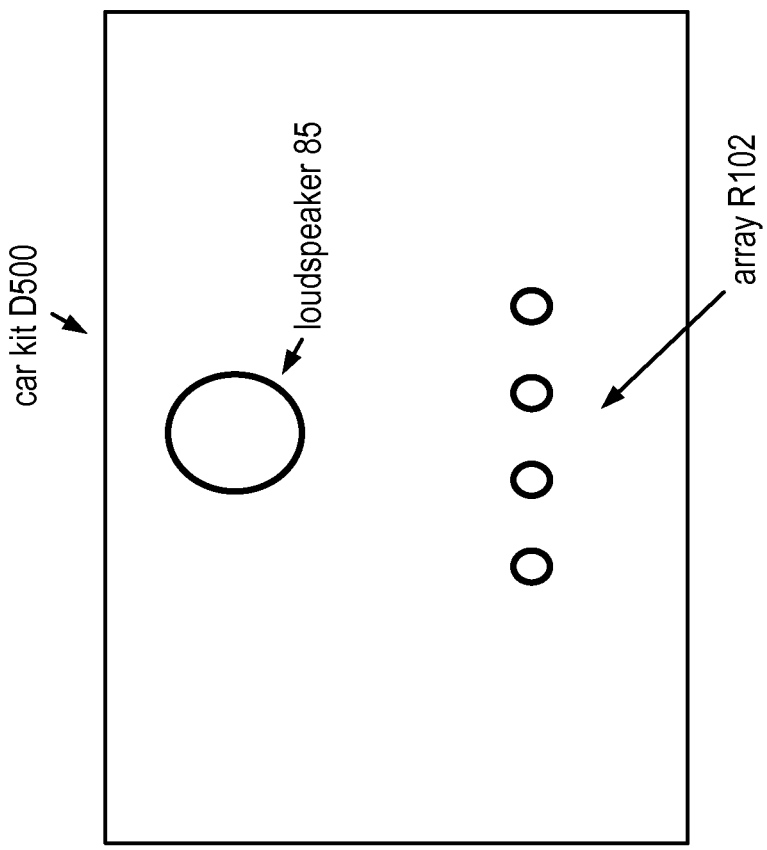
FIG. 28A shows a diagram of a multi-microphone hands-free car kit D500.

FIG. 28A shows a diagram of a multi-microphone portable audio sensing implementation D500 of device D10 that is a hands-free car kit. Such a device may be configured to be installed in or on or removably fixed to the dashboard, the windshield, the rear-view mirror, a visor, or another interior surface of a vehicle. Device D500 includes a loudspeaker 85 and an implementation of array R100. In this particular example, device D500 includes an implementation R102 of array R100 as four microphones arranged in a linear array. Such a device may be configured to transmit and receive voice communications data wirelessly via one or more codecs, such as the examples listed above. Alternatively or additionally, such a device may be configured to support half- or full-duplex telephony via communication with a telephone device such as a cellular telephone handset (e.g., using a version of the Bluetooth™ protocol as described above).

FIG. 28B shows a diagram of a multi-microphone portable audio sensing implementation D600 of device D10 that is a writing device (e.g., a pen or pencil). Device D600 includes an implementation of array R100. Such a device may be configured to transmit and receive voice communications data wirelessly via one or more codecs, such as the examples listed above. Alternatively or additionally, such a device may be configured to support half- or full-duplex telephony via communication with a device such as a cellular telephone handset and/or a wireless headset (e.g., using a version of the Bluetooth™ protocol as described above). Device D600 may include one or more processors configured to perform a spatially selective processing operation to reduce the level of a scratching noise 82, which may result from a movement of the tip of device D600 across a drawing surface 81 (e.g., a sheet of paper), in a signal produced by array R100.

The class of portable computing devices currently includes devices having names such as laptop computers, notebook computers, netbook computers, ultra-portable computers, tablet computers, mobile Internet devices, smartbooks, or smartphones. Such devices typically have a top panel that includes a display screen and a bottom panel that may include a keyboard, wherein the two panels may be connected in a clamshell or other hinged relationship.

FIG. 29A shows a front view of an example of such an implementation D700 of device D10 that includes four microphones MC10, MC20, MC30, MC40 arranged in a linear array on top panel PL10 above display screen SC10. FIG. 29B shows a top view of top panel PL10 that shows the positions of the four microphones in another dimension. FIG. 29C shows a front view of another example of such a portable computing device D710 that includes four microphones MC10, MC20, MC30, MC40 arranged in a nonlinear array on top panel PL12 above display screen SC10. FIG. 29D shows a top view of top panel PL12 that shows the positions of the four microphones in another dimension, with microphones MC10, MC20, and MC30 disposed at the front face of the panel and microphone MC40 disposed at the back face of the panel.

Figure 30:
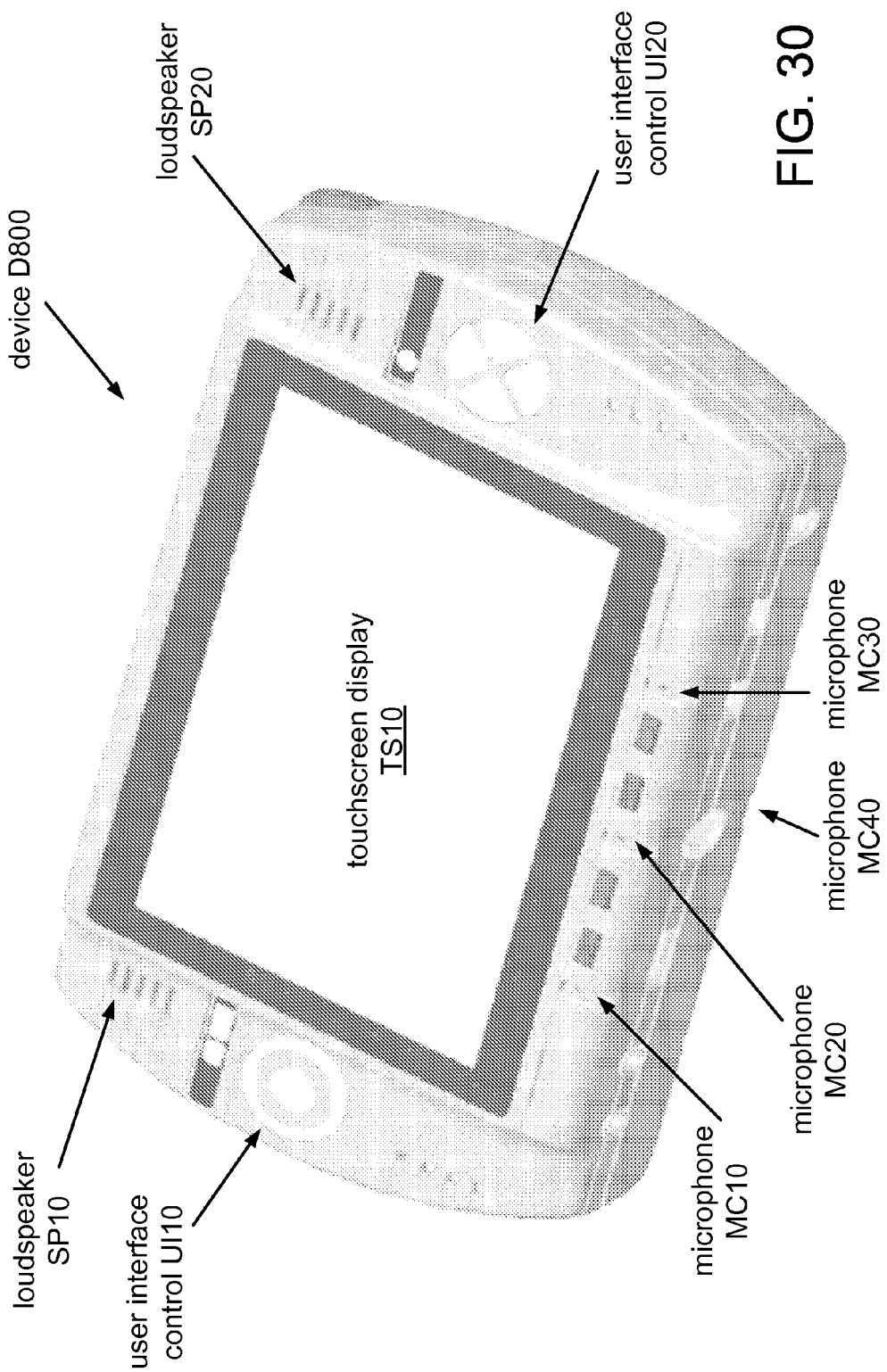
FIG. 30 shows a diagram of a multi-microphone portable audio sensing implementation D800 of device D10.

FIG. 30 shows a diagram of a multi-microphone portable audio sensing implementation D800 of device D10 for handheld applications. Device D800 includes a touchscreen display TS10, three front microphones MC10 to MC30, a back microphone MC40, two loudspeakers SP10 and SP20, a left-side user interface control (e.g., for selection) UI10, and a right-side user interface control (e.g., for navigation) UI20. Each of the user interface controls may be implemented using one or more of pushbuttons, trackballs, click-wheels, touchpads, joysticks and/or other pointing devices, etc. A typical size of device D800, which may be used in a browse-talk mode or a game-play mode, is about fifteen centimeters by twenty centimeters. It is expressly disclosed that applicability of systems, methods, and apparatus disclosed herein is not limited to the particular examples shown in FIGS. 24A to 30. Other examples of portable audio sensing devices to which such systems, methods, and apparatus may be applied include hearing aids.

It may be desirable to extend method M100 to process more than one multichannel signal. As discussed with reference to the examples below, for example, an extended implementation M300 of method M100 may be used to support operations that may not be available with only one microphone pair.

FIG. 31A shows a flowchart of method M300, which includes a first instance T100a of task T100 that calculates a first plurality of phase differences, based on a first multichannel signal, and a second instance T100b of task T100 that calculates a second plurality of phase differences, based on a second multichannel signal. Method M300 may also be implemented to include additional instances of task T100 that are configured to calculate additional pluralities of phase differences, based on respective additional multichannel signals. Method M300 also includes a task T280 that calculates a value of a coherency measure based on information from the first and second (and possibly other) pluralities of phase differences.

FIG. 31B shows a flowchart of an implementation T288 of task T280. Task T288 includes a first instance T200a of task T200 that calculates a value of a first coherency measure, based on information from the first plurality of phase differences. Task T288 also includes a second instance T200b of task T200 that calculates a value of a second coherency measure, based on information from the second plurality of phase differences. Task T288 may also be implemented to include additional instances of task T200 that are configured to calculate values of additional coherency measures based on phase differences calculated from respective additional multichannel signals.

Task T288 also includes a task T610 that combines the values of the component coherency measures (in this example, the first and second coherency measures) to obtain a value of a composite coherency measure. For example, task T610 may be configured to calculate the composite coherency measure based on a product of the component coherency measures. For a case in which the values of the component coherency measures are binary (e.g., coherence indications as described above), such a product may be calculated using a logical AND operation.

FIG. 31C shows a flowchart of an implementation T282 of task T280 and of task T202. Task T282 includes a first instance T210a of task T210 that is arranged to calculate a corresponding direction indicator for each of the first plurality of phase differences calculated by task T100a, and a first instance T220a of task T220 that is arranged to rate the direction indicators to produce a first set of rating results (e.g., a first vector of mask scores). Task T282 also includes at least a second instance T210b of task T210 that is arranged to calculate a corresponding direction indicator for each of the second plurality of phase differences calculated by task T100b, and a corresponding second instance T220b of task T220 that is arranged to rate the direction indicators to produce a second set of rating results (e.g., a second vector of mask scores).

Task T282 also includes a task T620 that is configured to merge the first and second (and possibly additional) sets of rating results to produce a merged set of rating results, and an instance of task T230 that is arranged to calculate a value of a coherency measure based on the merged set of rating results (e.g., as a sum of the values of the frequency components of interest as weighted by the merged set of rating results). Task T620 may be configured to merge the sets of rating results by calculating each rating result of the merged set as an average (e.g., the mean) of the corresponding rating results from the various instances of task T220. Alternatively, task T620 may be configured to merge the sets of rating results by calculating each rating result of the merged set as the least among the corresponding rating results from the various instances of task T220. For binary-valued rating results, task T620 may be configured to merge the sets of rating results by calculating each rating result of the merged set as the logical AND of the corresponding rating results from the various instances of task T220.

In one such example, task T220a produces a set of rating results that correspond to frequency components in the range of two hundred to one thousand Hertz, and task T220b produces a set of rating results that correspond to frequency components in the range of five hundred to two thousand Hertz. In this example, task T620 may be configured to produce a set of merged rating results that correspond to frequency components in the range of two hundred to two thousand Hertz, such that each merged rating result for the range of two hundred up to five hundred Hertz is the corresponding rating result produced by task T220a (i.e., the average of itself), each merged rating result for the range of from one thousand to two thousand Hertz is the corresponding rating result produced by task T220b, and each merged rating result for the range of five hundred to one thousand Hertz is the mean of the corresponding rating results produced by tasks T220a and T220b.

FIG. 32A shows a flowchart of an implementation T284 of task T280 and of task T204. Task T284 includes a first instance T240a of task T240 that is arranged to use a corresponding masking function to rate each of the first plurality of phase differences calculated by task T100a, a second instance T240b of task T240 that is arranged to use a corresponding masking function to rate each of the second plurality of phase differences calculated by task T100b, and possibly additional instances of task T240 arranged to rate pluralities of phase differences calculated by respective additional instances of task T100. Task T284 also includes an instance of task T620 that is arranged to merge the first and second (and possibly additional) sets of rating results to produce a merged set of rating results, and an instance of task T230 that is arranged to calculate a value of a coherency measure based on the merged rating results.

FIG. 32B shows a flowchart of an implementation T286 of task T280 and of task T206. Task T286 includes at least first and second instances T210a and T210b of task T210 that are arranged to calculate corresponding pluralities of direction indicators for the pluralities of phase differences calculated by each instance of task T100. Task T286 also includes at least first and second instances T250a and T250b of task T250 that are arranged to calculate corresponding coherency measures for each of the pluralities of direction indicators, and an instance of task T610 that is arranged to combine the values of the component coherency measures to obtain a value of a composite coherency measure.

One example of an application for method M300 is to calculate a coherency measure that is based on phase differences over a wider frequency range than may be observed using a single microphone pair. As noted above, the frequency range over which phase differences may be reliably calculated may be limited from above by spatial aliasing and from below by the maximum observable phase difference. Consequently, it may be desirable to apply method M300 to calculate a coherency measure based on phase differences that are calculated from signals recorded from more than one microphone pair. The respective instances of task T200 may be configured to use the same directional masking function, or the passbands and/or profiles of the respective masking functions may differ according to the frequency range being targeted by each instance. For example, it may be desirable to use a more narrow passband for an instance of task T200 that corresponds to a lower frequency range.

FIG. 32C shows one example of a multi-pair implementation of array R100 that includes three microphones MC10, MC20, and MC30. In this example, a first multichannel signal is based on the signals recorded by microphones MC10 and MC20, and a second multichannel signal is based on the signals recorded by microphones MC10 and MC30. Because the distance between microphones MC10 and MC20 is less than the distance between microphones MC10 and MC30, the first multichannel signal may be used for calculating phase differences at higher frequencies than the second multichannel signal, and the second multichannel signal may be used for calculating phase differences at lower frequencies than the first multichannel signal. An implementation of method M300 may be used to process the two multichannel signals to obtain a composite coherency measure that indicates a degree of directional coherence over a greater frequency range than may be reliably supported by either microphone pair alone.

FIG. 32C shows a linear microphone array, but a nonlinear arrangement may also be used so long as the different orientations of the microphone pairs are taken into account. Although microphone MC10 is common to both pairs in the array of FIG. 32C, it is also possible to obtain the first and second multichannel signals from pairs that have no microphones in common.

A phase difference between frequency components arriving at two microphones of an array corresponds ideally to a particular angle with respect to the axis of the array (with the vertex of the angle being at some reference point along that axis, such as the center of one of the microphones or the midpoint between the microphones). Consequently, components of equal frequencies that are received from sources which are at different locations in space with respect to the array (e.g., sources 1 and 2 in FIG. 33A) but satisfy the same angular relation with respect to the array axis will ideally have the same phase difference.

A directional masking function is typically defined over a half-plane that includes the axis of the microphone array (i.e., over a spatial range of 180 degrees), such that the function's response is roughly symmetrical in space around the array axis. (In practical terms, the extent of this symmetry may be limited by such factors as directionality in the responses of the microphones, reflections from one or more surfaces of the device, occlusion of a microphone with respect to particular source directions, etc.) Such symmetry of the masking function may be acceptable or even desirable when sound from a desired source is expected to arrive from an endfire direction, as in the example of FIG. 33B. When the passband of the masking function is configured to look in a broadside direction, however, as in the example of FIG. 33C, it may be desired to distinguish between sounds arriving from one side of the axis (e.g., a front side of the device) and sounds arriving from the other side of the axis (e.g., a back side of the device).

Another example of an application for method M300 is to provide directional selection in more than one dimension and/or over more than one face of a device. FIG. 33D shows such an example in which two microphones MC30 and MC40 have been added to the array of FIG. 33C. In this case, method M300 is configured to apply a broadside-directed masking function as shown in FIG. 33C to a first multichannel signal that is based on the signals from microphones MC10 and MC20, to apply an endfire-directed masking function as shown in FIG. 33D to a second multichannel signal that is based on the signals from microphones MC30 and MC40, and to produce a coherency measure that indicates a degree of coherence over the intersection in space of the passbands of the two masking functions. In a typical use of such an arrangement, microphones MC10, MC20, and MC30 are located on a front face of a device (i.e., facing the user), microphone MC40 is located on a back face of the device, and method M300 operates to indicate coherence with respect to a region of desired coverage (e.g., approximating a cone) at the front of the device.

Figure 34B:
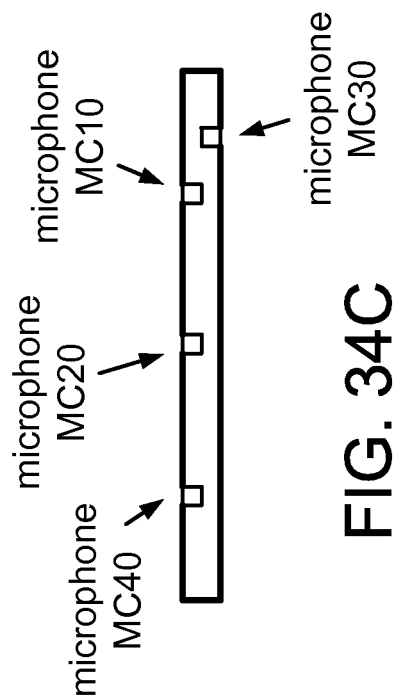
FIG. 34B shows another example of an application of a three-microphone array.
Figure 34C:
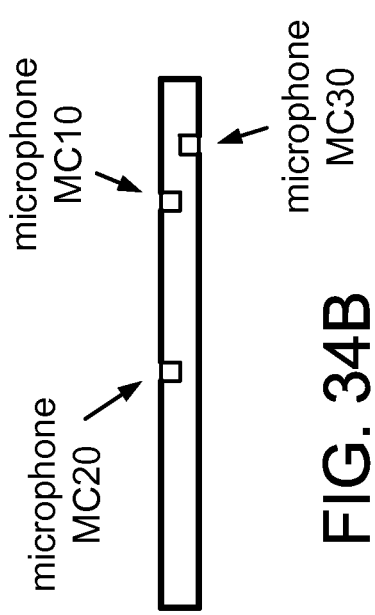
FIG. 34C shows an example of an application of a four-microphone array.
Figure 34A:
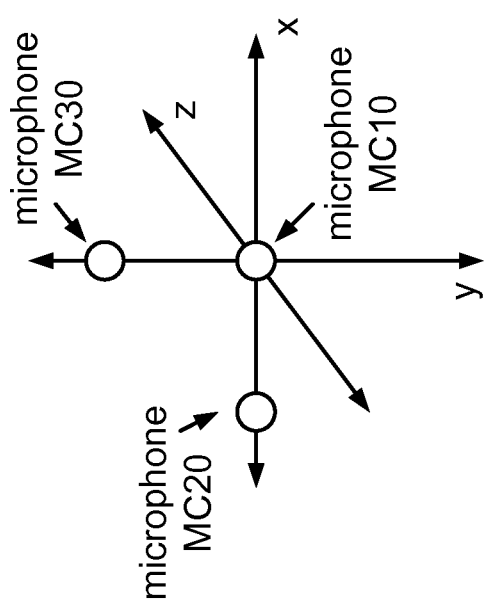
FIG. 34A shows a general example of a three-microphone array.

FIG. 34A shows a general example of a three-microphone array that may be used in a portable audio sensing device. In such a case, method M300 may be configured to apply a first masking function to the channels from microphones MC10 and MC20 to discriminate among angles in a left-right direction (i.e., in the xy plane), and a second masking function to the channels of microphones MC10 and MC30 to discriminate among angles in an up-down direction (i.e., in the yz plane). Such an implementation of method M300 may be configured to combine results from these two composite masking functions to indicate coherence with respect to a selected range of directions in a three-dimensional volume, which may be considered as a cone of coverage. In another example of such an application, each of the composite masking functions is applied to the channels of a different pair of microphones of an array of four or more microphones.

FIG. 34B shows another example of an application of a three-microphone array that may be used in a portable audio sensing device. In such a case, method M300 may be configured to apply a first masking function to the channels of microphones MC10 and MC20 to discriminate an angle in a left-right direction, and to apply a second masking function to the channels of microphones MC10 and MC30 to pass sound arriving from a forward direction and reject sound arriving from a backward direction. In a laptop or netbook implementation, for example, it may be desirable to discriminate between sounds arriving from the front of the array and sound arriving from the back of the array. In another example of such an application, each of the composite masking functions is applied to the channels of a different pair of microphones of an array of four or more microphones. One example of a four-microphone array for such an application includes a forward-facing set of three microphones and a backward-facing microphone. The signals from two of the forward-facing microphones may be used to cover a range of user positions, and the signals from another forward-facing microphone and the backward-facing microphone may be used to discriminate between signals arriving from the front and back direction. In FIG. 34C, for example, the channels of microphones MC20 and MC40 may be used for left-right discrimination.

In another example of a four-microphone array, the microphones are arranged in a roughly tetrahedral configuration such that one microphone is positioned behind (e.g., about one centimeter behind) a triangle whose vertices are defined by the positions of the other three microphones, which are spaced about three centimeters apart. Potential applications for such an array include a handset operating in a speakerphone mode, for which the expected distance between the speaker's mouth and the array is about twenty to thirty centimeters. FIG. 35A shows a front view of an implementation D320 of handset D300 that includes four microphones MC10, MC20, MC30, MC40 arranged in a roughly tetrahedral configuration. FIG. 35B shows a side view of handset D320 that shows the positions of microphones MC10, MC20, MC30, and MC40 within the handset.

Another example of a four-microphone array for a handset application includes three microphones at the front face of the handset (e.g., near the 1, 7, and 9 positions of the keypad) and one microphone at the back face (e.g., behind the 7 or 9 position of the keypad). FIG. 35C shows a front view of an implementation D330 of handset D300 that includes four microphones MC10, MC20, MC30, MC40 arranged in a "star" configuration. FIG. 35D shows a side view of handset D330 that shows the positions of microphones MC10, MC20, MC30, and MC40 within the handset.

For some applications, the expected range of directions of arrival of the desired sound (e.g., the user's voice) is typically limited to a relatively narrow range. In such cases (e.g., for a typical headset or handset application), a single directional masking function may be wide enough to include the expected range of directions of arrival of the desired sound in the corresponding dimension, yet narrow enough to provide a sufficiently high signal-to-noise ratio (SNR) for reliable detection of a wideband coherent signal (e.g., by rejecting frequency components produced by noise sources outside the allowable range).

For other applications, however, a single masking function with an admittance range that is wide enough to include a desired range of directions of arrival may admit too much noise to be able to reliably distinguish a wideband coherent signal from interference. For example, many consumer devices, such as laptops, smart phones and emerging devices such as MIDs (Mobile Internet Devices), support a range of different user interface modes, and it may not necessarily be clear from which direction the user is speaking in a given situation. Such devices typically have larger display screens and may allow a wide range of possible microphone placement and simultaneous microphone signal acquisition. In a "browse talk" mode, for example, a user may look at the display screen while chatting or have a conversation over a video link. As the user's mouth is typically located further away from the microphones during such a mode, maintaining a pleasant communications experience may involve substantial speech enhancement processing.

For a typical laptop or netbook or hands-free carkit application, it may be desirable to allow for a wide range of possible speaker positions, such as a range of allowable directions of arrival of up to 180 degrees. It may be expected, for example, that the user may move from side to side in front of a portable computing device D700 or D710, toward and away from the device, and/or even around the device (e.g., from the front of the device to the back) during use. For other applications (e.g., conferencing), it may be desirable to allow for an even greater range of possible speaker positions.

Unfortunately, masking functions that have wide admittance ranges may also pass sound from noise sources. While widening the admittance angle of a masking function may allow a greater range of directions of arrival, such widening may also reduce the method's ability to distinguish a signal that is directionally coherent over the desired range of frequencies from background noise. For applications that use two or more microphones to provide a wide admittance angle (e.g., a carkit or laptop or netbook application), it may be desirable to use multiple directional masking functions to divide the desired admittance angle into corresponding sectors, where each sector is defined as the passband of the corresponding masking function.

To achieve such desired speaker localization and/or spatial discrimination of sound, it may be desirable to generate narrow spatial sectors in different directions around the microphone array in order to accurately determine the position of a sound source (e.g., the user). With two microphones, relatively narrow sectors can typically only be created in endfire directions, while broadside sectors are typically much wider. With three, four, or more microphones, however, narrower sectors are typically possible in all directions.

Figure 36B:
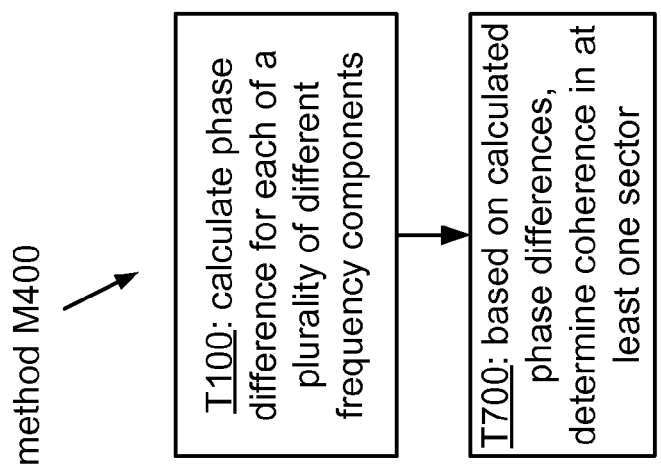
FIG. 36B shows a flowchart of an implementation M400 of method M100.
Figure 36A:
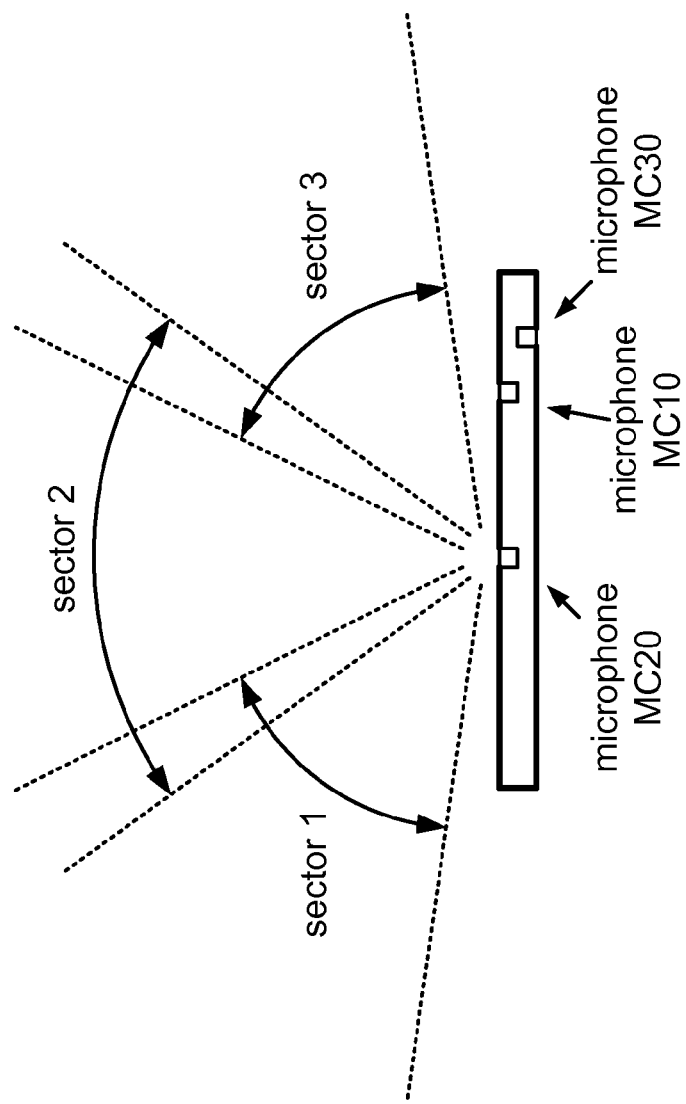
FIG. 36A shows an example of an application in which a wide admittance angle is divided into three overlapping sectors.

It may be desirable to design an overlap among adjacent sectors (e.g., to ensure continuity for desired speaker movements, to support smoother transitions, and/or to reduce jitter). FIG. 36A shows one example of an application in which a wide admittance angle (spanning a desired range of directions of arrival at microphone MC20 with respect to microphone MC10) is divided into three overlapping sectors. In another particular example, an admittance angle of 180 degrees is divided into nine overlapping sectors (e.g., for a netbook or laptop application).

In a general case, any admittance angle may be divided into sectors, and an arbitrary number of sectors may be used (e.g., depending on a desired tradeoff between the width of each sector on one hand and the available computational resources on the other hand). The sectors may have the same angular width (e.g., in degrees or radians) as one another, or two or more (possibly all) of the sectors may have different widths from one another. It may be desirable, for example, to implement each mask to have a bandwidth of about twenty degrees in the center (i.e., at the array) and wider at the maximum allowable distance.

One example of a handset operating in a speakerphone mode uses three masking functions, each being about ninety degrees wide, with one mask directed at the user, one directed 45 degrees left of the user, and the other directed 45 degrees right of the user. In another example, a carkit application is implemented to include a sector oriented toward the driver's head, a sector oriented between the driver's head and the middle, a sector oriented toward the middle, and a sector oriented toward the front-seat passenger's head. In a further example, a carkit application is implemented to include a sector oriented toward the driver's door or window, a sector oriented toward the driver's seat or head, and a sector oriented toward the middle (i.e., between the driver and the front-seat passenger). Such an application may also include a sector oriented toward the passenger's head. A carkit application may include the ability to manually select (e.g., via a button or other user interface) the driver or the passenger to be the desired speaker.

It may be desirable to configure a multi-sector application such that a wideband coherent signal may be detected anywhere within the composite admittance angle, so long as the signal is wideband coherent within one of the sectors. FIG. 36B shows a flowchart of an implementation M400 of method M100 that includes at least one instance of task T100 and a task T700. Based on the phase differences calculated by task T100, task T700 determines whether the corresponding multichannel signal is coherent in any of a plurality of sectors. Detection of a coherent signal in such manner may be used to support voice activity detection and/or noise reduction operations (e.g., as described in more detail above).

Figure 37:
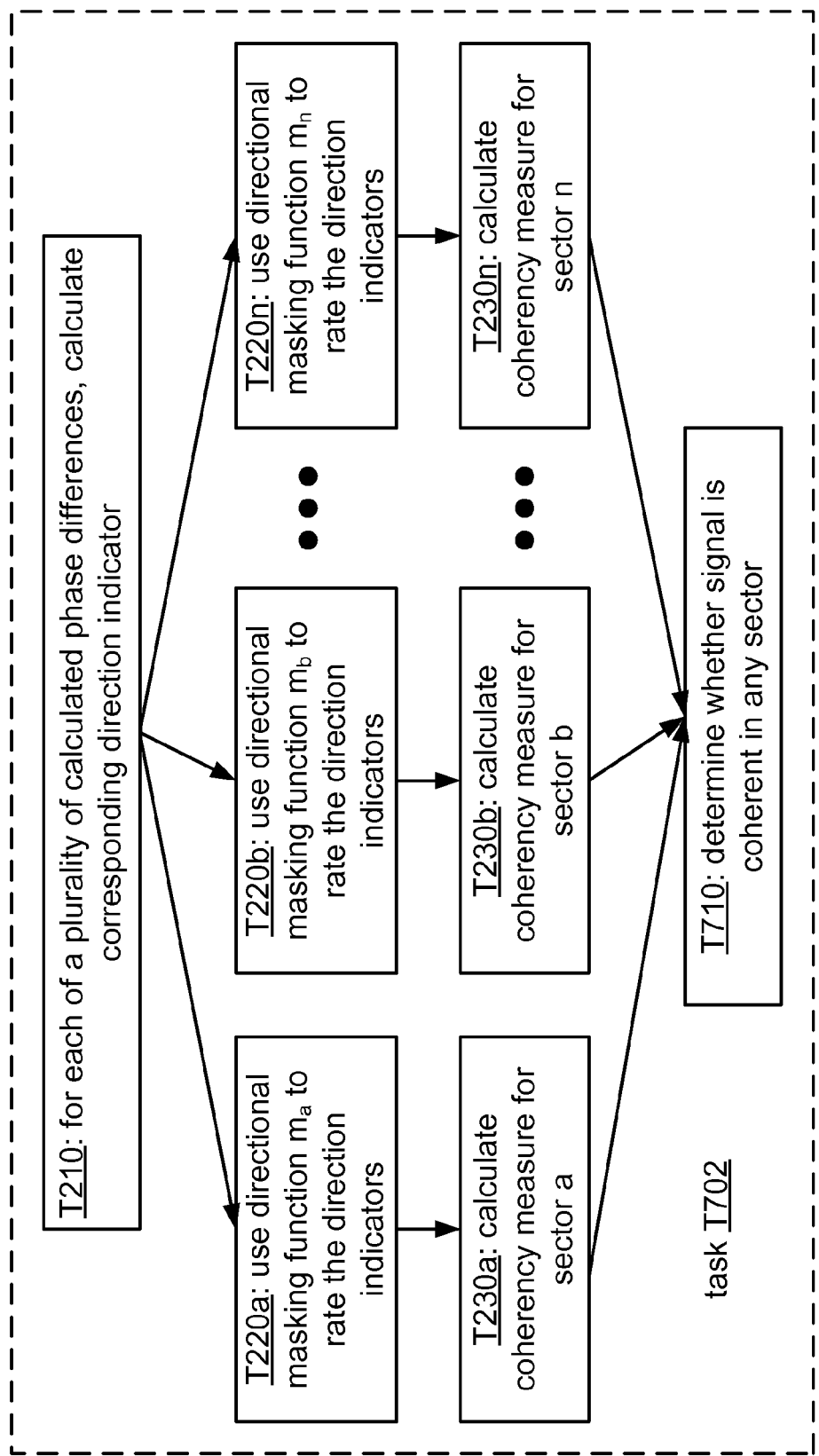
FIG. 37 shows a flowchart of such an implementation T702 of task T700.

It may be desirable to configure task T700 to include an instance of coherency measure evaluation task T230 for each component masking function. FIG. 37 shows a flowchart of such an implementation T702 of tasks T700 and T202 for an n-sector application, where n is an integer greater than one. Task T702 includes n instances T220a, T220b, ..., T220n of subtask T220, where each instance j is configured to use a respective one of n directional masking functions (i.e., the function corresponding to the j-th sector) to rate the direction indicators produced by task T210. It may be desirable to implement the various directional masking functions using a split-band structure and/or an overlap-save framework.

Task T702 also includes n instances T230a, T230b, ..., T230n of subtask T230. Each instance of task T230 is configured to calculate a coherency measure for the signal, with respect to the corresponding sector, based on the rating results produced by the corresponding instance of task T220. It may be desirable to configure each of the various instances of task T230 to produce the corresponding coherency measure as a temporally smoothed value. In one such example, each instance of task T230 is configured to calculate a smoothed coherency measure $z(n)$ for frame n according to an expression such as $z(n)=\beta z(n-1)+(1-\beta)c(n)$, where $z(n-1)$ denotes the smoothed coherency measure for the previous frame, $c(n)$ denotes the current value of the coherency measure, and $\beta$ is a smoothing factor whose value may be selected from the range of from zero (no smoothing) to one (no updating). Typical values for smoothing factor $\beta$ include 0.1, 0.2, 0.25, 0.3, 0.4, and 0.5. It is possible for such a task to use different values of smoothing factor $\beta$ at different times (e.g., during activation of the audio sensing circuitry vs. during steady-state). It is typical, but not necessary, for instances of such a task T230 that correspond to different sectors to use the same value of $\beta$.

Task T702 also includes a subtask T710 that is configured to determine whether the multichannel signal is coherent in any of the n sectors, based on the corresponding coherency measures. For example, task T710 may be configured to indicate whether any of the coherency measures exceeds (alternatively, is at least equal to) a corresponding threshold value. It may be desirable to configure task T710 to use a higher threshold value for one sector than for another. Spatially distributed noise tends to have an average direction of arrival over time that is perpendicular to the axis of the microphone pair, such that a broadside sector (a sector that includes a direction perpendicular to the axis of the microphone pair) is likely to encounter more of such noise than an endfire sector (a sector that includes the axis of the microphone pair). Consequently, it may be desirable to use a higher threshold value (e.g., 0.4, 0.5, 0.6, or 0.7) for a broadside sector than for an endfire sector (e.g., 0.2, 0.3, 0.4, or 0.5). Similarly, it may be desirable for a broadside sector to be directed slightly off axis (e.g., to reduce the amount of distributed noise that is admitted).

FIG. 38A shows a flowchart of an implementation T704 of tasks T700 and T204 for an n-sector application. Task T704 includes an implementation T245 of subtask T240 that rates each of the phase differences using a multisector masking function. For example, task T245 may be configured to indicate, for each sector, whether (and/or how well) each phase difference falls within a range of allowable phase differences for that frequency component at that sector.

It may be desirable to configure task T710 to indicate the sector or sectors within which a coherent signal is detected. Such an implementation T712 of task T710 may be configured to indicate the sector (or sectors) whose coherency measure is greatest, for example, or the sector (or sectors) whose coherency measure has the greatest contrast. In such case, the contrast of a coherency measure may be expressed as the value of a relation (e.g., the difference or the ratio) between the current value of the coherency measure and an average value of the coherency measure over time (e.g., over the most recent ten, twenty, fifty, or one hundred frames).

It may be expected that task T712 will indicate different sectors over time (e.g., as the relative position of the desired sound source moves from one sector to another). It may be desirable to inhibit task T712 from switching sectors (i.e., from indicating a sector different than the current sector) unless the coherency measure for the target sector exceeds (alternatively, is not less than) a threshold value for that sector. For example, it may be desirable to configure such an implementation of task T712 to continue to indicate the current sector if such a condition is not met, even if the coherency measure for the target sector currently has the greatest value or the greatest contrast. As noted above, it may be desirable to use a higher threshold value (e.g., 0.4, 0.5, 0.6, or 0.7) for a broadside sector than for an endfire sector (e.g., 0.2, 0.3, 0.4, or 0.5).

It may be desirable to produce a masked signal based on at least one channel of the multichannel signal (e.g., as described above with reference to task T310) in which each frame is obtained using the masking function that corresponds to the sector identified by task T712 for that frame. Such an operation may include, for example, attenuating frequency components and/or subbands of a primary channel, and/or passing fewer than all subbands of the primary channel, based on the mask scores of the corresponding masking functions. Other implementations of method M400 may be configured to include similar tasks configured to produce an audio signal based on one or more channels of the multichannel signal according to the sector selection indicated by task T712 (e.g., to apply a beam or other filter that is associated with a particular selected sector to at least one channel of the multichannel signal).

It may be desirable to implement task T712 to include logic to support a smooth transition from one sector to another. For example, it may be desirable to configure task T712 to include an inertial mechanism, such as hangover logic, which may help to reduce jitter. Such hangover logic may be configured to inhibit task T712 from switching to a target sector unless the conditions that indicate switching to that sector (e.g., as described above) continue over a period of several consecutive frames (e.g., two, three, four, five, ten, or twenty frames).

Task T710 may be implemented to indicate more than one coherent sector at a time. For example, such an implementation of task T710 may be configured to indicate which sectors have coherency measures that are higher than (alternatively, not less than) the corresponding threshold values. An implementation of method M400 that includes such a task may be configured to produce a masked signal according to rating results and/or coherency measures from the more than one indicated sectors. Multiple sector indications may be used to track more than one desired source (e.g., in a conferencing application). Tracking multiple sources, however, is also likely to admit more noise into the output. Alternatively or additionally, task T710 may be configured to include logic to indicate when no coherent sector is detected for a long time (e.g., 0.25, 0.5, one, or two seconds), in which case it may be desirable to apply more noise reduction.

It may be desirable to configure task T710 to produce a coherency measure that is based on the sector-specific coherency measures. One such example of task T710 produces, for each frame of the multichannel signal, a composite coherency measure that is based on (e.g., is equal to) the greatest among the coherency measures of the various sectors for that frame. Another such example of task T710 produces a composite coherency measure for each frame that is based on (e.g., is equal to) the sector-specific coherency measure that currently has the greatest contrast. An implementation of task T710 may be configured to produce the composite coherency measure as a temporally smoothed value (e.g., according to any of the temporal smoothing techniques described herein).

An implementation of method M400 may be configured to use a coherency measure produced by task T710 for VAD indication and/or for noise reduction (e.g., for noise modification as described above with reference to task T400 and/or for noise estimation as described above with reference to tasks T500 and T550). Alternatively or additionally, an implementation of method M400 may be configured to apply a gain factor based on the value of a coherency measure produced by task T710 to at least one channel of the multichannel signal, such as a primary channel. Such an implementation of method M400 may be configured to smooth the value of such a gain factor over time (e.g., according to any of the temporal smoothing techniques described herein).

It may be desirable to configure task T710 to temporally smooth values and/or structures across a sector switching operation. For example, task T710 may be configured to smooth a transition from a beam associated with one sector to a beam associated with another sector, and/or to smooth a transition from one or more values (e.g., mask scores and/or a coherency measure) of one sector to corresponding values of another sector. Such smoothing may be performed according to an expression such as $r=\mu q+(1-\mu)p$, where p denotes a value or structure associated with the current sector, q denotes a corresponding value or structure associated with the target sector, r denotes the blended value or structure, and $\mu$ a denotes a smoothing factor whose value increases over the range of from zero to one over a period of several frames (e.g., two, three, four, five, or ten frames).

Method M400 may also be configured to receive two or more multichannel signals, each from a different microphone pair, and to indicate whether coherence is detected in any sector of any of the multichannel signals. For example, such an implementation of method M400 may be configured to process multichannel signals from different microphone pairs of a linear array.

Figure 39:
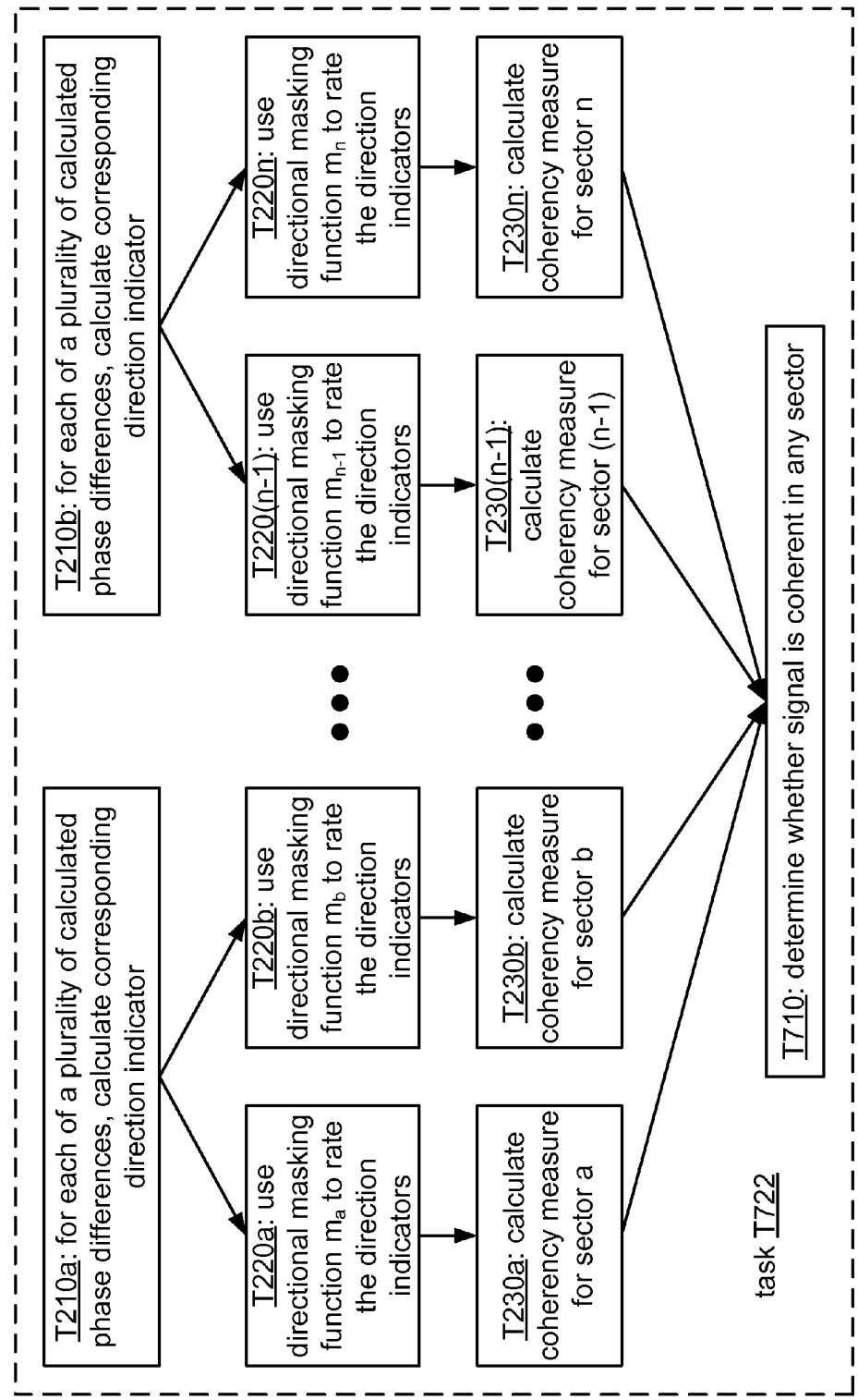
FIG. 39 shows a flowchart of an implementation T722 of task T720.

FIG. 38B shows a flowchart of such an implementation M410 of method M400 that includes multiple instances of task T100, each configured to calculate a plurality of phase differences from a corresponding multichannel signal. Method M410 also includes an implementation T720 of task T700 that determines whether any of the multichannel signals are coherent in any sector, based on information from the pluralities of calculated phase differences. FIG. 39 shows a flowchart of an implementation T722 of tasks T720 and T702. Task T720 may also be implemented as an extended implementation of task T704 in similar fashion.

In one example of an application of method M410, task T210a receives a first multichannel signal from microphones MC40 and MC20 of the array shown in FIG. 34C, and task T210b receives a second multichannel signal from microphones MC20 and MC10 of the array. In this particular example, task T722 applies masking functions to the first multichannel signal that cover approximately a ninety-degree range from the endfire direction of microphone MC40 to a broadside direction (i.e., a direction perpendicular to the array axis), and task T722 applies masking functions to the second multichannel signal that cover approximately a ninety-degree range from the endfire direction of microphone MC10 to the broadside direction.

Additionally or in the alternative, method M100 may be configured as an implementation of both of directional-selection method M300 and sector-selecting method M400, such that the sector selection of method M400 is performed on at least one of the multichannel signals processed by method M300. For example, such an implementation of method M400 may be configured to process multichannel signals from different microphone pairs of a nonlinear array.

Figure 40:
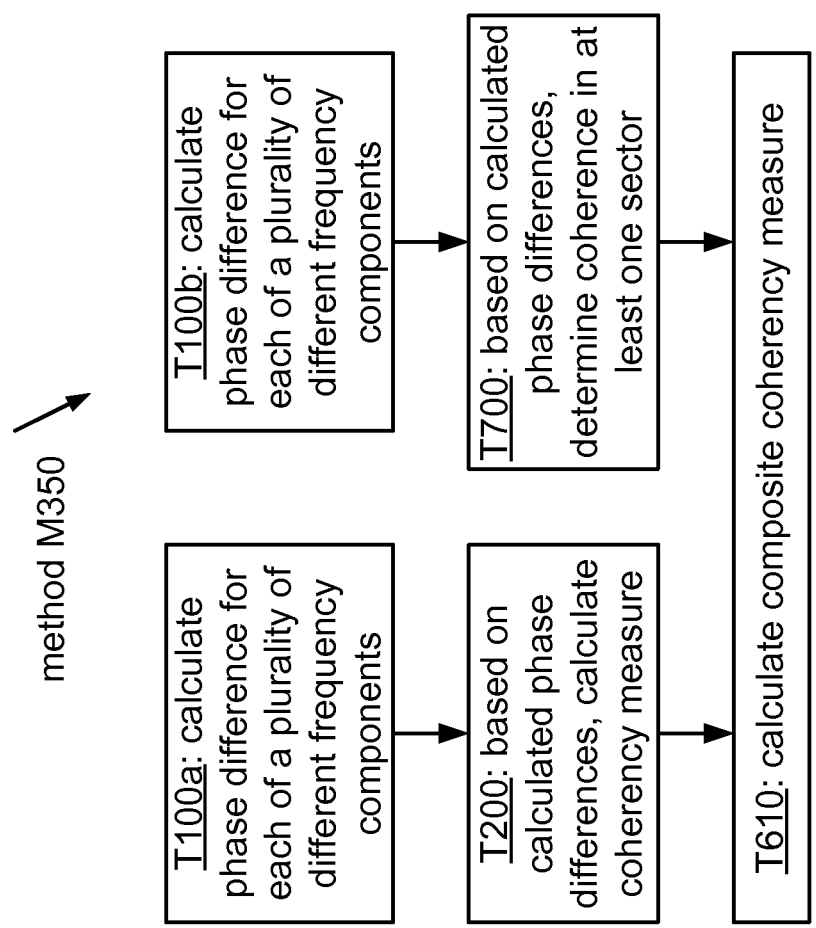
FIG. 40 shows a flowchart of an implementation M350 of method M300.

FIG. 40 shows a flowchart of such an implementation M350 of methods M300 and M400 that includes multiple instances of task T100, each configured to calculate a plurality of phase differences from a corresponding multichannel signal. Method M350 also includes an instance of task T200 that is configured to calculate a value of a coherency measure for one of the multichannel signals, and an instance of task T700 that is configured to determine whether another of the multichannel signals is coherent in any sector. Method M350 also includes an instance of task T610 that is configured to combine the coherency measure from task T200 with the coherence indication produced by task T700 to produce a composite coherency measure. In one example of an application of method M350, the passband of the masking function of task T200 covers the front face of a device, and task T700 divides the face of the device into sectors.

An implementation of method M100 may be configured to include a spatially selective processing operation that is directionally configurable (e.g., steerable) according to the sector selection of task T712. For example, such an implementation of method M100 may be configured to perform a beamforming operation on the microphone channels such that the beam is selectably directed (e.g., steered) according to the sector selection. The beamformer may be configured to perform such selectable direction by selecting among a plurality of fixed beamformers or by changing the beam direction of an adaptive beamformer.

Figure 41:
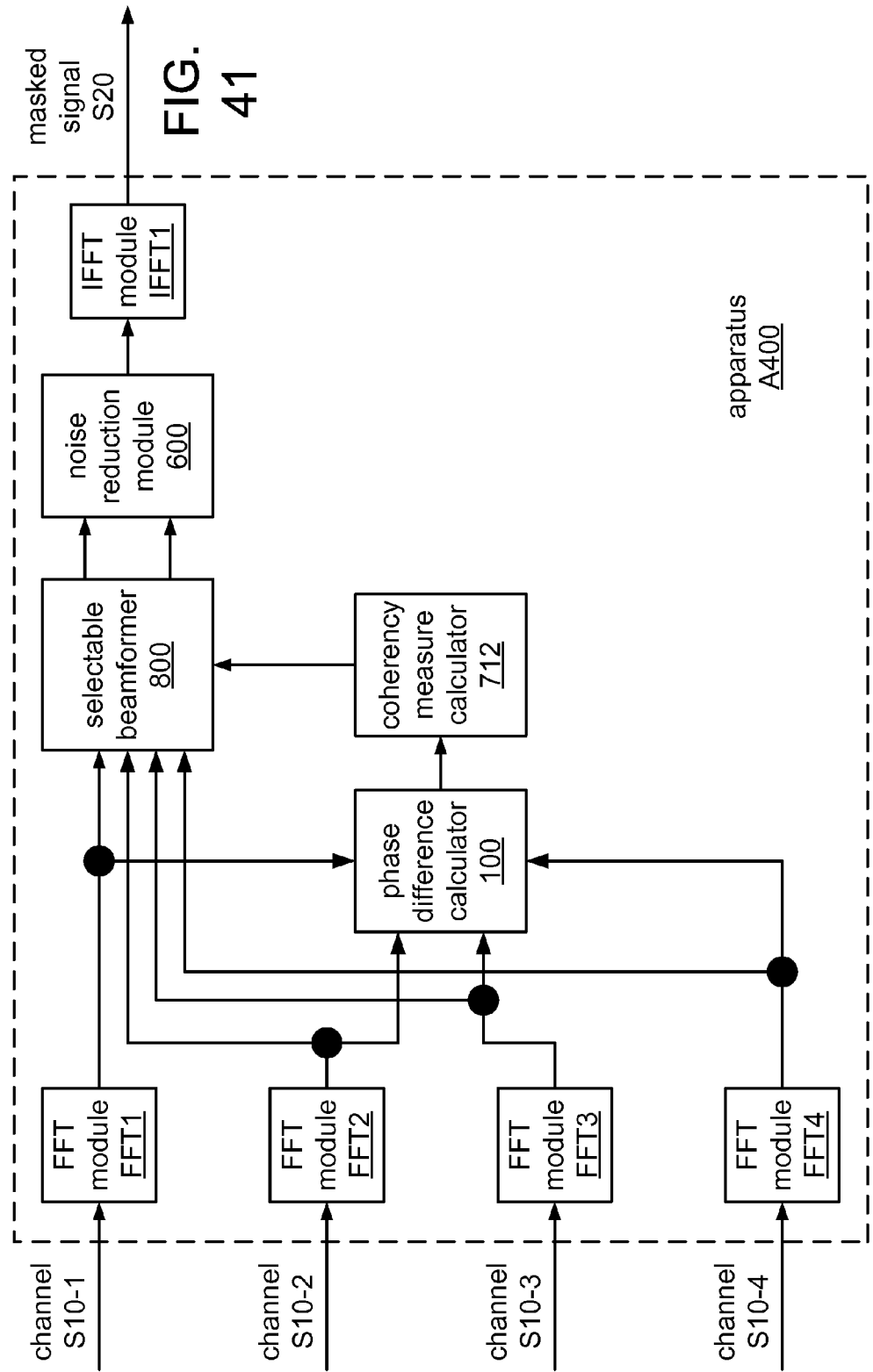
FIG. 41 shows an application of an implementation A400 of apparatus A100.

FIG. 41 shows a block diagram of an implementation A400 of apparatus A100. Apparatus A400 includes an implementation 712 of coherency measure calculator 200 that is configured to indicate a coherent one among a plurality of sectors (e.g., according to an implementation of task T700 that includes an implementation T712 of task T710 as described herein). Apparatus A400 also includes a selectable beamformer 800 that is configured to select one among a plurality of beams, according to the sector indicated by coherency measure calculator 712, and to apply the selected beam to two, three, four, or more of the channels S10-1 to S10-4 to produce a first channel that includes the desired sound and possibly noise and a second channel that is a noise reference. Apparatus A400 also includes a noise reduction module 600 configured to perform a noise reduction operation on the multichannel output of beamformer 800 to produce a noise-reduced signal. Module 600 may be implemented to include an instance of noise estimator 500 that is arranged to estimate a noise component of a signal-plus-noise output of beamformer 800 and an instance of spectrum modifier 560 that is arranged to apply the noise estimate to the beamformer outputs.

Figure 42:
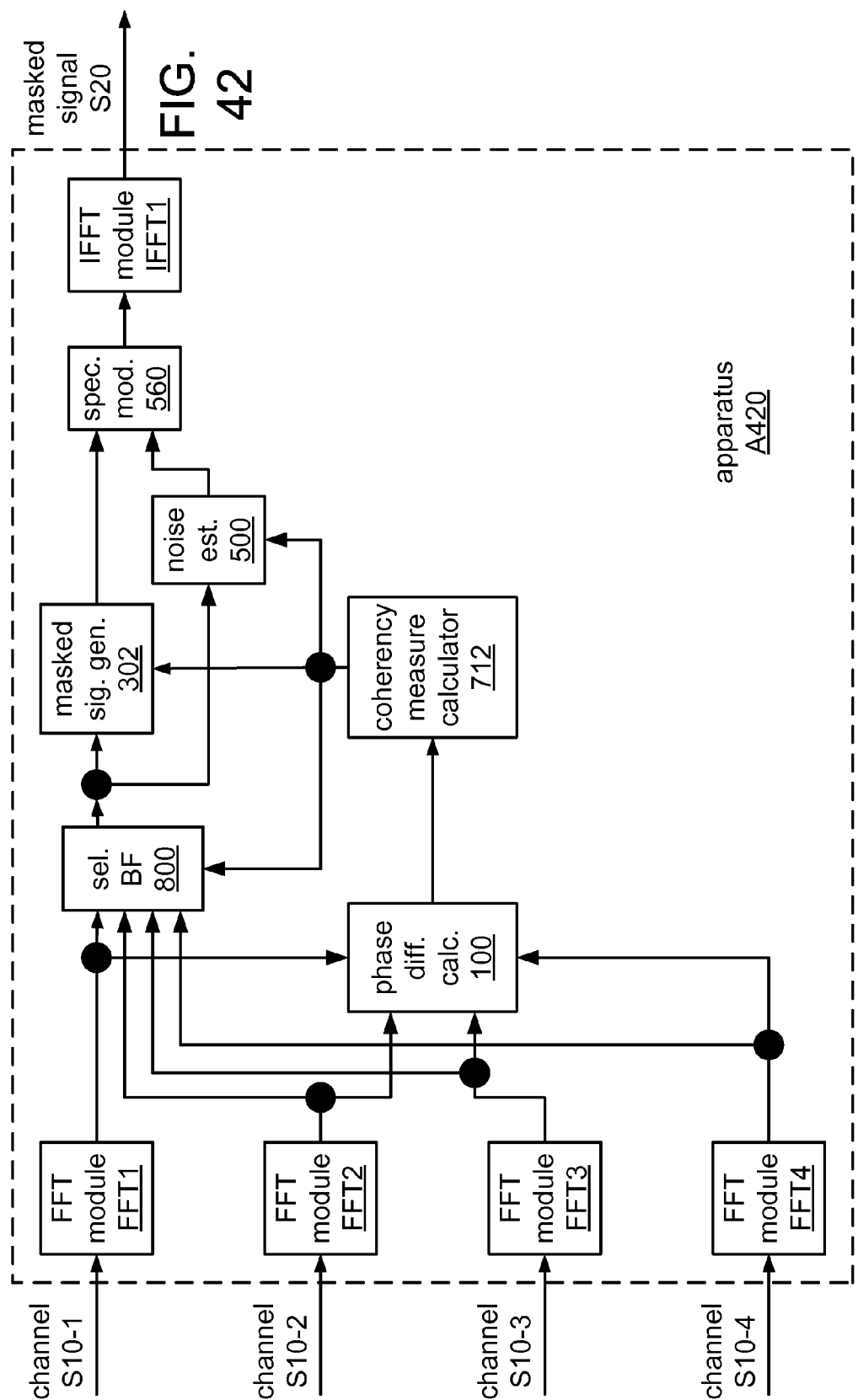
FIG. 42 shows an application of an implementation A420 of apparatus A400.

Beamformer 800 may be configured to store and/or to compute the plurality of beams, which may be computed according to any beamforming method, including but not limited to the examples mentioned herein (e.g., MVDR, constrained BSS, etc.). It may be desirable to configure beamformer 800 to apply the selected beam over only a portion of the frequency range of the channels (e.g., over a low-frequency band, such as the 0-4 kHz band). FIG. 42 shows a block diagram of an implementation A420 of apparatus A400 and A2402. Apparatus A420 includes an implementation 302 of masked signal generator 300 that is configured to produce a masked signal, based on the beamformer output, according to rating results and/or a coherency measure produced by coherency measure calculator 712. Apparatus A420 also includes an instance of noise estimator 500 that is arranged to estimate a noise component of the masked signal and an instance of spectrum modifier 560 that is arranged to apply the noise estimate to the masked signal.

Figure 43:
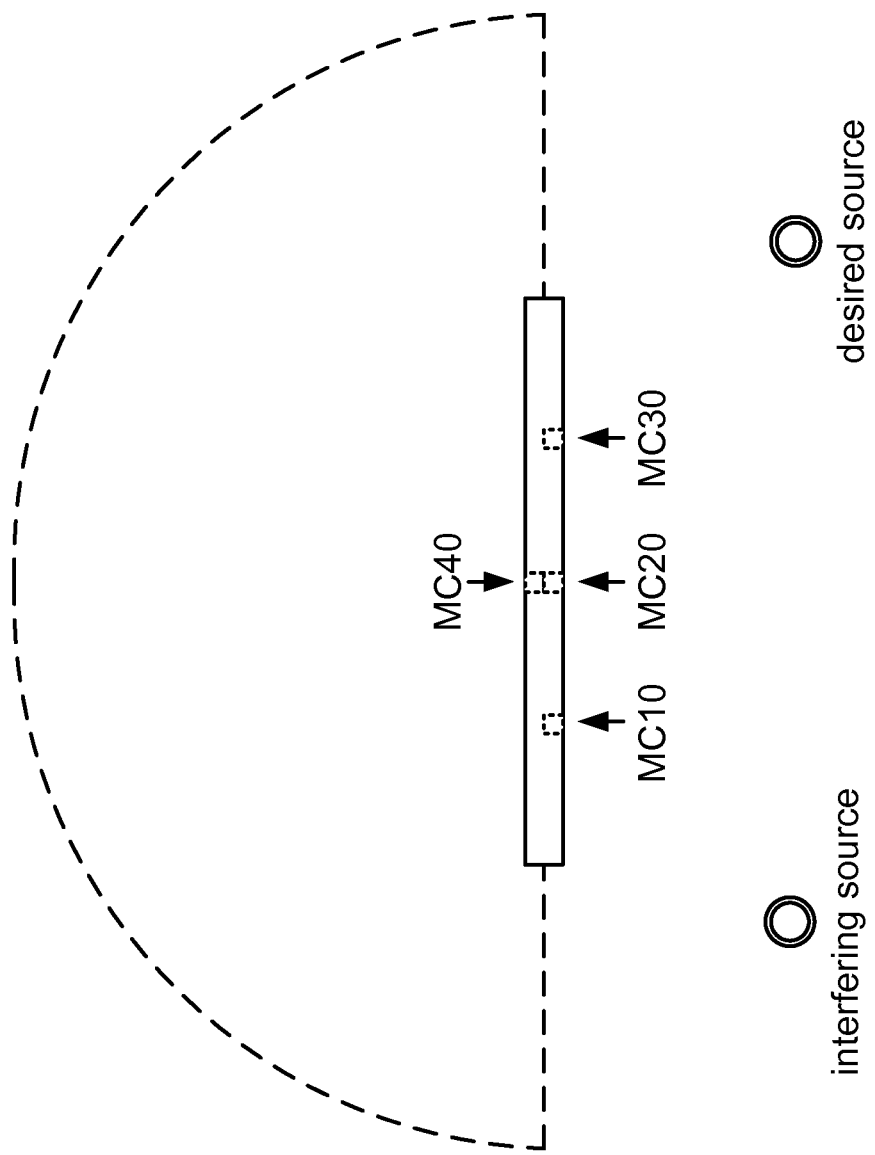
FIG. 43 shows an example in which a pair of microphones is used to generate a nonstationary noise reference.

In a nonstationary noise environment, the performance of a dual-microphone system may be hampered by a less reliable, single-channel VAD operation. Moreover, a dual-microphone array may be able to provide a nonstationary noise reference only for a front-back configuration. FIG. 43 shows such an example in which the pair of microphones MC20 and MC40 is used to generate a nonstationary noise reference from a mask directed toward the back of the array (as represented by the dotted semicircle). Such a mask may include, for example, a null beam directed at the front of the array, and the noise reference may be used to support a post-processing noise reduction operation as described herein (e.g., with reference to tasks T500 and T550) on at least one channel of the multichannel signal. As shown in FIG. 43, such a noise reference may fail to include interference from a source at the front of the array (as represented by the loudspeaker).

Figure 44:
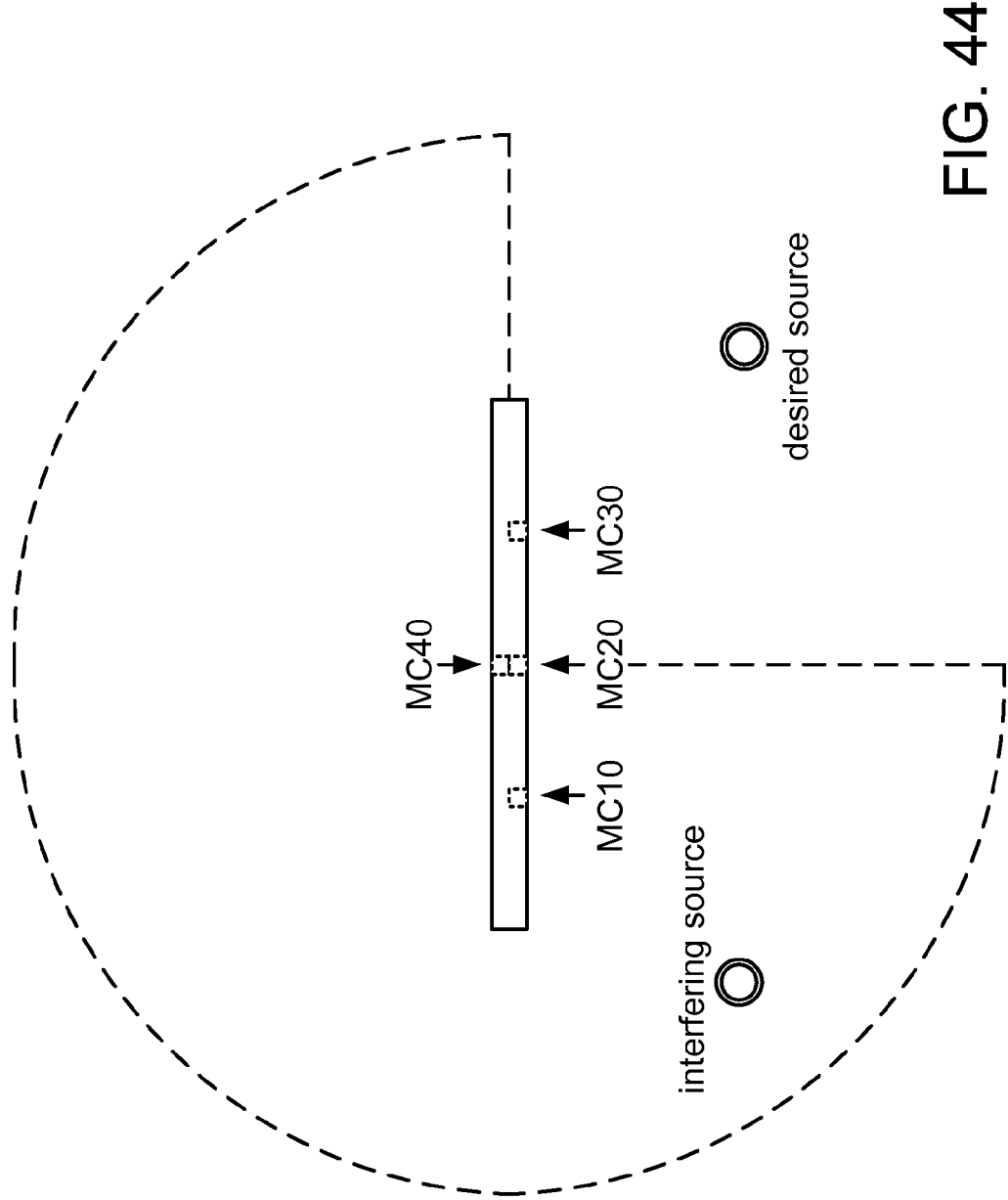
FIG. 44 shows an example in which more than two microphones are used to generate a nonstationary noise reference.

An array having more microphones (e.g., four microphones) may be used to support estimation of a nonstationary noise reference in a wider range of relative spatial configurations between a handset and a desired speaker. FIG. 44 shows an example that combines a first mask that is directed toward the desired speaker with a second mask that is complementary to the first mask (and indicated by the dotted region). The first mask is used to generate a masked signal based on at least one channel of the multichannel signal (e.g., as described above with reference to task T310), and the complementary mask is used to generate a nonstationary noise reference which may be used to support a post-processing noise reduction operation as described herein (e.g., with reference to tasks T500 and T550) on at least one channel of the masked signal. Such a noise reduction scheme may be expected to perform more consistently overall than a two-microphone scheme.

Figure 45:
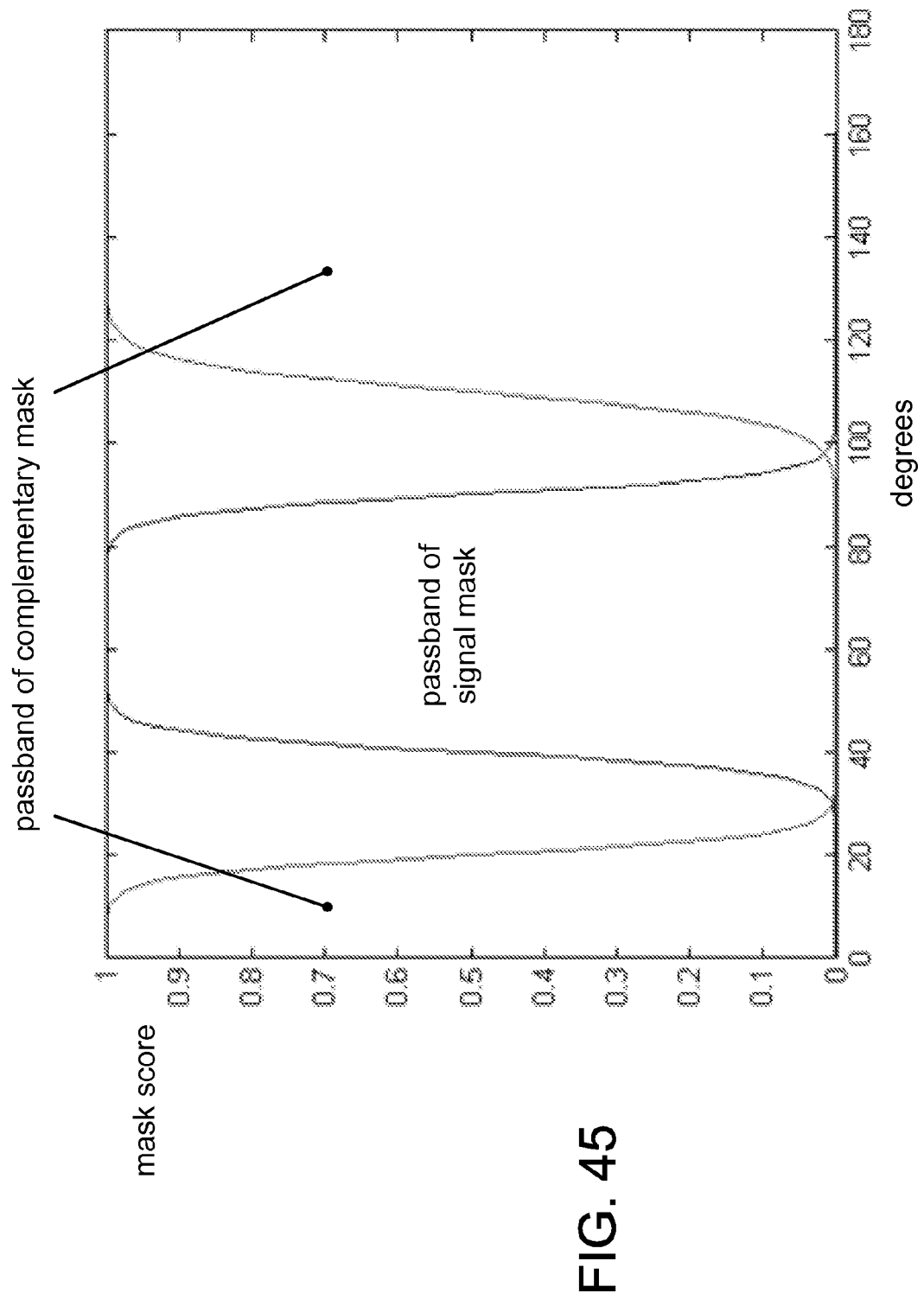
FIG. 45 shows an example of a directional masking function and a complementary mask.

FIG. 45 shows an example of a directional masking function directed toward a desired source (as indicated by the passband from about forty to about ninety degrees) and a complementary mask directed away from the desired source (as indicated by the passband of less than about twenty degrees and the passband of more than about one hundred degrees). As shown in this figure, it may be desirable to implement the passbands of the signal and complementary masks to have little to no overlap.

Figure 46:
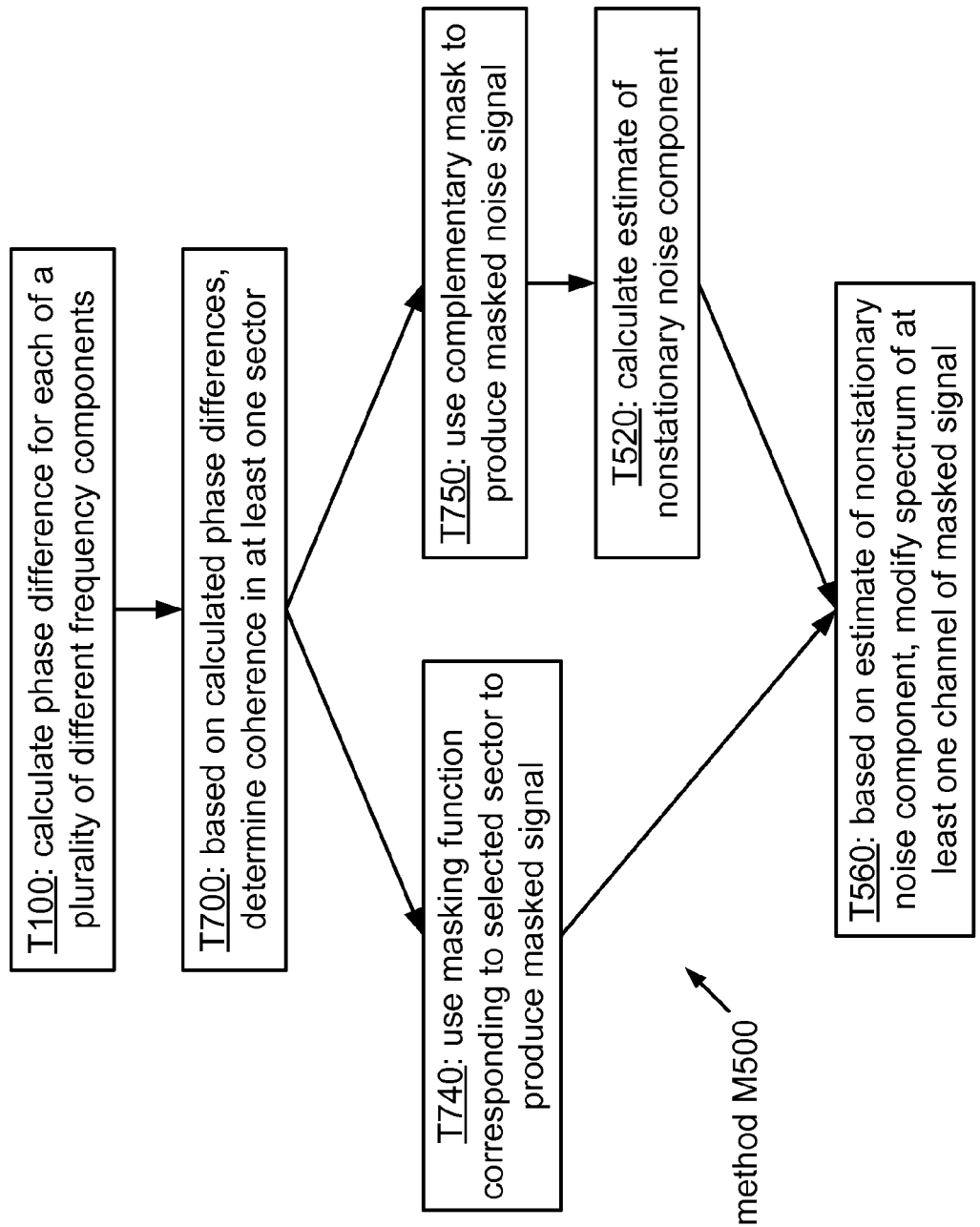
FIG. 46 shows a flowchart of an implementation M500 of method M100.

FIG. 46 shows a flowchart of an implementation M500 of method M100 that uses a complementary masking function to generate a nonstationary noise estimate. Method M500 includes at least one instance of phase difference calculation task T100 and an implementation of task T700 that includes sector selection task T712. Method M500 also includes an implementation T740 of masking task T310. Task T740 produces a masked signal, based on at least one channel of the multichannel signal, according to rating results (e.g., mask scores) from a directional masking function that corresponds to the sector selected by task T712.

Method M500 also includes an implementation T750 of masking task T310. Task T750 uses a directional masking function which is complementary to the selected sector to produce a masked noise signal that is based on at least one channel of the multichannel signal. Method M500 also includes an implementation T520 of noise estimation task T500 that calculates an estimate of a nonstationary noise component of at least one channel of the multichannel signal. For example, task T520 may be configured to calculate the nonstationary noise estimate by performing a temporal smoothing operation (e.g., using an FIR or IIR filter as described herein) on the masked noise signal. In such case, it may be desirable to update the noise estimate more quickly than is customary for a stationary noise estimate. For example, it may be desirable to smooth the masked noise signal over a short time interval (e.g., two, three, five or ten frames) and/or by performing more updating than smoothing (e.g., using a smoothing factor of 0.1, 0.2, or 0.3). Method M500 also includes an instance of spectrum modification task T560 that is arranged to modify the spectrum of at least one channel of the masked signal, based on the nonstationary noise estimate produced by task T520.

Alternate implementations of method M500 may be configured to use a beam that corresponds to the selected sector, rather than a directional masking function, to produce the masked signal and/or to use a null beam that is directed toward the selected sector, rather than a complementary directional masking function, to produce the masked noise signal.

It may be desirable to configure an implementation of apparatus A100 to calculate a nonstationary noise reference. In an implementation of apparatus A420, for example, it may be desirable to configure noise reference calculator 500 to calculate a noise reference based on a complement to the selected mask (e.g., as indicated by coherency measure calculator 712). In one example, such a noise reference is calculated by applying a low gain to channel S10-1 when the coherency measure produced by coherency measure calculator 712 is high, and vice versa. In another example, such a noise reference is generated by applying a selectable null beamformer (analogous to beamformer 800) to two or more of the channels S10-1 to S10-4 such that the selected null beam is in the direction of the desired speaker (e.g., in the direction of the selected sector). In such manner, a complement to the selected mask may be obtained by looking to the region from which a desired speaker is absent. It is possible to use such a nonstationary noise reference, which is updated using information from a frame of the multichannel signal, to perform a noise reduction operation on at least one channel of the same frame of the signal.

Such an implementation of noise estimator 500 may be used instead of, or in addition to, an implementation of noise estimator 500 that updates a noise estimate based on information from inactive intervals. For example, spectrum modifier 560 may be configured to apply a combination (e.g., an average) of the two noise references to the primary channel S10-1 (alternatively, to the signal-plus-noise channel produced by beamformer 800).

In one example, a masking approach using four microphones is implemented to have unity gain in a desired area and strong attenuation (e.g., greater than forty decibels) outside that area. For situations with strong directional frontal noise, when the desired speaker is talking from the front, it is possible that only about ten or twelve decibels of noise reduction may be achieved, even when narrow masks are used. When the desired speaker is talking from the left or right side, however, it is possible to achieve more than twenty dB of noise reduction.

With two microphones, relatively narrow beams can typically only be created in endfire directions, while broadside beams are typically much wider. With three, four, or more microphones, however, narrower beams are typically possible in all directions.

It may be desirable to implement method M400 to zoom into a particular spatial source by first using wide sectors from two microphones and then using narrower sectors from four microphones. Such a scheme may be used to obtain adaptive adjustment of bandwidth without loss of desired voice amplitude due to initial uncertainty in estimation of desired speaker direction. A scheme that proceeds from two microphones to three and four can also be implemented for a more gradual transition. If one microphone fails, the narrowest spatial resolution achieved by four microphones may suffer, but sufficiently narrow broadside sectors and/or beams can typically be achieved with a combination of three microphones.

The tracking precision of an operation that uses sectors (e.g., method M400) typically depends on the widths of the sectors, which may set a minimum bound on the spatial resolution of the tracking operation. A source within a sector that is currently indicated as receiving a coherent signal, for example, may be located at the center of the sector, or at one of the borders of the sector, or anywhere else within that sector. While the tracking precision may be increased by narrowing the widths of the sectors, such an approach may also reduce the admittance angle unless more sectors are used, which may then increase the computational complexity of the operation.

It may be desirable to use a distribution of the direction indicators, rather than an a priori set of sectors, to localize and/or track the source of a coherent signal. FIG. 47A shows a flowchart of an implementation M600 of method M100 that includes an instance of phase difference calculation task T100, an instance of direction indicator calculation task T210, and an implementation T252 of coherency measure evaluation task T250. Task T252 is configured to calculate a value of the coherency measure based on a distribution of the direction indicators over a range of directions of arrival. As discussed above, the direction indicators may be calculated as, for example, values of direction of arrival, time delay of arrival, or ratio of phase difference and frequency.

Task T252 is configured to determine, for each of a plurality of directions, how many of the direction indicators correspond to that direction. For example, the range of directions may be divided into a plurality of bins, and task T252 may be configured to count the number of direction indicators whose values fall within each bin. In such case, the value of the coherency measure is based on the number of direction indicators in the most populated bin.

It may be desirable to configure task T252 to consider only direction indicators that correspond to frequencies of interest (e.g., components in the range of from 700 to 2000 Hz, and/or components at multiples of the pitch frequency). Task T252 may also be configured to weight one or more of the direction indicators according to its corresponding frequency. For example, such an implementation of task T252 may be configured to weight direction indicators corresponding to a particular subband more or less heavily and/or to weight direction indicators corresponding to multiples of an estimated pitch frequency more heavily.

It may be desirable to have a bin for each possible value of the direction indicators. In this case, task T252 is configured to calculate the value of the coherency measure by counting the number of direction indicators having the same value. For example, task T252 may be configured to calculate the value of the coherency measure as a mode of the direction indicators. Alternatively, it may be desirable to combine two or more (e.g., five) possible values of the direction indicators into a single bin. For example, the bin division may be configured such that each bin covers two or more of the possible values of the direction indicators. It may be desirable to configure the bin division to support different tracking resolutions in different directions.

Figure 48:
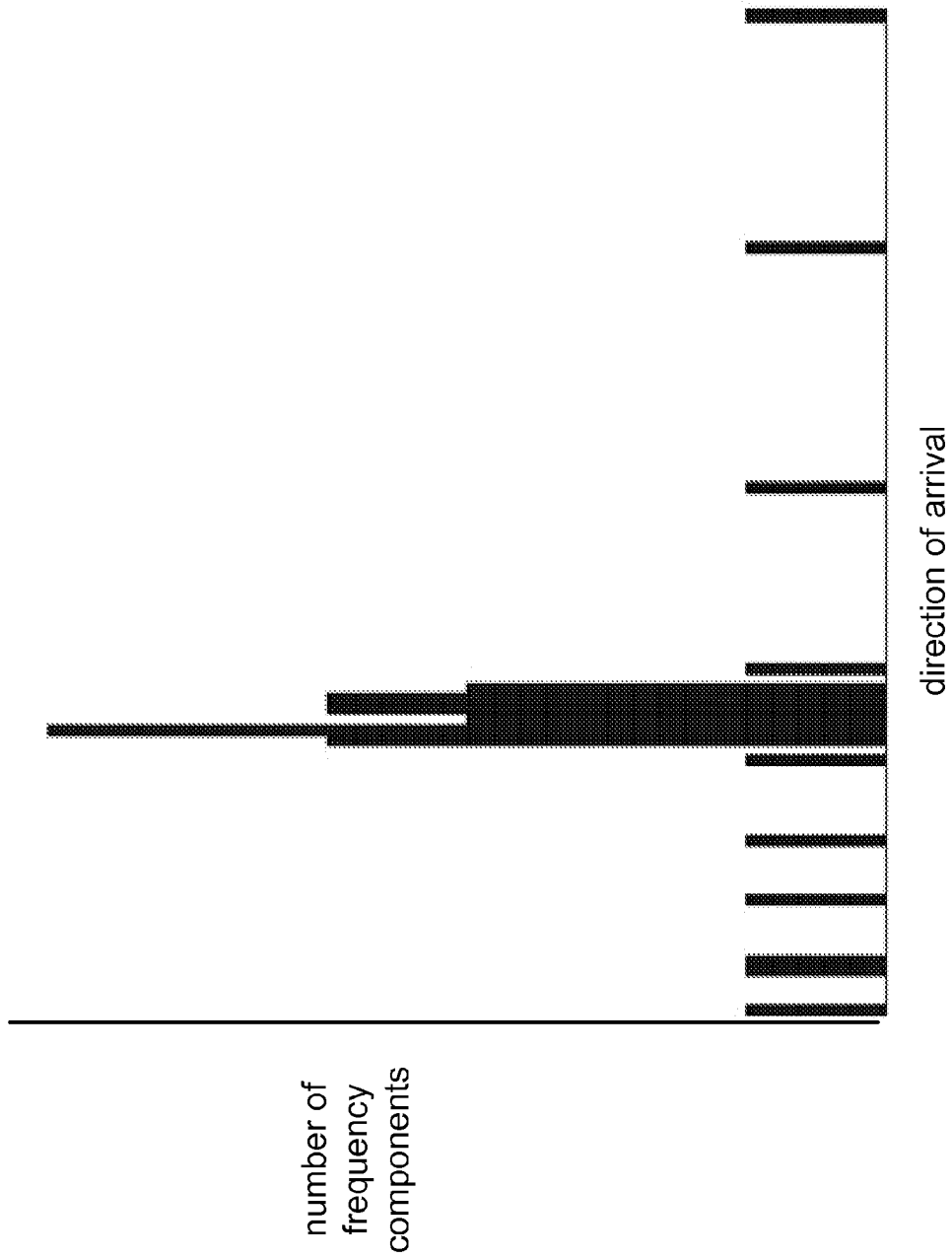
FIG. 48 shows a histogram.

Task T252 may be implemented by plotting a histogram as shown in FIG. 48. In such case, the value of the coherency measure may be based on the peak or center of gravity of the distribution as indicated by the histogram. For instances in which the histogram is not symmetric around the peak, it may be desirable for task T252 to calculate the value of the coherency measure based on a weighted maximum (e.g., a center of gravity).

Task T252 may be configured to count the direction indicators over one frame or over multiple frames (e.g., five, ten, twenty, or fifty frames). Task T252 may also be configured to smooth the value of the coherency measure over time (e.g., using a temporal smoothing operation as described herein, such as an FIR or IIR filter).

Task T252 may be configured to indicate a lack of coherence if the coherency measure is less than (alternatively, not greater than) a threshold value. In such case, it may be desirable to use different threshold values for two or more (possibly all) of the plurality of directions. For example, it may be desirable to use a higher threshold value for directions toward a broadside direction (i.e., with respect to the axis of the microphone array) than for directions toward an endfire direction. Additionally or in the alternative, task T252 may be configured to calculate values for each of more than one coherency measure in the event that coherency is indicated for different directions.

Figure 47B:
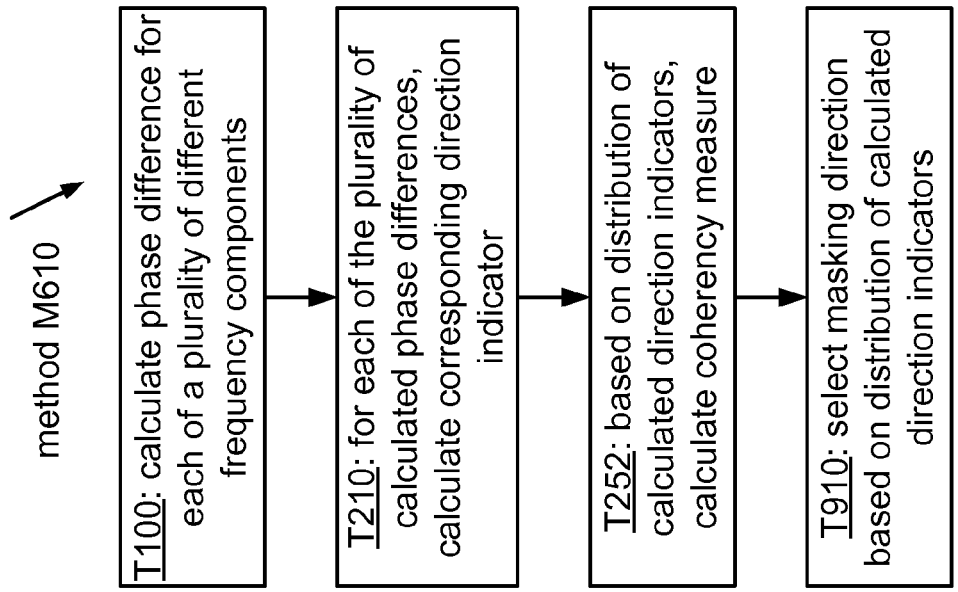
FIG. 47B shows a flowchart of an implementation M610 of method M600 that includes a task T910.
Figure 47A:
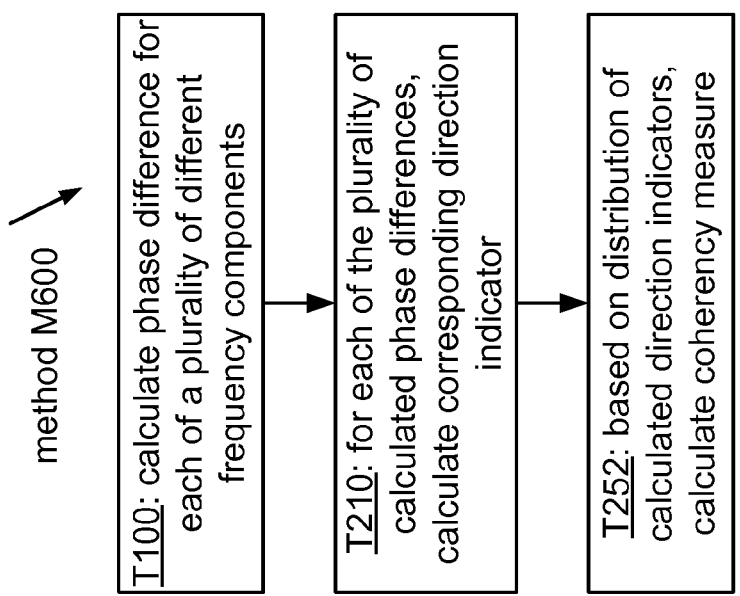
FIG. 47A shows a flowchart of an implementation M600 of method M100.

FIG. 47B shows a flowchart of an implementation M610 of method M600 that includes a task T910. Task T910 is configured to select a masking direction based on the distribution of the direction indicators. For example, task T910 may be configured to select the direction corresponding to the peak or center of gravity of the distribution as indicated by the histogram. For instances in which the histogram is not symmetric around the peak, it may be desirable for task T910 to select the direction corresponding to a weighted maximum. For a case in which task T252 is configured to calculate values for each of more than one coherency measure, task T910 may also be configured to select more than one corresponding masking direction.

Figure 49:
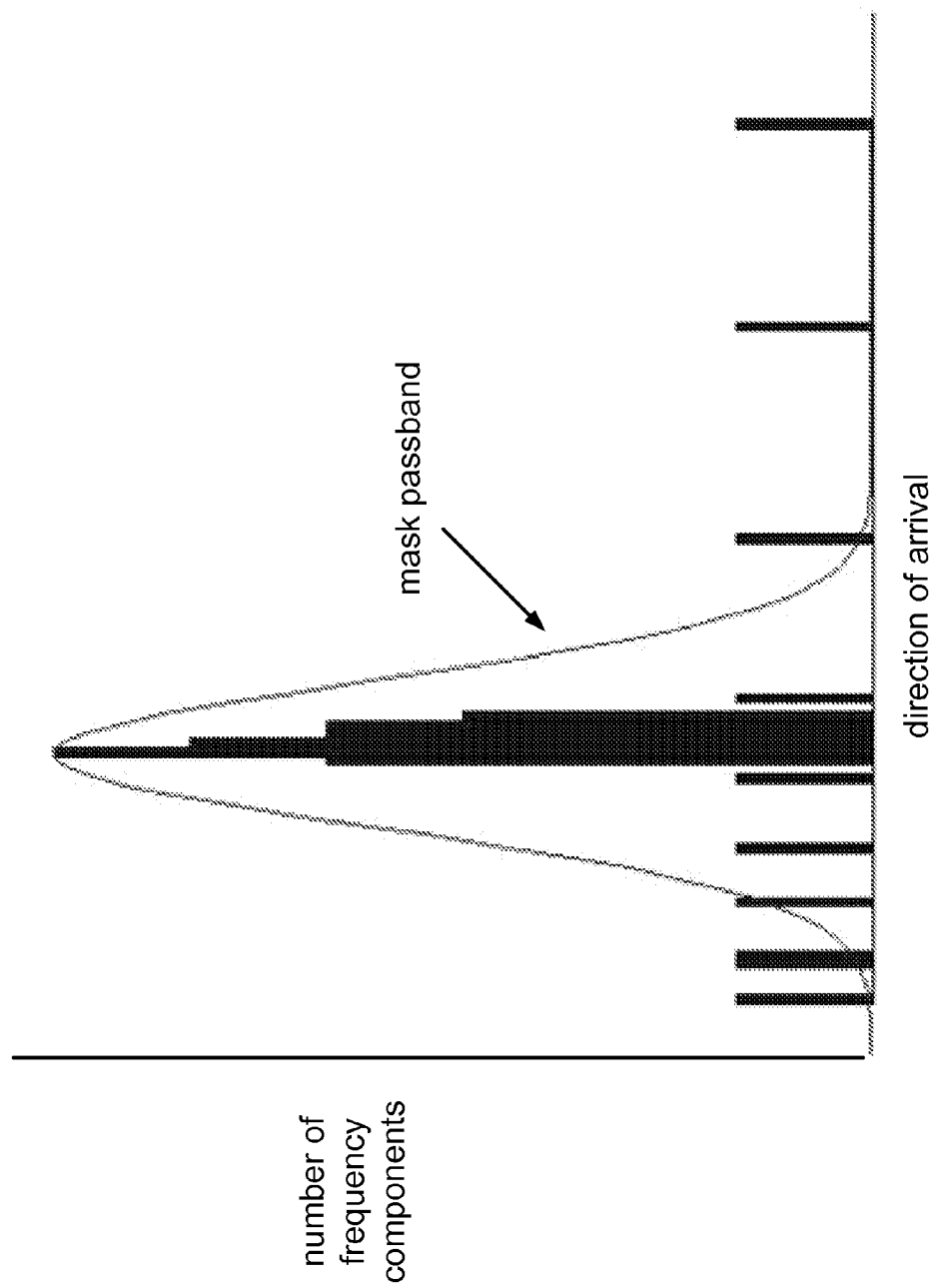
FIG. 49 shows an example in which the passband of a masking function is selected based on a histogram.

Task T910 may be configured to select from among a set of fixed directional masking functions (having widths of, e.g., ten degrees). Alternatively, task T910 may be configured to use information from the distribution to configure a steerable directional masking function. One example of such a function is a nonlinear masking function as described above with reference to FIGS. 8A-8D. In such case, task T910 may be configured to select a center frequency of the passband (e.g., from the peak or center of gravity of the histogram) and to use a fixed passband width (e.g., ten degrees) and/or profile or to select a width and/or profile based on a characteristic (e.g., the peakiness) of the distribution. FIG. 49 shows an example in which the passband of a masking function is selected based on the histogram. One potential advantage of a localization approach according to method M600 is to avoid performing an instance of coherency measure evaluation simultaneously for each of a set of sectors.

Figure 50:
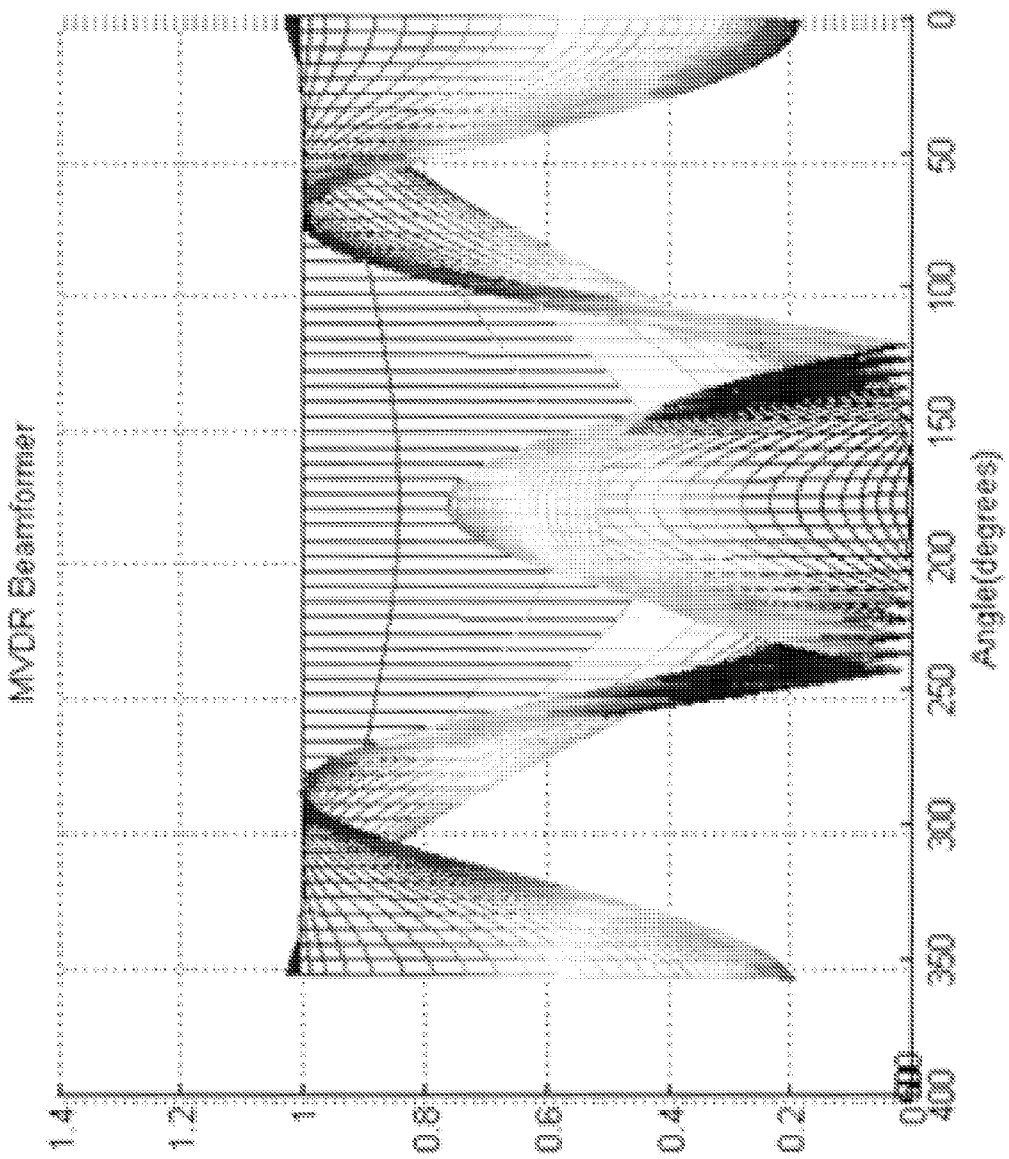
FIGS. 50 and 51 show two views of a plot of one example of a computed beam.
Figure 51:
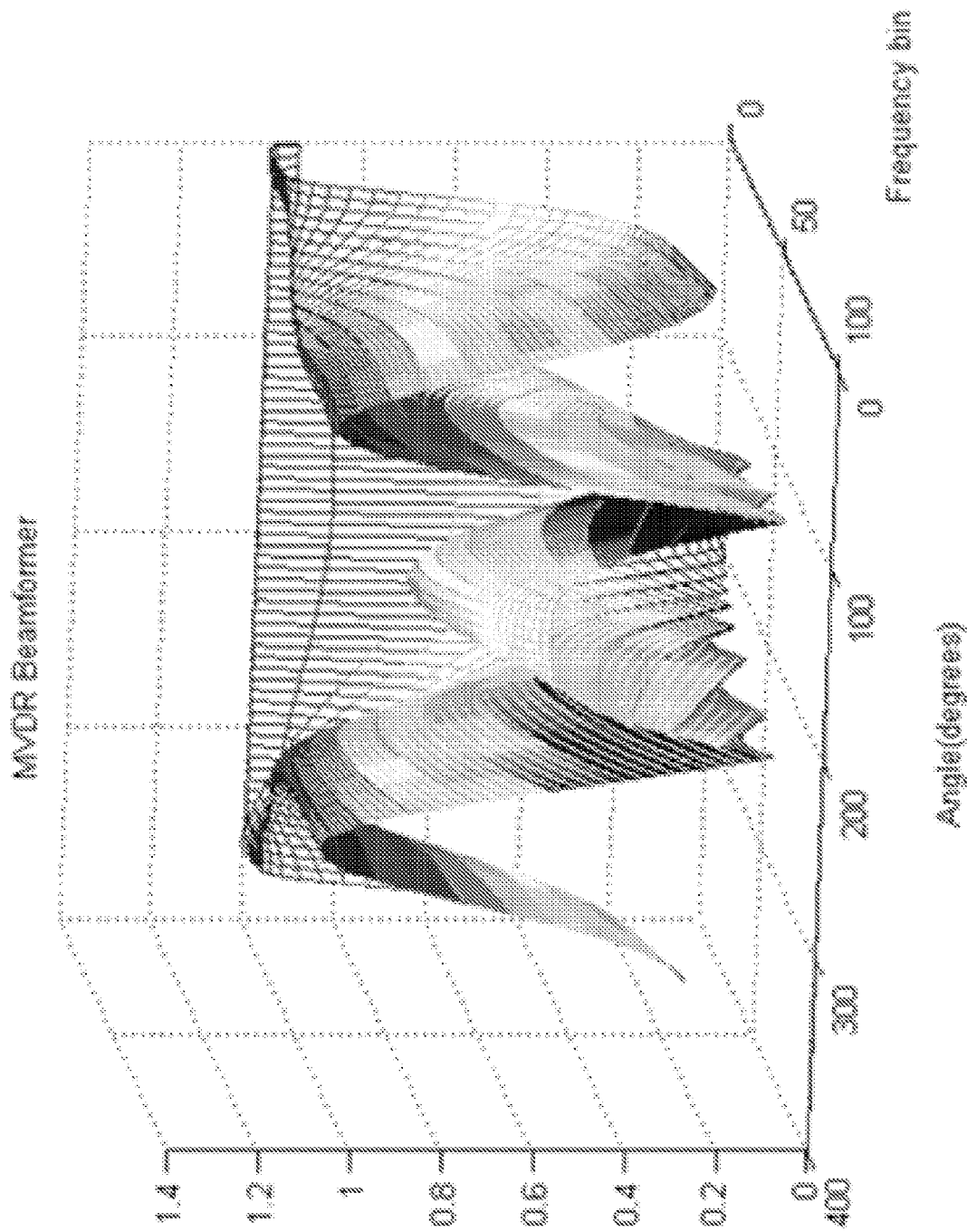

With respect to the beamformers and beamforming operations described above, it may be desirable to generate fixed beams, using one or more data-dependent or data-independent design techniques (MVDR, independent vector analysis (IVA), etc.), for spatial sectors tracked by an implementation of method M400 as described herein. For example, it may be desirable to store offline computed beams in a lookup table. One such example includes sixty-five complex coefficients for each filter, three filters to generate the beam for each spatial sector, and nine spatial sectors in total. FIGS. 50 and 51 show two views of a plot of one example of such a computed beam.

Traditional approaches like MVDR, delay and sum beamformers may be used to design beampatterns based on freefield models where the beamformer output energy is minimized with a constrained look direction energy equal to unity.

Closed-form MVDR techniques, for example, may be used to design beampatterns based on a given look direction, the inter-microphone distance, and a noise cross-correlation matrix. Typically the resulting designs encompass undesired sidelobes, which may be traded off against the main beam by frequency-dependent diagonal loading of the noise cross-correlation matrix.

Figure 52:
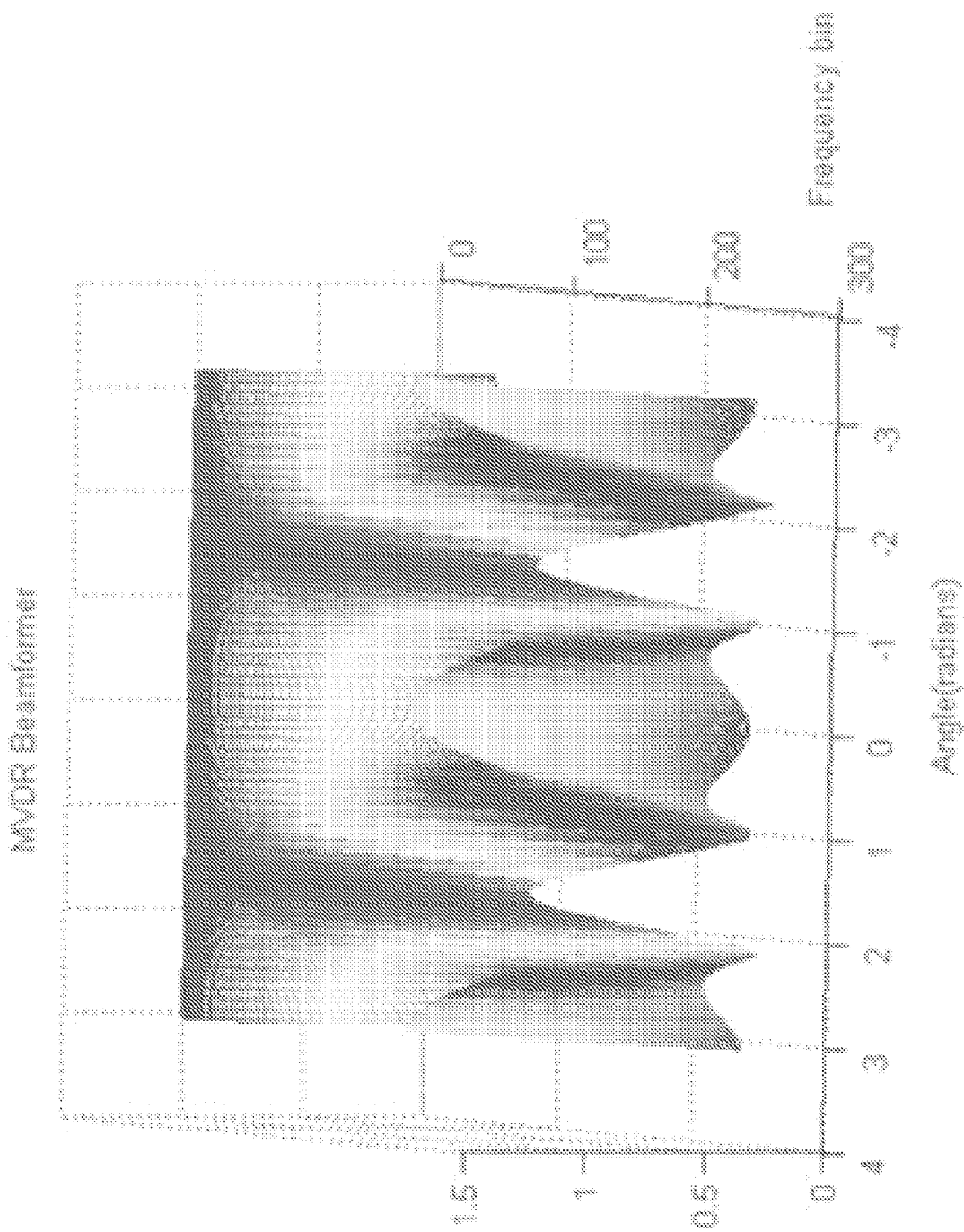
FIGS. 52-54 show a set of examples of beampatterns obtained for a linear, equidistant four-microphone array.
Figure 53:
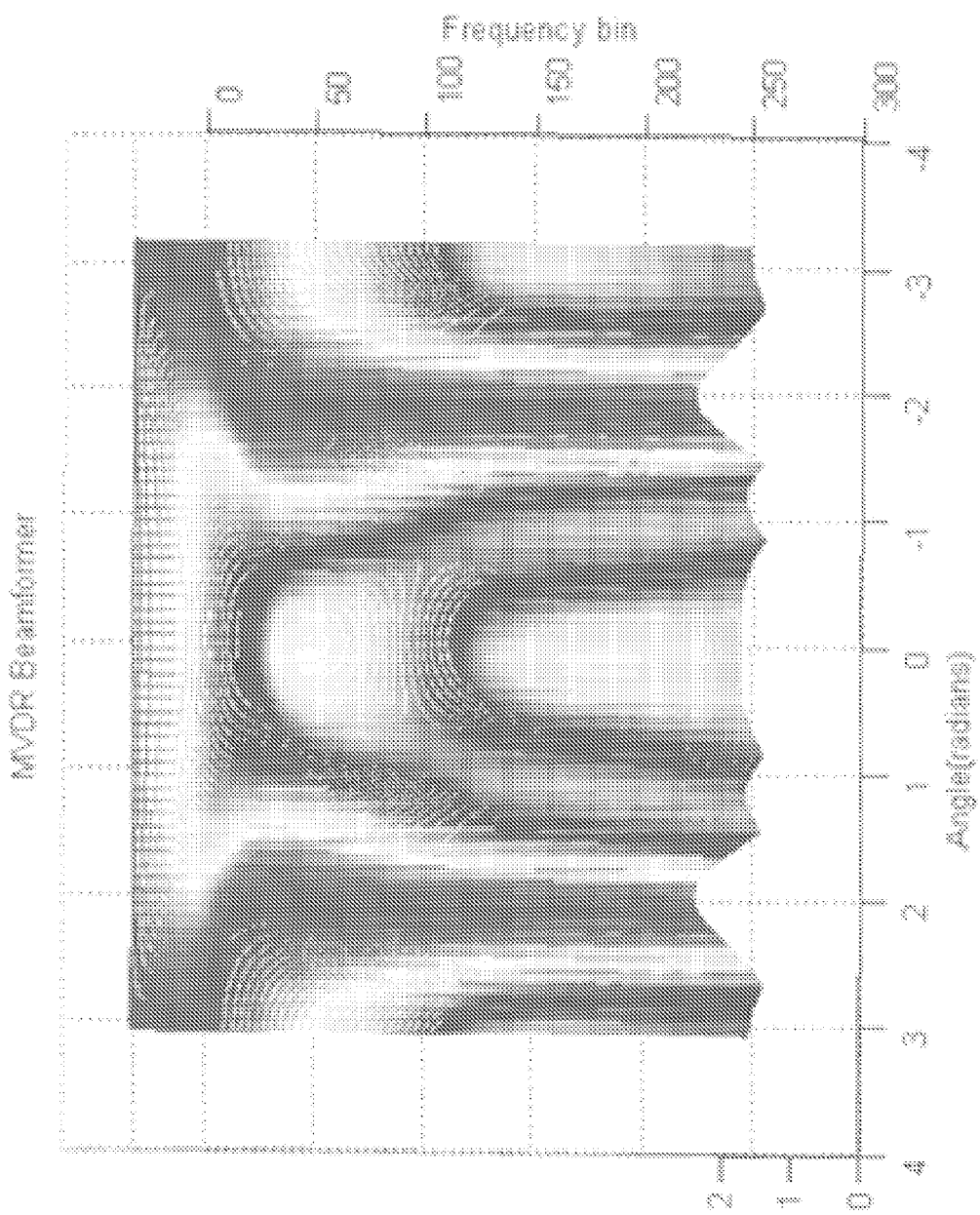
Figure 54:
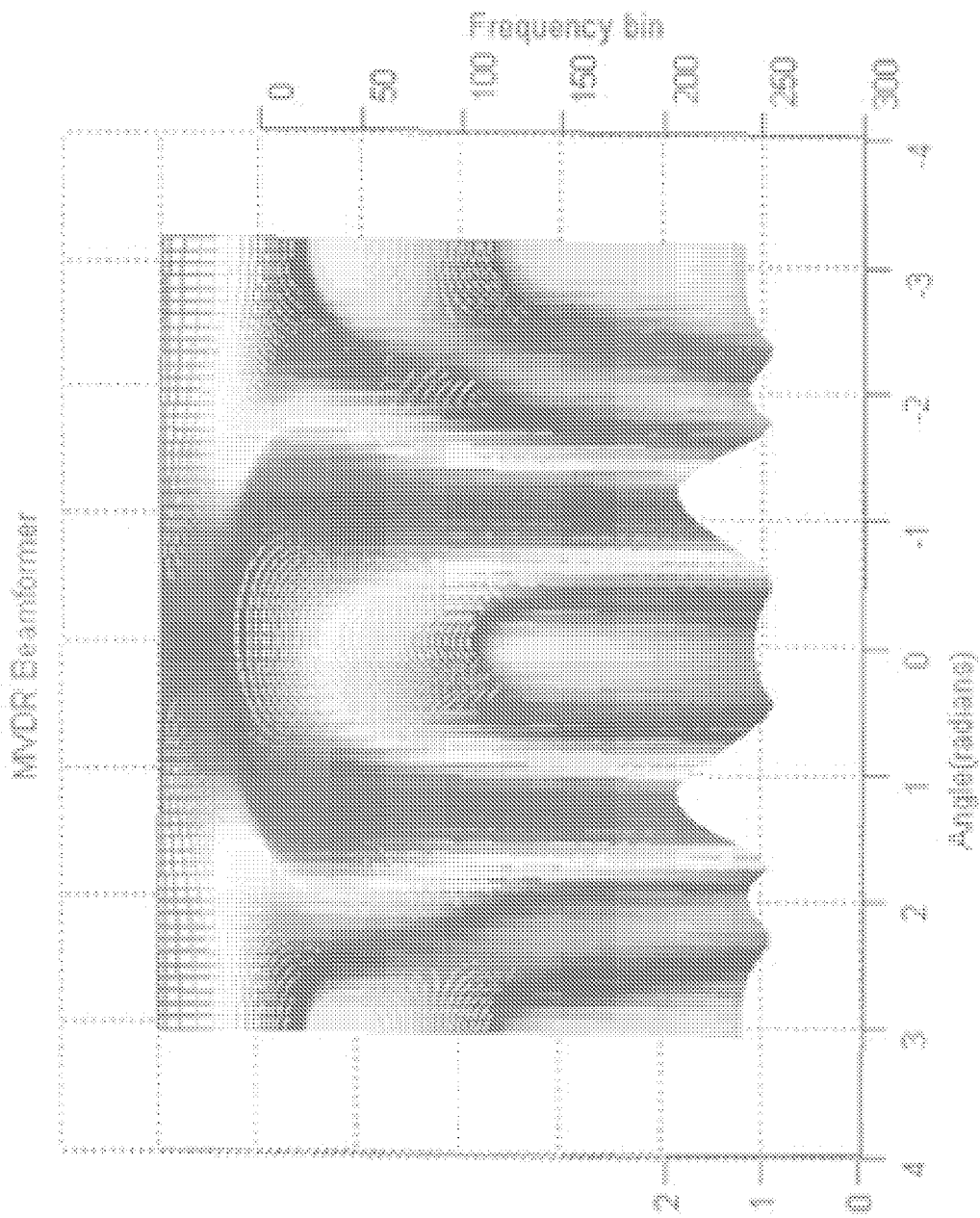

It may be desirable to use special constrained MVDR cost functions solved by linear programming techniques, which may provide better control over the tradeoff between main beamwidth and sidelobe magnitude. FIGS. 52-54 show a set of examples of beampatterns obtained for a linear, equidistant four-microphone array with look directions $\pi/2$, 5 $\pi/8$, and $3\pi/8$, respectively. It is observed that considerable sidelobes exist around the main look direction and that beams are thin in the low-frequency subbands, which may lead to a high susceptibility to wind noise amplification.

It may be desirable to implement an iterative procedure to design a beampattern for an application having more than two microphones. Instead of minimizing the designed beamformer output energy, such a procedure may use a constrained blind source separation (BSS) learning rule that seeks to separate sources from each other by creating nullbeams to interfering sources. Instead of beaming into a desired source as in traditional beamforming techniques, such a procedure may be designed to generate a beam towards a desired source by beaming out other competing directions. It may be desirable to configure the procedure to use the constrained BSS approach to iteratively shape beampatterns in each individual frequency bin and thus to trade off correlated noise against uncorrelated noise and sidelobes against the main beam. To achieve such a result, it may be desirable to regularize the converged beams to unity gain in the desired look direction using a normalization procedure over all look angles. It may also be desirable to use a tuning matrix to directly control the depth and beamwidth of enforced nullbeams during the iteration process per frequency bin in every nullbeam direction.

Figure 55:
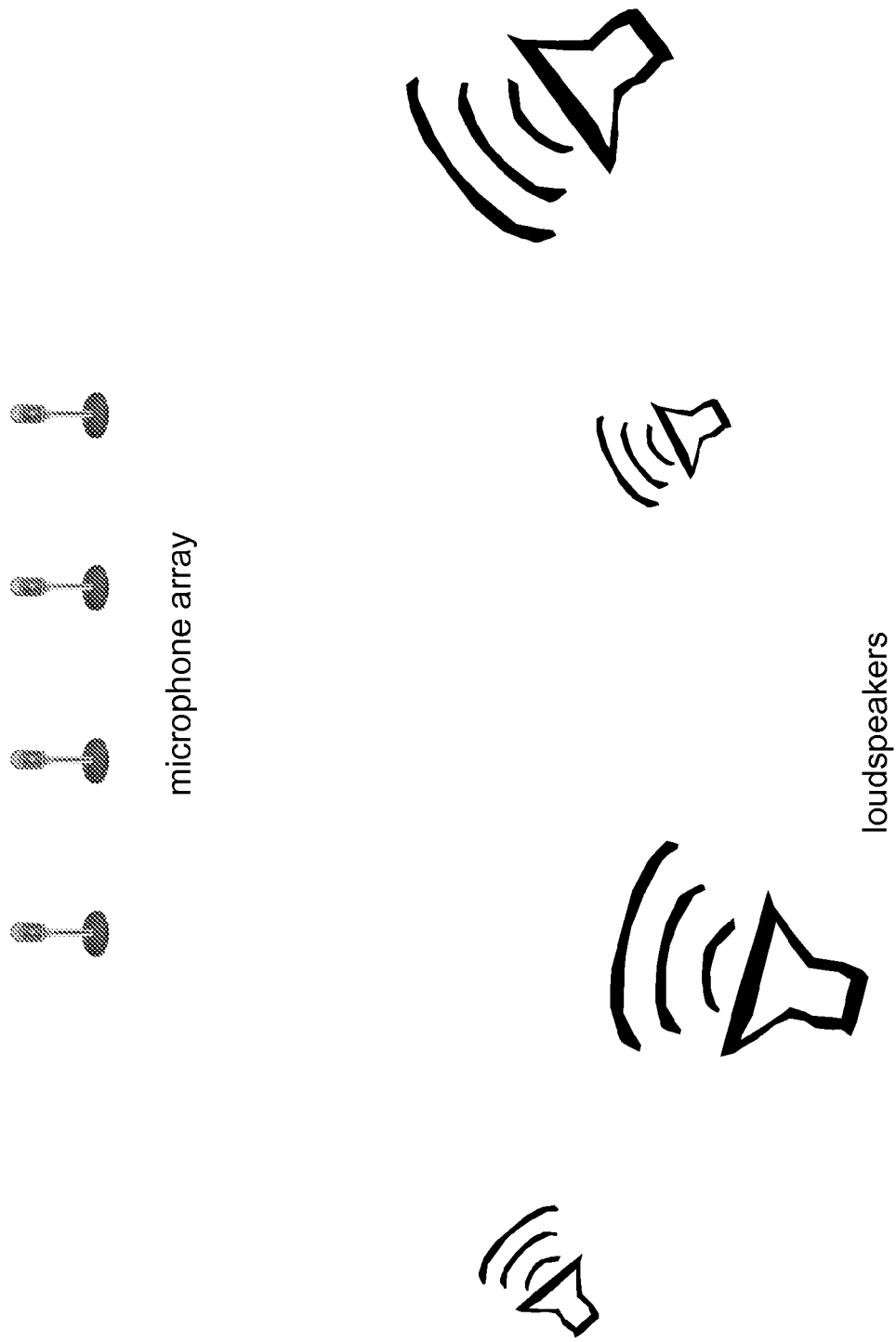
FIG. 55 shows a loudspeaker-microphone setup.

To create appropriate null beams, a loudspeaker-microphone setup as shown in FIG. 55 may be used to acquire data. If it is desired to generate beams toward specific look directions, loudspeakers may be placed at those angles with respect to the array. The beamwidth of the resulting beam may be determined by the proximity of interfering loudspeakers, as the constrained BSS rule may seek to null out competing sources and thus may result in a more or less narrow residual beam determined by the relative angular distance of interfering loudspeakers.

Beamwidths can be influenced by using loudspeakers with different surfaces and curvature, which spread the sound in space according to their geometry. A number of source signals less than or equal to the number of microphones can be used to shape these responses. Different sound files played back by the loudspeakers may be used to create different frequency content. If loudspeakers contain different frequency content, the reproduced signal can be equalized before reproduction to compensate for frequency loss in certain bands.

The BSS algorithm may try to naturally beam out interfering sources, only leaving energy in the desired look direction. After normalization over all frequency bins, such an operation may result in a unity gain in the desired source direction. The BSS algorithm may not yield a perfectly aligned beam in a certain direction. If it is desired to create beamformers with a certain spatial pickup pattern, then sidelobes can be minimized and beamwidths shaped by enforcing nullbeams in particular look directions, whose depth and width can be enforced by specific tuning factors for each frequency bin and for each null beam direction.

It may be desirable to fine-tune the raw beam patterns provided by the BSS algorithm by selectively enforcing sidelobe minimization and/or regularizing the beam pattern in certain look directions. The desired look direction can be obtained, for example, by computing the maximum of the filter spatial response over the array look directions and then enforcing constraints around this maximum look direction.

The beam pattern for each output channel j of such a synthesized beamformer may be obtained from the frequency-domain transfer function $W_{jm}(i*\omega)$ (where m denotes the input channel, $1<=m<=M$) by computing the magnitude plot of the expression $$W_{j1}(i\times\omega)D(\omega)_{1j} + W_{j2}(i\times\omega)D(\omega)_{2j} + \ldots + W_{j}(i\times\omega)D(\omega)_{Mj}.$$

In this expression, $D(\omega)$ indicates the directivity matrix for frequency $\omega$ such that $$D(\omega)_{ij} = \exp(-i\times\cos(\theta_j)\times\text{pos}(i)\times\omega/c), \tag{5}$$

where pos(i) denotes the spatial coordinates of the i-th microphone in an array of M microphones, c is the propagation velocity of sound in the medium (e.g., 340 m/s in air), and $\theta_j$ denotes the incident angle of arrival of the j-th source with respect to the axis of the microphone array.

The range of blind source separation (BSS) algorithms includes an approach called frequency-domain ICA or complex ICA, in which the filter coefficient values are computed directly in the frequency domain. Such an approach, which may be implemented using a feedforward filter structure, may include performing an FFT or other transform on the input channels. This ICA technique is designed to calculate an M×M unmixing matrix $W(\omega)$ for each frequency bin $\omega$ such that the demixed output vectors $Y(\omega,l)=W(\omega)X(\omega,l)$ are mutually independent. The unmixing matrices $W(\omega)$ are updated according to a rule that may be expressed as follows:

$$W_{l+r}(\omega) = W_l(\omega) + \mu[I - \langle \Phi(Y(\omega,l))Y(\omega,l)^H \rangle]W_l(\omega) \tag{6}$$

where $W_l(\omega)$ denotes the unmixing matrix for frequency bin $\omega$ and window l, $Y(\omega,l)$ denotes the filter output for frequency bin $\omega$ and window l, $W_{l+r}(\omega)$ denotes the unmixing matrix for frequency bin $\omega$ and window (l+r), r is an update rate parameter having an integer value not less than one, $\mu$ is a learning rate parameter, I is the identity matrix, $\Phi$ denotes an activation function, the superscript H denotes the conjugate transpose operation, and the brackets < > denote the averaging operation in time $l=1, \ldots, L$. In one example, the activation function $\Phi(Y_j(\omega,l))$ is equal to $Y_j(\omega,l)/|Y_j(\omega,l)|$.

Complex ICA solutions typically suffer from a scaling ambiguity, which may cause a variation in beampattern gain and/or response color as the look direction changes. If the sources are stationary and the variances of the sources are known in all frequency bins, the scaling problem may be solved by adjusting the variances to the known values. However, natural signal sources are dynamic, generally non-stationary, and have unknown variances.

Instead of adjusting the source variances, the scaling problem may be solved by adjusting the learned separating filter matrix. One well-known solution, which is obtained by the minimal distortion principle, scales the learned unmixing matrix according to an expression such as the following.

$$W_{l+r}(\omega) \leftarrow \text{diag}(W_{l+r}^{-1}(\omega))W_{l+r}(\omega).$$

It may be desirable to address the scaling problem by creating a unity gain in a desired look direction, which may help to reduce or avoid frequency coloration of a desired speaker's voice. One such approach normalizes each row j of matrix W by the maximum of the filter response magnitude over all angles:

$$\max_{\theta_i=[-\pi,\pi]}|W_{j1}(i\times\omega)D(\omega)_{1j}+W_{j2}(i\times\omega)D(\omega)_{2j}+\ldots+W_{jM}(i\times\omega)D(\omega)_{Mj}|.$$

Another problem with some complex ICA implementations is a loss of coherence among frequency bins that relate to the same source. This loss may lead to a frequency permutation problem in which frequency bins that primarily contain energy from the information source are misassigned to the interference output channel and/or vice versa. Several solutions to this problem may be used.

One response to the permutation problem that may be used is independent vector analysis (IVA), a variation of complex ICA that uses a source prior which models expected dependencies among frequency bins. In this method, the activation function 1 is a multivariate activation function such as the following:

$$\Phi(Y_j(\omega, l)) = \frac{Y_j(\omega, l)}{\left(\sum_\omega |Y_j(\omega, l)|^p\right)^{1/p}}$$

where p has an integer value greater than or equal to one (e.g., 1, 2, or 3). In this function, the term in the denominator relates to the separated source spectra over all frequency bins.

It may be desirable to enforce beams and/or null beams by adding a regularization term $J(\omega)$ based on the directivity matrix $D(\omega)$ (as in expression (5) above):

$$J(\omega)=S(\omega)\|W(\omega)D(\omega)-C(\omega)\|^2 \quad (7)$$

where $S(\omega)$ is a tuning matrix for frequency $\omega$ and each null beam direction, and $C(\omega)$ is an M×M diagonal matrix equal to diag($W(\omega)*D(\omega)$) that sets the choice of the desired beam pattern and places nulls at interfering directions for each output channel j. Such regularization may help to control sidelobes. For example, matrix $S(\omega)$ may be used to shape the depth of each null beam in a particular direction $\theta_j$ by controlling the amount of enforcement in each null direction at each frequency bin. Such control may be important for trading off the generation of sidelobes against narrow or broad null beams.

Regularization term (7) may be expressed as a constraint on the unmixing matrix update equation with an expression such as the following:

$$\text{constr}(\omega)=(dJ/dW)(\omega)=\mu^*S(\omega)^*2^*(W(\omega)^*D(\omega)-C(\omega))D(\omega)^H. \quad (8)$$

Such a constraint may be implemented by adding such a term to the filter learning rule (e.g., expression (6)), as in the following expression:

$$W_{constr,l+p}(\omega)=W_l(\omega)+\mu[I-<(\Phi(Y(\omega,l))Y(\omega,l)^H>] \\ W_l(\omega)+2S(\omega)(W_l(\omega)D(\omega)-C(\omega))D(\omega)^H. \quad (9)$$

Figure 56:
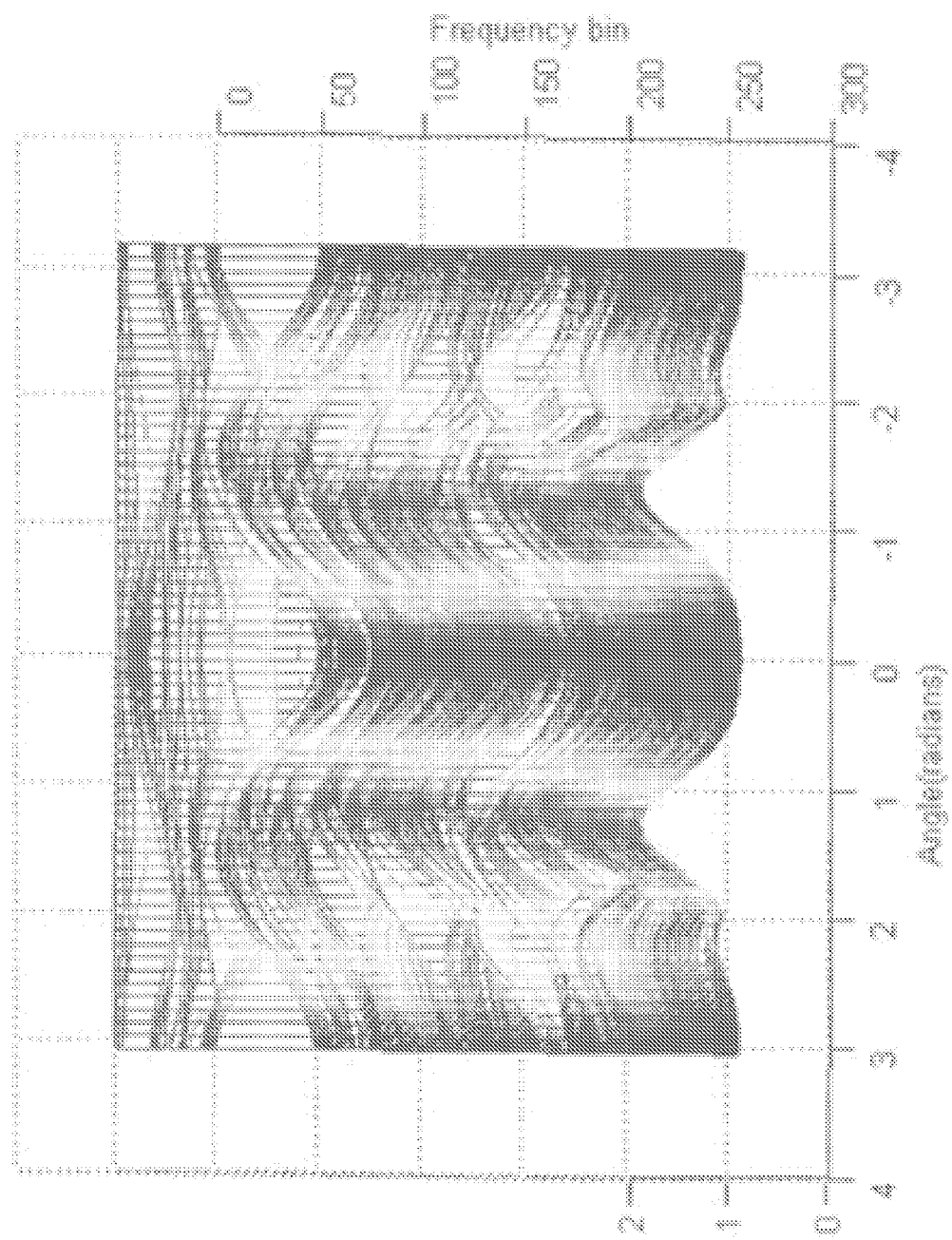
FIGS. 56 and 57 show an example of one BSS solution that has converged.
Figure 57:
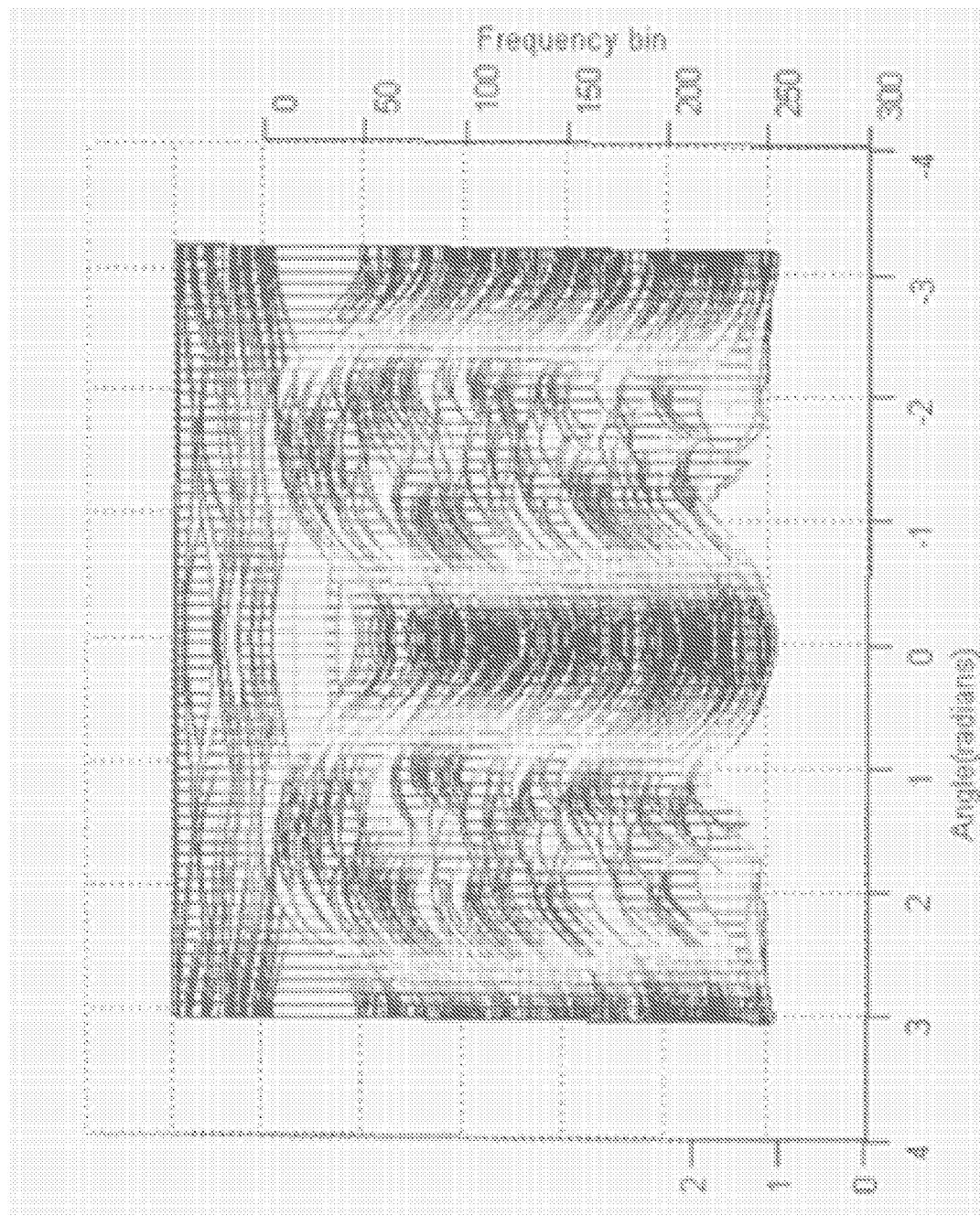
Figure 58:
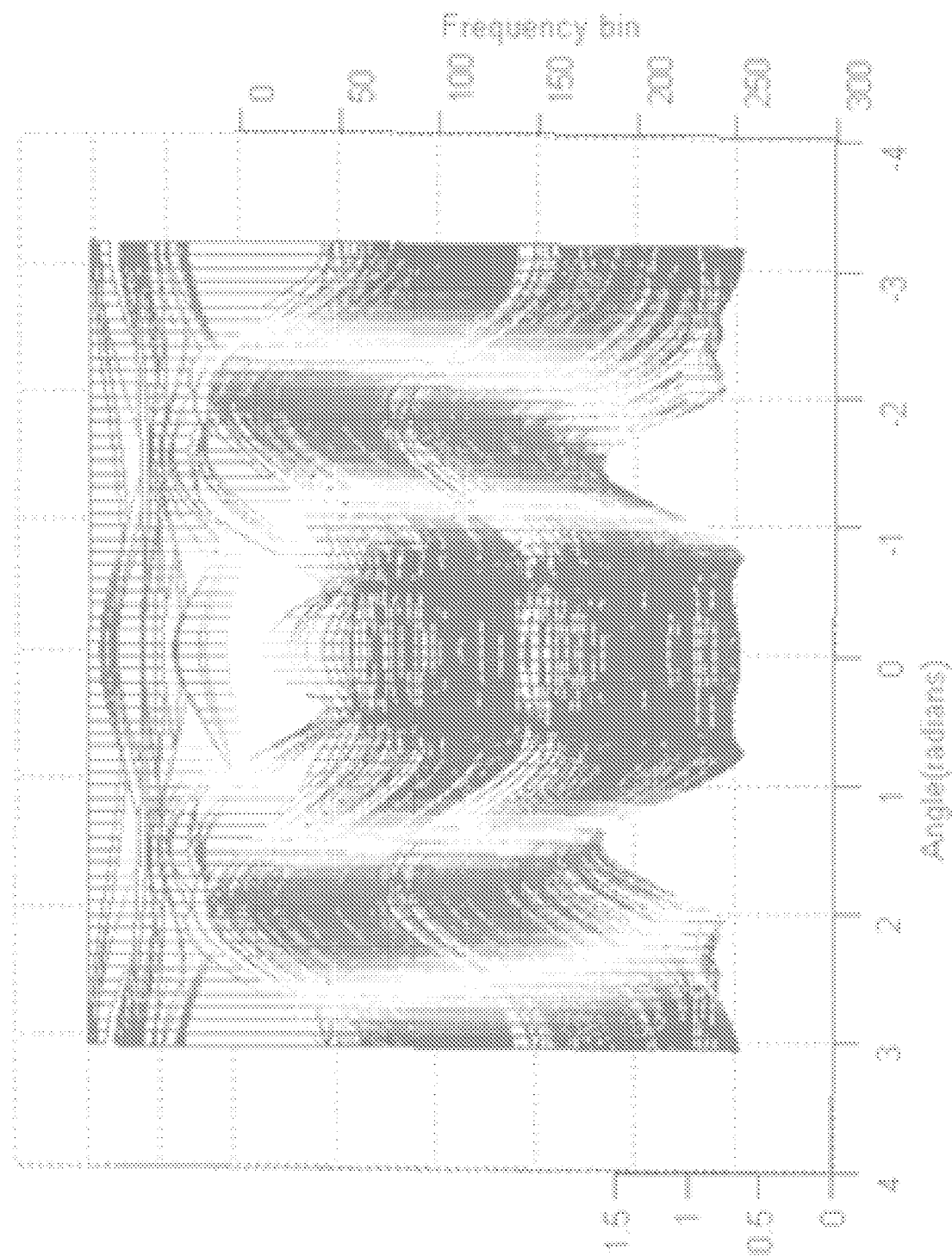
FIGS. 58 and 59 show narrower beams.
Figure 59:
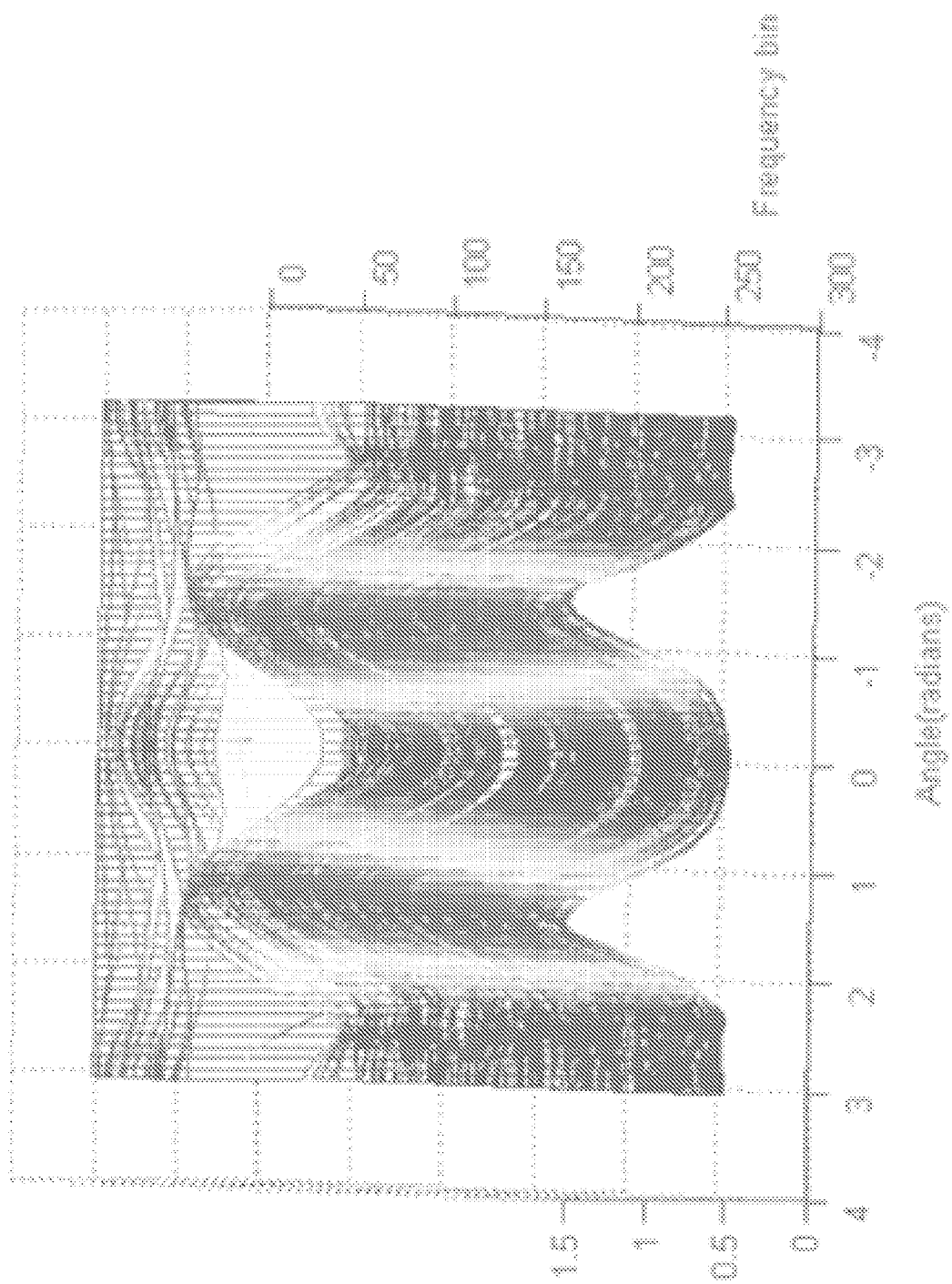
Figure 60:
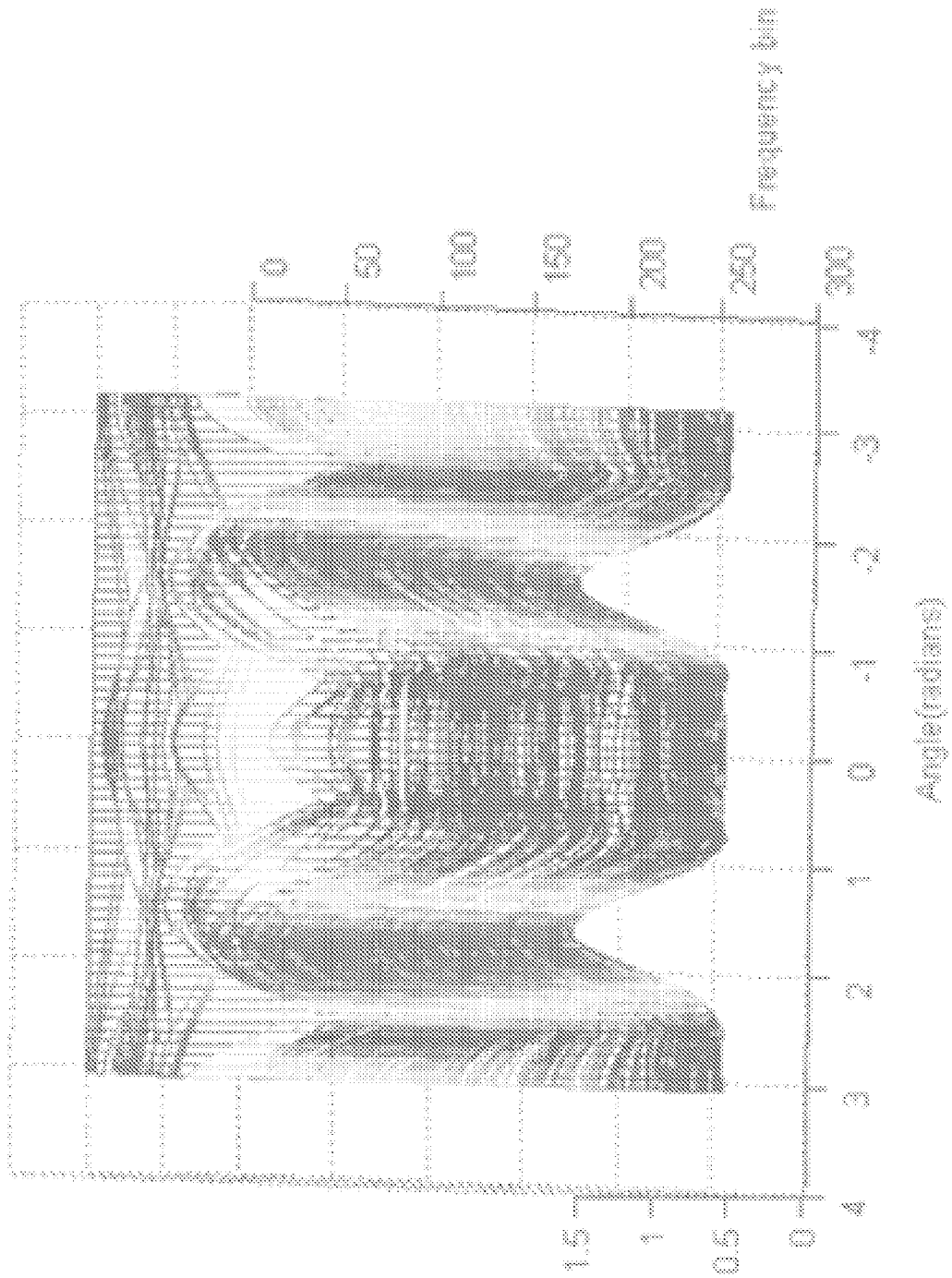
FIG. 60 shows another narrowed beam that was obtained from the beam in FIG. 58.

The source direction of arrival (DOA) values $\theta_j$ may be determined based on the converged BSS beampatterns to eliminate sidelobes. For example, FIGS. 56 and 57 show an example of one BSS solution that has converged in a wide area around $\pi/2$ radians. In order to reduce the sidelobes in such a case, which may be prohibitively large for the desired application, it may be desirable to enforce selective null beams at, for example, $\theta_j=\pi/4$ and $\theta_j=3\pi/4$. FIGS. 58 and 59 show the resulting narrower beams. FIG. 60 shows another narrowed beam that was obtained from the beam in FIG. 58 by applying an additional null beam at $\theta_j=6.5\pi/8$ enforced through a specific matrix $S(\omega)$ in each frequency bin. It may be observed that the sidelobes have been significantly reduced in mid- to high-frequency bands. In this example, the low-frequency bands purposely contain wide beams, which may help to minimize uncorrelated noise amplification. Closed-form MVDR designs are typically unable to handle such problems directly.

A constrained BSS approach may be used to iteratively shape beampatterns in each individual frequency bin and thus to trade-off correlated noise against uncorrelated noise and sidelobes against a main beam. As with an MVDR design, however, a constrained BSS design alone may provide insufficient discrimination between the front and back of the microphone array.

It may be desirable to implement an associated processing system as described herein to provide a suitable tradeoff between preservation of near-field speech and attenuation of far-field interference, and/or to provide nonlinear signal attenuation in undesired directions. For applications of implementations of method M100 that process signals from more than two microphones, it may be desirable to select a linear microphone configuration for minimal voice distortion, or a nonlinear microphone configuration for better noise reduction.

It may be desirable to use three, four, or more microphones simultaneously or in pairs to achieve such enhancement while minimizing desired voice distortion. Similar to a keyboard that may be unfolded for use, an implementation of device D10 may be equipped with a nonlinear microphone array that can be deployed in such a fashion.

One example of a nonlinear four-microphone array includes three microphones in a line, with five centimeters spacing between the center microphone and each of the outer microphones, and another microphone positioned four centimeters above the line and closer to the center microphone than to either outer microphone. Applications for such an array include a hands-free carkit, which may be mounted in front of the front-seat occupants and between the driver's and passenger's visors (e.g., in or on the rearview mirror).

For a communications device being used in a handset mode, a dual-microphone array is typically sufficient, as the variability of the spatial configuration of the handset and the desired speaker is generally limited, such that it may be sufficient to address only a limited range of spatial configurations. The particular microphone configuration may be indicated by an optimal arrangement for the handset mode. The recorded signal-to-noise ratio is typically high, such that aggressive post-processing techniques (e.g., a noise reduction operation as described with reference to task T550) may be applied. However, a two-microphone array may support only limited user-tracking capability, such that the speaker's voice may be attenuated beyond a particular range.

It may be desirable to use an array of more than two microphones to support tracking of a user in time and space and/or to discriminate between near-field and far-field regions. With proper tracking of user-handset configurations, such an array may be used to support significant noise reduction through spatially discriminative processing. Such an array may be suitable for far-field interactive modes, such as hands-free and/or browse-talk modes for a smartphone or other device having such modes. One typical distance between the array and the user's mouth for such a mode is fifty centimeters. Such an array may be useful for automatic speech recognition (ASR) applications (e.g., voice search), which may only tolerate noise removal with very low voice distortion. It may be desirable to use such an array to track speaker movements and adapt processing accordingly. The problem of automatic echo cancellation may be more difficult than in a handset mode, however, and it may be desirable to use an integrated echo cancellation noise suppression (ECNS) solution for interactions with noise reduction from three or more microphone channels.

Using an array of more than two microphones may be conducive to high voice quality and/or good ASR performance. For example, use of such an array may provide less voice distortion for a given level of noise reduction over a wide range of spatial configurations. It may be desirable to use such an array to support enhanced voice tracking capability, such that less voice attenuation or muffling is experienced during movement by a desired speaker.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as applications for voice communications at sampling rates higher than eight kilohertz (e.g., 12, 16, or 44 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing (e.g., a spectral modification operation based on a noise estimate, such as task T550) for more aggressive noise reduction.

The various elements of an implementation of an apparatus as disclosed herein (e.g., apparatus A10, A12, A13, A14, A20, A24, A100, A120, A130, A140, A200, A240, A400, A420, A1002, A2002, and A2402) may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus A10, A12, A13, A14, A20, A24, A100, A120, A130, A140, A200, A240, A400, A420, A1002, A2002, and A2402) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a coherency detection procedure, such as a task relating to another operation of a device or system in which the processor is embedded (e.g., an audio sensing device). It is also possible for part of a method as disclosed herein to be performed by a processor of the audio sensing device (e.g., phase difference calculation task T100 and/or coherency measure calculation task T200) and for another part of the method to be performed under the control of one or more other processors (e.g., a task configured to apply the coherency measure to one or more channels of the signal, such as a noise reduction task).

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "submodule" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times). For example, one or more (possibly all) of FFT modules FFT1-FFT4 may be implemented to use the same structure (e.g., the same set of instructions defining an FFT operation) at different times.

What is claimed is:

1. A method of processing a multichannel signal, said method comprising:
    for each of a plurality of different frequency components of the multichannel signal, calculating a difference between a phase of the frequency component in a first channel of the multichannel signal and a phase of the frequency component in a second channel of the multichannel signal;
    based on information from the plurality of calculated phase differences, calculating (A) a value of a first coherency measure that indicates a degree of coherence among directions of arrival of at least the plurality of different frequency components in a first spatial sector and (B) a value of a second coherency measure that indicates a degree of coherence among the directions of arrival of at least the plurality of different frequency components in a second spatial sector that is different than the first spatial sector;
    calculating a contrast of the first coherency measure by evaluating a relation between the calculated value of the first coherency measure and an average value of the first coherency measure over time;
    calculating a contrast of the second coherency measure by evaluating a relation between the calculated value of the second coherency measure and an average value of the second coherency measure over time; and
    indicating one among the first and second spatial sectors, based on which among the first and second coherency measures has the greatest contrast,
    wherein each of said first and second channels of the multichannel signal is based on a signal produced by a corresponding one of a pair of microphones, and
    wherein at least one among said calculating the difference, said calculating the value of the first coherency measure, said calculating the value of the second coherency measure, said calculating the contrast of the first coherency measure, and said calculating the contrast of the second coherency measure is performed by at least one processor.

2. A method according to claim 1, wherein the plurality of different frequency components includes at least one frequency component having a frequency not greater than one kilohertz and at least one frequency component having a frequency not less than fifteen hundred Hertz.

3. A method according to claim 1, wherein the plurality of different frequency components includes at least one frequency component having a frequency not greater than eight hundred Hertz and at least one frequency component having a frequency not less than eighteen hundred Hertz.

4. A method according to claim 1, wherein said method includes selecting the plurality of different frequency components based on an estimated pitch frequency of the multichannel signal.

5. A method according to claim 1, wherein said method includes:
    at a time subsequent to said indicating, detecting that a value of the coherency measure that corresponds to the indicated sector is not greater than a corresponding threshold value; and in response to said detecting, varying an amplitude of at least one frequency component of at least one channel of the multichannel signal according to a specified noise spectral profile.

6. A method according to claim 1, wherein said method includes, based on said indicating one among the first and second spatial sectors and on information from at least one frequency component of the multichannel signal whose direction of arrival is not within the indicated spatial sector, updating an estimate of a noise component of at least one channel of the multichannel signal.

7. A method according to claim 1, wherein said method comprises calculating, for each of a plurality of different frequency components of a second multichannel signal, a difference between a phase of the frequency component in a first channel of the second multichannel signal and a phase of the frequency component in a second channel of the second multichannel signal to obtain a second plurality of calculated phase differences, and
  wherein each of said first and second channels of the second multichannel signal is based on a signal produced by a corresponding one of a second pair of microphones that is different from said pair of microphones, and
  wherein at least one of said calculating the value of the first coherency measure and said calculating the value of the second coherency measure is based on information from the second plurality of calculated phase differences, a direction specification device to specify, when the external mode is set, a direction of an emission source of the external sound with respect to the user, based at least in part on the stereo external signal acquired by the external signal acquisition device;
  a fade control device to control an operation to generate the stereo output signal by the output signal generation device in accordance with the operation mode set by the mode setting device and the direction of the emission source of the external sound specified by the direction specification device, wherein when the external mode is set and the direction of the emission source of the external sound is specified to correspond with the first direction, the fade control device causes the output signal generation device to generate the first output signal from at least the stereo external signal, and also to generate the second output signal from at least the stereo audio signal, and
    when the external mode is set, the fade control device causes the output signal generation device to generate the first output signal from the stereo external signal only, and to generate the second output signal by converting the stereo audio signal to a monaural audio signal.

8. A method according to claim 1, wherein said calculating the value of the first coherency measure comprises calculating, for each of the plurality of calculated phase differences, a corresponding direction indicator, and
  wherein each of the plurality of direction indicators indicates at least one of (A) a direction of arrival of the corresponding frequency component, (B) a time delay of arrival of the corresponding frequency component, and (C) a ratio between the calculated phase difference and the frequency of the corresponding frequency component, and
  wherein said value of the first coherency measure is based on the plurality of direction indicators.

9. A method according to claim 8, wherein said calculating the value of the first coherency measure comprises, for each of the plurality of direction indicators, rating the direction indicator according to a directional masking function to obtain a corresponding mask score, and
  wherein said value of the first coherency measure is based on the plurality of mask scores.

10. A method according to claim 9, wherein said method includes varying an amplitude of at least one of the plurality of frequency components of at least one channel of the multichannel signal, based on the corresponding mask score, to produce a masked signal.

11. A method according to claim 9, wherein said method includes:
  based on the mask scores of at least some of the plurality of direction indicators that correspond to frequency components in a specified subband of the multichannel signal, calculating a subband mask score; and
  varying amplitudes of frequency components of at least the specified subband of at least one channel of the multichannel signal, based on the subband mask score, to produce a masked signal.

12. A method according to claim 10, wherein said method includes attenuating the masked signal when a ratio of a level of the masked signal and a level of the at least one channel is small.

13. A method according to claim 1, wherein said indicating one among the first and second spatial sectors is based on a state of a relation between (A) said calculated value of said coherency measure that has the greatest contrast and (B) a threshold value that corresponds to said coherency measure; and
  wherein the threshold value that corresponds to the first coherency measure differs from the threshold value that corresponds to the second coherency measure.

14. A non-transitory computer-readable medium comprising instructions which when executed by at least one processor cause the at least one processor to perform a method according to claim 1.

15. A method according to claim 13, wherein said first spatial sector includes an axis of the pair of microphones and said second spatial sector includes a direction orthogonal to said axis, and
  wherein the threshold value that corresponds to the first coherency measure is less than the threshold value that corresponds to the second coherency measure.

16. A method according to claim 13, wherein said method comprises, at a time subsequent to said indicating one among the first and second spatial sectors, indicating the other among the first and second spatial sectors in response to detecting that said other coherency measure has the greatest contrast, and
  wherein said indicating the other spatial sector occurs only if a value of said other coherency measure at said subsequent time is not less than said threshold value that corresponds to said other coherency measure.

17. A method according to claim 1, wherein said method comprises:
  applying a null beam to at least two channels of the multichannel signal, wherein a direction of said beam is based on said indicated one among the first and second spatial sectors; and
  based on a result of said applying a null beam, updating an estimate of a noise component of the multichannel signal.

18. An apparatus for processing a multichannel signal, said apparatus comprising:
  means for calculating, for each of a plurality of different frequency components of the multichannel signal, a difference between a phase of the frequency component in a first channel of the multichannel signal and a phase of the frequency component in a second channel of the multichannel signal;

means for calculating, based on information from the plurality of calculated phase differences, (A) a value of a first coherency measure that indicates a degree of coherence among directions of arrival of at least the plurality of different frequency components in a first spatial sector and (B) a value of a second coherency measure that indicates a degree of coherence among the directions of arrival of at least the plurality of different frequency components in a second spatial sector that is different than the first spatial sector; means for calculating a contrast of the first coherency measure by evaluating a relation between the calculated value of the first coherency measure and an average value of the first coherency measure over time and for calculating a contrast of the second coherency measure by evaluating a relation between the calculated value of the second coherency measure and an average value of the second coherency measure over time; and means for indicating one among the first and second spatial sectors, based on which among the first and second coherency measures has the greatest contrast, wherein each of said first and second channels of the multichannel signal is based on a signal produced by a corresponding one of a pair of microphones, and wherein at least one among said means for calculating the difference, said means for calculating the value of the first coherency measure and the value of the second coherency measure, and said means for calculating the contrast of the first coherency measure and the contrast of the second coherency measure is implemented by at least one processor.

19. An apparatus according to claim 18, wherein the plurality of different frequency components includes at least one frequency component having a frequency not greater than one kilohertz and at least one frequency component having a frequency not less than fifteen hundred Hertz.

20. An apparatus according to claim 18, wherein the plurality of different frequency components includes at least one frequency component having a frequency not greater than eight hundred Hertz and at least one frequency component having a frequency not less than eighteen hundred Hertz.

21. An apparatus according to claim 18, wherein said apparatus includes means for selecting the plurality of different frequency components based on an estimated pitch frequency of the multichannel signal.

22. An apparatus according to claim 18, wherein said apparatus includes:

means for detecting, at a time subsequent to said indicating, that a value of the coherency measure that corresponds to the indicated sector is not greater than a corresponding threshold value; and means for varying, in response to said detecting, an amplitude of at least one frequency component of at least one channel of the multichannel signal according to a specified noise spectral profile.

23. An apparatus according to claim 18, wherein said apparatus includes means for updating, based on said indicating one among the first and second spatial sectors and on information from at least one frequency component of the multichannel signal whose direction of arrival is not within the indicated spatial sector, an estimate of a noise component of at least one channel of the multichannel signal.

24. An apparatus according to claim 18, wherein said apparatus comprises means for calculating, for each of a plurality of different frequency components of a second multichannel signal, a difference between a phase of the frequency component in a first channel of the second multichannel signal and a phase of the frequency component in a second channel of the second multichannel signal to obtain a second plurality of calculated phase differences, and wherein each of said first and second channels of the second multichannel signal is based on a signal produced by a corresponding one of a second pair of microphones that is different from said pair of microphones, and wherein said means for calculating the value of the first coherency measure and the value of the second coherency measure is configured to calculate the value of at least one of the first coherency measure and the second coherency measure based on information from the second plurality of calculated phase differences.

25. An apparatus according to claim 18, wherein said means for calculating the value of the first coherency measure is configured to calculate, for each of the plurality of calculated phase differences, a corresponding direction indicator, and wherein each of the plurality of direction indicators indicates at least one of (A) a direction of arrival of the corresponding frequency component, (B) a time delay of arrival of the corresponding frequency component, and (C) a ratio between the calculated phase difference and the frequency of the corresponding frequency component, and wherein said value of the first coherency measure is based on the plurality of direction indicators.

26. An apparatus according to claim 25, wherein said means for calculating the value of the first coherency measure comprises means for rating, for each of the plurality of direction indicators, the direction indicator according to a directional masking function to obtain a corresponding mask score, and wherein said value of the first coherency measure is based on the plurality of mask scores.

27. An apparatus according to claim 26, wherein said apparatus includes means for varying an amplitude of at least one of the plurality of frequency components of at least one channel of the multichannel signal, based on the corresponding mask score, to produce a masked signal.

28. An apparatus according to claim 26, wherein said apparatus includes:

means for calculating, based on the mask scores of at least some of the plurality of direction indicators that correspond to frequency components in a specified subband of the multichannel signal, a subband mask score; and means for varying amplitudes of frequency components of at least the specified subband of at least one channel of the multichannel signal, based on the subband mask score, to produce a masked signal.

29. An apparatus according to claim 27, wherein said apparatus includes means for attenuating the masked signal when a ratio of a level of the masked signal and a level of the at least one channel is small.

30. An apparatus according to claim 18, wherein said indicating one among the first and second spatial sectors is based on a state of a relation between (A) said calculated value of said coherency measure that has the greatest contrast and (B) a threshold value that corresponds to said coherency measure; and wherein the threshold value that corresponds to the first coherency measure differs from the threshold value that corresponds to the second coherency measure.

31. An apparatus according to claim 30, wherein said first spatial sector includes an axis of the pair of microphones and said second spatial sector includes a direction orthogonal to said axis, and wherein the threshold value that corresponds to the first coherency measure is less than the threshold value that corresponds to the second coherency measure.

32. An apparatus according to claim 30, wherein said means for indicating is configured to indicate, at a time subsequent to said indicating one among the first and second spatial sectors, the other among the first and second spatial sectors in response to detecting that said other coherency measure has the greatest contrast, and wherein said means for indicating is configured to indicate the other spatial sector only if a value of said other coherency measure at said subsequent time is not less than said threshold value that corresponds to said other coherency measure.

33. An apparatus according to claim 18, wherein said apparatus comprises:

means for applying a null beam to at least two channels of the multichannel signal, wherein a direction of said beam is based on said indicated one among the first and second spatial sectors; and means for updating an estimate of a noise component of the multichannel signal, based on an output of said means for applying a null beam.

34. An apparatus for processing a multichannel signal, said apparatus comprising:

a phase difference calculator configured to calculate, for each of a plurality of different frequency components of the multichannel signal, a difference between a phase of the frequency component in a first channel of the multichannel signal and a phase of the frequency component in a second channel of the multichannel signal; and a coherency measure calculator configured to calculate, based on information from the plurality of calculated phase differences, (A) a value of a first coherency measure that indicates a degree of coherence among directions of arrival of at least the plurality of different frequency components in a first spatial sector and (B) a value of a second coherency measure that indicates a degree of coherence among the directions of arrival of at least the plurality of different frequency components in a second spatial sector that is different than the first spatial sector, wherein said coherency measure calculator is configured to calculate a contrast of the first coherency measure by evaluating a relation between the calculated value of the first coherency measure and an average value of the first coherency measure over time and to calculate a contrast of the second coherency measure by evaluating a relation between the calculated value of the second coherency measure and an average value of the second coherency measure over time, and wherein said coherency measure calculator is configured to indicate one among the first and second spatial sectors, based on which among the first and second coherency measures has the greatest contrast, and wherein each of said first and second channels of the multichannel signal is based on a signal produced by a corresponding one of a pair of microphones.

35. An apparatus according to claim 34, wherein the plurality of different frequency components includes at least one frequency component having a frequency not greater than one kilohertz and at least one frequency component having a frequency not less than fifteen hundred Hertz.

36. An apparatus according to claim 34, wherein the plurality of different frequency components includes at least one frequency component having a frequency not greater than eight hundred Hertz and at least one frequency component having a frequency not less than eighteen hundred Hertz.

37. An apparatus according to claim 34, wherein at least one among said phase difference calculator and said coherency measure calculator is configured to select the plurality of different frequency components based on an estimated pitch frequency of the multichannel signal.

38. An apparatus according to claim 34, wherein said coherency measure calculator is configured to detect, at a time subsequent to said indicating, that a value of the coherency measure that corresponds to the indicated sector is not greater than a corresponding threshold value; and wherein said apparatus includes a spectrum modifier configured to vary, in response to said detecting, an amplitude of at least one frequency component of at least one channel of the multichannel signal according to a specified noise spectral profile.

39. An apparatus according to claim 34, wherein said apparatus includes a noise estimator configured to update, based on said indicating one among the first and second spatial sectors and on information from at least one frequency component of the multichannel signal whose direction of arrival is not within the indicated spatial sector, an estimate of a noise component of at least one channel of the multichannel signal.

40. An apparatus according to claim 34, wherein said apparatus comprises a second phase difference calculator configured to calculate, for each of a plurality of different frequency components of a second multichannel signal, a difference between a phase of the frequency component in a first channel of the second multichannel signal and a phase of the frequency component in a second channel of the second multichannel signal to obtain a second plurality of calculated phase differences, and wherein each of said first and second channels of the second multichannel signal is based on a signal produced by a corresponding one of a second pair of microphones that is different from said pair of microphones, and wherein said coherency measure calculator is configured to calculate the value of at least one of the first coherency measure and the second coherency measure based on information from the second plurality of calculated phase differences.

41. An apparatus according to claim 34, wherein said coherency measure calculator is configured to calculate, for each of the plurality of calculated phase differences, a corresponding direction indicator, and wherein each of the plurality of direction indicators indicates at least one of (A) a direction of arrival of the corresponding frequency component, (B) a time delay of arrival of the corresponding frequency component, and (C) a ratio between the calculated phase difference and the frequency of the corresponding frequency component, and wherein said value of the first coherency measure is based on the plurality of direction indicators.

42. An apparatus according to claim 41, wherein said coherency measure calculator is configured to rate, for each of the plurality of direction indicators, the direction indicator according to a directional masking function to obtain a corresponding mask score, and wherein said value of the first coherency measure is based on the plurality of mask scores.

43. An apparatus according to claim 42, wherein said apparatus includes a masked signal generator configured to vary an amplitude of at least one of the plurality of frequency components of at least one channel of the multichannel signal, based on the corresponding mask score, to produce a masked signal.

44. An apparatus according to claim 42, wherein said apparatus includes a masked signal generator configured to calculate, based on the mask scores of at least some of the plurality of direction indicators that correspond to frequency components in a specified subband of the multichannel signal, a subband mask score, and to vary amplitudes of frequency components of at least the specified subband of at least one channel of the multichannel signal, based on the subband mask score, to produce a masked signal.

45. An apparatus according to claim 43, wherein said masked signal generator is configured to attenuate the masked signal when a ratio of a level of the masked signal and a level of the at least one channel is small.

46. An apparatus according to claim 34, wherein said coherency measure calculator is configured to indicate said one among the first and second spatial sectors based on a state of a relation between (A) said calculated value of said coherency measure that has the greatest contrast and (B) a threshold value that corresponds to said coherency measure, wherein the threshold value that corresponds to the first coherency measure differs from the threshold value that corresponds to the second coherency measure.

47. An apparatus according to claim 46, wherein said first spatial sector includes an axis of the pair of microphones and said second spatial sector includes a direction orthogonal to said axis, and wherein the threshold value that corresponds to the first coherency measure is less than the threshold value that corresponds to the second coherency measure.

48. An apparatus according to claim 46, wherein said coherency measure calculator is configured to indicate, at a time subsequent to said indicating one among the first and second spatial sectors, the other among the first and second spatial sectors in response to detecting that said other coherency measure has the greatest contrast, and wherein said coherency measure calculator is configured to indicate the other spatial sector only if a value of said other coherency measure at said subsequent time is not less than said threshold value that corresponds to said other coherency measure.

49. An apparatus according to claim 34, wherein said apparatus comprises:

a null beamformer configured to apply a null beam to at least two channels of the multichannel signal, wherein a direction of said beam is based on said indicated one among the first and second spatial sectors; and a noise estimator configured to update an estimate of a noise component of the multichannel signal, based on an output of said null beamformer.

* * * * *